US012242707B2

(12) United States Patent
Sundstrom et al.

(10) Patent No.: US 12,242,707 B2
(45) Date of Patent: Mar. 4, 2025

(54) DISPLAYING AND MOVING APPLICATION VIEWS ON A DISPLAY OF AN ELECTRONIC DEVICE

(71) Applicant: Apple Inc., Cupertino, CA (US)

(72) Inventors: Matthew J. Sundstrom, Campbell, CA (US); Taylor G. Carrigan, San Francisco, CA (US); Christopher Patrick Foss, San Francisco, CA (US); Ieyuki Kawashima, San Jose, CA (US); Stephen O. Lemay, Palo Alto, CA (US); Marco Triverio, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/784,806

(22) Filed: Oct. 16, 2017

(65) Prior Publication Data

US 2018/0329586 A1    Nov. 15, 2018

Related U.S. Application Data

(60) Provisional application No. 62/506,548, filed on May 15, 2017.

(51) Int. Cl.
*G06F 3/0482* (2013.01)
*G06F 1/16* (2006.01)
(Continued)

(52) U.S. Cl.
CPC ............ *G06F 3/0482* (2013.01); *G06F 1/163* (2013.01); *G06F 1/1671* (2013.01); *G06F 1/169* (2013.01);
(Continued)

(58) Field of Classification Search
CPC ...... G06F 1/163; G06F 3/0362; G06F 3/0482; G06F 3/048; G06F 3/0483; G06F 3/0488;
(Continued)

(56) References Cited

U.S. PATENT DOCUMENTS

| 102,663 A | 5/1870 | Dillen |
| 4,761,642 A | 8/1988 | Huntzinger |

(Continued)

FOREIGN PATENT DOCUMENTS

| CA | 2876587 A1 | 2/2014 |
| CN | 1473430 A | 2/2004 |

(Continued)

OTHER PUBLICATIONS

Screen captures from YouTube clip entitled "Samsung Gear S3 App launcher widget—App review" 5 pages, published on Dec. 26, 2016 by Mr Analytical. Retrieved from Internet <https://www.youtube.com/watch?v=HEfTv17peik> (Year: 2016).*

(Continued)

*Primary Examiner* — Kenny Nguyen
(74) *Attorney, Agent, or Firm* — DLA Piper LLP (US)

(57) ABSTRACT

The present disclosure generally relates to selecting and opening applications. An electronic device includes a display and a rotatable input mechanism rotatable around a rotation axis substantially perpendicular to a normal axis that is normal to a face of the display. The device detects a user input, and in response to detecting the user input, displays a first subset of application views of a set of application views. The first subset of application views is displayed along a first dimension of the display substantially perpendicular to both the rotation axis and the normal axis. The device detects a rotation of the rotatable input mechanism, and in response to detecting the rotation, displays a second subset of application views of the set of application (Continued)

views. Displaying the second subset of application views includes moving the set of application views on the display along the first dimension of the display.

54 Claims, 24 Drawing Sheets

(51) Int. Cl.
| | |
|---|---|
| *G06F 3/0362* | (2013.01) |
| *G06F 3/048* | (2013.01) |
| *G06F 3/04817* | (2022.01) |
| *G06F 3/0483* | (2013.01) |
| *G06F 3/04845* | (2022.01) |
| *G06F 3/0485* | (2022.01) |
| *G06F 3/0488* | (2022.01) |
| *G06F 3/04883* | (2022.01) |

(52) U.S. Cl.
CPC ............ *G06F 3/0362* (2013.01); *G06F 3/048* (2013.01); *G06F 3/0483* (2013.01); *G06F 3/04845* (2013.01); *G06F 3/0488* (2013.01); *G06F 3/04883* (2013.01); *G06F 3/04817* (2013.01); *G06F 3/0485* (2013.01); *G06F 2203/04105* (2013.01)

(58) Field of Classification Search
CPC .... G06F 1/1671; G06F 1/169; G06F 3/04845; G06F 3/04883; G06F 2203/04105; G06F 3/04817; G06F 3/0485
See application file for complete search history.

(56) References Cited

U.S. PATENT DOCUMENTS

| | | |
|---|---|---|
| 4,885,704 A | 12/1989 | Takagi et al. |
| 4,896,291 A | 1/1990 | Gest et al. |
| 5,140,678 A | 8/1992 | Torres |
| 5,146,556 A | 9/1992 | Hullot et al. |
| 5,202,961 A | 4/1993 | Mills et al. |
| 5,227,771 A | 7/1993 | Kerr et al. |
| 5,229,852 A | 7/1993 | Maietta et al. |
| 5,237,653 A | 8/1993 | Noguchi et al. |
| 5,287,447 A | 2/1994 | Miller et al. |
| 5,333,256 A | 7/1994 | Green et al. |
| 5,347,295 A | 9/1994 | Agulnick et al. |
| 5,384,911 A | 1/1995 | Bloomfield |
| 5,412,776 A | 5/1995 | Bloomfield et al. |
| 5,416,895 A | 5/1995 | Anderson et al. |
| 5,428,730 A | 6/1995 | Baker et al. |
| 5,463,725 A | 10/1995 | Henckel et al. |
| 5,487,143 A | 1/1996 | Southgate |
| 5,499,334 A | 3/1996 | Staab |
| 5,500,936 A | 3/1996 | Allen et al. |
| 5,557,724 A | 9/1996 | Sampat et al. |
| 5,560,022 A | 9/1996 | Dunstan et al. |
| 5,561,811 A | 10/1996 | Bier |
| 5,581,670 A | 12/1996 | Bier et al. |
| 5,583,984 A | 12/1996 | Conrad et al. |
| 5,657,049 A | 8/1997 | Ludolph et al. |
| 5,659,693 A | 8/1997 | Hansen et al. |
| 5,721,850 A | 2/1998 | Farry et al. |
| 5,793,365 A | 8/1998 | Tang et al. |
| 5,825,357 A | 10/1998 | Malamud et al. |
| 6,025,871 A | 2/2000 | Kantor et al. |
| 6,166,736 A | 12/2000 | Hugh |
| 6,215,490 B1 | 4/2001 | Kaply |
| 6,230,170 B1 | 5/2001 | Zellweger et al. |
| 6,300,951 B1 | 10/2001 | Filetto et al. |
| 6,346,962 B1 | 2/2002 | Goodridge |
| 6,486,895 B1 | 11/2002 | Robertson et al. |
| 6,493,002 B1 | 12/2002 | Christensen |
| 6,661,437 B1 | 12/2003 | Miller et al. |
| 6,768,497 B2 | 7/2004 | Baar et al. |
| 7,007,241 B2 | 2/2006 | Boeuf |
| 7,102,663 B2 | 9/2006 | Crook |
| 7,148,911 B1 | 12/2006 | Mitsui et al. |
| 7,444,645 B1 | 10/2008 | St-Michel et al. |
| 7,458,014 B1 | 11/2008 | Rubin et al. |
| 7,469,381 B2 | 12/2008 | Ording |
| 7,506,260 B2 | 3/2009 | Wada et al. |
| 7,676,767 B2 | 3/2010 | Hofmeister et al. |
| 7,707,514 B2 | 4/2010 | Forstall et al. |
| 7,739,622 B2 | 6/2010 | DeLine et al. |
| 7,814,112 B2 | 10/2010 | Gupta et al. |
| 7,840,907 B2 | 11/2010 | Kikuchi et al. |
| 7,876,996 B1 | 1/2011 | Herz |
| 7,954,056 B2 | 5/2011 | Graham |
| 7,982,762 B2 | 7/2011 | Chatting et al. |
| 8,077,157 B2 | 12/2011 | Sengupta et al. |
| 8,171,137 B1 | 5/2012 | Parks et al. |
| 8,181,119 B1 | 5/2012 | Ording |
| RE43,462 E | 6/2012 | Washino et al. |
| 8,196,061 B1 | 6/2012 | Bhojan |
| 8,224,894 B1 | 7/2012 | Parks et al. |
| 8,250,071 B1 | 8/2012 | Killalea et al. |
| 8,259,153 B1 | 9/2012 | Campbell, III et al. |
| 8,260,879 B2 | 9/2012 | Chan |
| 8,269,739 B2 | 9/2012 | Hillis et al. |
| 8,290,777 B1 | 10/2012 | Nguyen et al. |
| 8,291,341 B2 | 10/2012 | Tseng et al. |
| 8,294,105 B2 | 10/2012 | Alameh et al. |
| 8,370,448 B2 | 2/2013 | Galchev |
| 8,427,303 B1 | 4/2013 | Brady et al. |
| 8,438,504 B2 | 5/2013 | Cranfill et al. |
| 8,443,280 B2 | 5/2013 | Noyes |
| 8,478,363 B2 | 7/2013 | Levien et al. |
| 8,478,816 B2 | 7/2013 | Parks et al. |
| 8,499,236 B1 | 7/2013 | Keljo |
| 8,502,856 B2 | 8/2013 | Jeong et al. |
| 8,566,700 B2 | 10/2013 | Ueda |
| 8,613,070 B1 | 12/2013 | Borzycki et al. |
| 8,624,952 B2 | 1/2014 | Currivan et al. |
| 8,656,040 B1 | 2/2014 | Bajaj et al. |
| 8,718,556 B2 | 5/2014 | Lee et al. |
| 8,725,880 B2 | 5/2014 | Santamaria et al. |
| 8,762,844 B2 | 6/2014 | Kim et al. |
| 8,782,513 B2 | 7/2014 | Migos et al. |
| 8,806,369 B2 | 8/2014 | Khoe et al. |
| 8,839,122 B2 | 9/2014 | Anzures et al. |
| 8,856,105 B2 | 10/2014 | Gargi |
| 8,949,250 B1 * | 2/2015 | Garg ................ G06F 17/3053 707/748 |
| 9,095,779 B2 | 8/2015 | Chan et al. |
| 9,253,531 B2 | 2/2016 | Relyea et al. |
| 9,253,631 B1 | 2/2016 | White et al. |
| 9,417,781 B2 * | 8/2016 | Lee ....................... G06F 3/0488 |
| 9,442,516 B2 | 9/2016 | Migos et al. |
| 9,462,017 B1 | 10/2016 | Siracusano, Jr. |
| 9,483,175 B2 | 11/2016 | Wagner |
| 9,552,015 B2 | 1/2017 | Migos et al. |
| 9,639,252 B2 * | 5/2017 | Jin ....................... G06F 3/04817 |
| 9,781,540 B2 * | 10/2017 | Jagannathan ........... H04L 67/00 |
| 9,787,938 B2 | 10/2017 | Cranfill et al. |
| 9,819,877 B1 | 11/2017 | Faulkner et al. |
| 9,830,056 B1 * | 11/2017 | Keely ..................... G06F 3/0483 |
| 10,025,496 B2 * | 7/2018 | Park ....................... G04G 21/00 |
| 10,198,144 B2 * | 2/2019 | Munoz .................. G06F 3/0482 |
| 10,284,812 B1 | 5/2019 | Van Os et al. |
| 10,386,994 B2 | 8/2019 | Singal et al. |
| 10,534,535 B2 * | 1/2020 | Lee ....................... G04G 21/08 |
| 10,909,586 B2 | 2/2021 | Avedissian et al. |
| 11,064,256 B1 | 7/2021 | Voss et al. |
| 11,164,113 B2 | 11/2021 | Howard |
| 11,258,619 B2 | 2/2022 | Libin |
| 11,360,634 B1 | 6/2022 | Chang et al. |
| 11,449,188 B1 | 9/2022 | Chang et al. |
| 11,671,697 B2 | 6/2023 | O'Leary et al. |
| 11,726,647 B2 | 8/2023 | Kim |
| 11,770,600 B2 | 9/2023 | O'Leary et al. |
| 2002/0010707 A1 | 1/2002 | Chang et al. |
| 2002/0075334 A1 | 6/2002 | Yfantis |

(56) References Cited

U.S. PATENT DOCUMENTS

| | | |
|---|---|---|
| 2002/0083101 A1 | 6/2002 | Card et al. |
| 2002/0093531 A1 | 7/2002 | Barile |
| 2002/0105537 A1 | 8/2002 | Orbanes et al. |
| 2002/0113802 A1 | 8/2002 | Card et al. |
| 2002/0118230 A1 | 8/2002 | Card et al. |
| 2002/0120651 A1 | 8/2002 | Pustejovsky et al. |
| 2003/0013493 A1 | 1/2003 | Irimajiri et al. |
| 2003/0030673 A1 | 2/2003 | Ho |
| 2003/0055977 A1 | 3/2003 | Miller |
| 2003/0076352 A1 | 4/2003 | Uhlig et al. |
| 2003/0098884 A1 | 5/2003 | Christensen |
| 2003/0158886 A1 | 8/2003 | Walls et al. |
| 2003/0184598 A1 | 10/2003 | Graham |
| 2003/0218619 A1 | 11/2003 | Ben-Tovim |
| 2003/0225836 A1 | 12/2003 | Lee et al. |
| 2004/0017404 A1 | 1/2004 | Schileru-Key |
| 2004/0048601 A1 | 3/2004 | Lee et al. |
| 2004/0048612 A1 | 3/2004 | Virtanen et al. |
| 2004/0080531 A1 | 4/2004 | Berstis |
| 2004/0102225 A1 | 5/2004 | Furuta et al. |
| 2004/0125081 A1 | 7/2004 | Hayakawa |
| 2004/0141016 A1 | 7/2004 | Fukatsu et al. |
| 2004/0174398 A1 | 9/2004 | Luke et al. |
| 2004/0205514 A1 | 10/2004 | Sommerer et al. |
| 2004/0218035 A1 | 11/2004 | Crook |
| 2005/0132281 A1 | 6/2005 | Pan et al. |
| 2005/0223068 A1 | 10/2005 | Shohfi et al. |
| 2005/0233780 A1 | 10/2005 | Jani et al. |
| 2005/0239512 A1 | 10/2005 | Hasegawa et al. |
| 2005/0289482 A1 | 12/2005 | Anthony et al. |
| 2006/0002315 A1 | 1/2006 | Theurer et al. |
| 2006/0031776 A1 | 2/2006 | Glein et al. |
| 2006/0033724 A1 | 2/2006 | Chaudhri et al. |
| 2006/0055789 A1 | 3/2006 | Jin et al. |
| 2006/0056837 A1 | 3/2006 | Vapaakoski |
| 2006/0071947 A1 | 4/2006 | Ubillos et al. |
| 2006/0101122 A1 | 5/2006 | Ishii |
| 2006/0107226 A1 | 5/2006 | Matthews et al. |
| 2006/0149399 A1 | 7/2006 | Norhammar et al. |
| 2006/0150215 A1 | 7/2006 | Wroblewski |
| 2006/0184894 A1 | 8/2006 | Daniels et al. |
| 2006/0185005 A1 | 8/2006 | Graves et al. |
| 2006/0230346 A1 | 10/2006 | Bhogal et al. |
| 2006/0256188 A1 | 11/2006 | Mock et al. |
| 2007/0015519 A1 | 1/2007 | Casey |
| 2007/0040898 A1 | 2/2007 | Lee et al. |
| 2007/0064112 A1 | 3/2007 | Chatting et al. |
| 2007/0083828 A1 | 4/2007 | Toriyama et al. |
| 2007/0115349 A1 | 5/2007 | Currivan et al. |
| 2007/0115933 A1 | 5/2007 | Muhamed et al. |
| 2007/0160345 A1 | 7/2007 | Sakai et al. |
| 2007/0174761 A1 | 7/2007 | Lin et al. |
| 2007/0177025 A1 | 8/2007 | Kopet et al. |
| 2007/0177804 A1 | 8/2007 | Elias et al. |
| 2007/0233736 A1 | 10/2007 | Xiong et al. |
| 2007/0236476 A1 | 10/2007 | Suzuki |
| 2007/0239831 A1 | 10/2007 | Basu |
| 2007/0264977 A1 | 11/2007 | Zinn et al. |
| 2007/0277121 A1 | 11/2007 | Beckman |
| 2007/0279482 A1 | 12/2007 | Oswald et al. |
| 2007/0291736 A1 | 12/2007 | Furlong et al. |
| 2008/0032704 A1 | 2/2008 | Oneil et al. |
| 2008/0034307 A1 | 2/2008 | Cisler et al. |
| 2008/0036849 A1 | 2/2008 | Oh et al. |
| 2008/0063389 A1 | 3/2008 | Fang et al. |
| 2008/0068447 A1 | 3/2008 | Mattila et al. |
| 2008/0074049 A1 | 3/2008 | Kitai et al. |
| 2008/0074550 A1 | 3/2008 | Park |
| 2008/0084482 A1 | 4/2008 | Hansson et al. |
| 2008/0094368 A1 | 4/2008 | Ording et al. |
| 2008/0094370 A1 | 4/2008 | Ording et al. |
| 2008/0117876 A1 | 5/2008 | Hidaka et al. |
| 2008/0129816 A1 | 6/2008 | Mattila et al. |
| 2008/0134033 A1 | 6/2008 | Burns et al. |
| 2008/0141182 A1 | 6/2008 | Barsness et al. |
| 2008/0160974 A1 | 7/2008 | Vartiainen et al. |
| 2008/0165388 A1 | 7/2008 | Serlet |
| 2008/0168073 A1 | 7/2008 | Siegel et al. |
| 2008/0174570 A1 | 7/2008 | Jobs et al. |
| 2008/0218535 A1 | 9/2008 | Forstall et al. |
| 2008/0246778 A1 | 10/2008 | Ham et al. |
| 2008/0282202 A1 | 11/2008 | Sunday |
| 2008/0307345 A1 | 12/2008 | Hart et al. |
| 2008/0313257 A1 | 12/2008 | Allen et al. |
| 2008/0316295 A1 | 12/2008 | King et al. |
| 2008/0319856 A1 | 12/2008 | Zito et al. |
| 2008/0319944 A1 | 12/2008 | Venolia et al. |
| 2009/0005011 A1 | 1/2009 | Christie et al. |
| 2009/0007017 A1 | 1/2009 | Anzures et al. |
| 2009/0046075 A1 | 2/2009 | Kim et al. |
| 2009/0049446 A1 | 2/2009 | Merten et al. |
| 2009/0089712 A1 | 4/2009 | Sato |
| 2009/0100383 A1 | 4/2009 | Sunday et al. |
| 2009/0103780 A1 | 4/2009 | Nishihara et al. |
| 2009/0106687 A1 | 4/2009 | De et al. |
| 2009/0109276 A1 | 4/2009 | Kim |
| 2009/0113347 A1 | 4/2009 | Hess et al. |
| 2009/0140960 A1 | 6/2009 | Mahowald |
| 2009/0158217 A1 | 6/2009 | Stuart |
| 2009/0164322 A1 | 6/2009 | Khan et al. |
| 2009/0179867 A1 | 7/2009 | Shim et al. |
| 2009/0187825 A1 | 7/2009 | Sandquist et al. |
| 2009/0213086 A1 | 8/2009 | Chae et al. |
| 2009/0228126 A1 | 9/2009 | Spielberg et al. |
| 2009/0228820 A1 | 9/2009 | Kim et al. |
| 2009/0228825 A1 | 9/2009 | Van Os et al. |
| 2009/0228938 A1 | 9/2009 | White et al. |
| 2009/0232129 A1 | 9/2009 | Wong et al. |
| 2009/0235155 A1 | 9/2009 | Ueda |
| 2009/0235162 A1 | 9/2009 | Nuccio et al. |
| 2009/0241054 A1 | 9/2009 | Hendricks |
| 2009/0249244 A1 | 10/2009 | Robinson et al. |
| 2009/0254867 A1 | 10/2009 | Farouki et al. |
| 2009/0259939 A1 | 10/2009 | Lockett et al. |
| 2009/0271381 A1 | 10/2009 | Beezer et al. |
| 2009/0305679 A1 | 12/2009 | Kim |
| 2009/0315841 A1 | 12/2009 | Cheng et al. |
| 2009/0319888 A1 | 12/2009 | Oygard |
| 2010/0009719 A1 | 1/2010 | Oh et al. |
| 2010/0011065 A1 | 1/2010 | Scherpa et al. |
| 2010/0023878 A1 | 1/2010 | Douris et al. |
| 2010/0023883 A1 | 1/2010 | Khazaka et al. |
| 2010/0029255 A1 | 2/2010 | Kim et al. |
| 2010/0044121 A1 | 2/2010 | Simon et al. |
| 2010/0045616 A1 | 2/2010 | Li et al. |
| 2010/0053212 A1 | 3/2010 | Kang et al. |
| 2010/0066763 A1 | 3/2010 | Macdougall et al. |
| 2010/0073454 A1 | 3/2010 | Lovhaugen et al. |
| 2010/0073455 A1 | 3/2010 | Iwabuchi et al. |
| 2010/0087230 A1 | 4/2010 | Peh et al. |
| 2010/0095240 A1 | 4/2010 | Shiplacoff et al. |
| 2010/0107078 A1 | 4/2010 | Hayashi |
| 2010/0109864 A1 | 5/2010 | Haartsen et al. |
| 2010/0115388 A1 | 5/2010 | Nguyen |
| 2010/0125807 A1 | 5/2010 | Easterday et al. |
| 2010/0159995 A1 | 6/2010 | Stallings et al. |
| 2010/0162108 A1 | 6/2010 | Stallings et al. |
| 2010/0174606 A1 | 7/2010 | Hoyle |
| 2010/0175018 A1 | 7/2010 | Petschnigg et al. |
| 2010/0177156 A1 | 7/2010 | Kim et al. |
| 2010/0189096 A1 | 7/2010 | Flynn et al. |
| 2010/0205563 A1 | 8/2010 | Haapsaari et al. |
| 2010/0211872 A1* | 8/2010 | Rolston .............. G06F 3/0488 715/830 |
| 2010/0241699 A1 | 9/2010 | Muthukumarasamy et al. |
| 2010/0242066 A1 | 9/2010 | Tseng |
| 2010/0247077 A1 | 9/2010 | Yamamoto et al. |
| 2010/0262714 A1 | 10/2010 | Hiie |
| 2010/0269039 A1 | 10/2010 | Pahlavan et al. |
| 2010/0281399 A1 | 11/2010 | Banker |
| 2010/0295789 A1 | 11/2010 | Shin et al. |
| 2010/0309284 A1 | 12/2010 | Samadani et al. |
| 2010/0311336 A1 | 12/2010 | Huotari et al. |
| 2010/0333045 A1 | 12/2010 | Guéziec et al. |

(56) References Cited

U.S. PATENT DOCUMENTS

| | | |
|---|---|---|
| 2011/0007029 A1 | 1/2011 | Ben-David |
| 2011/0010667 A1 | 1/2011 | Sakai et al. |
| 2011/0016417 A1 | 1/2011 | Shiplacoff et al. |
| 2011/0029864 A1 | 2/2011 | Stewart et al. |
| 2011/0029891 A1 | 2/2011 | Kim et al. |
| 2011/0030324 A1 | 2/2011 | Higgins |
| 2011/0032324 A1 | 2/2011 | George et al. |
| 2011/0041056 A1 | 2/2011 | Griffin et al. |
| 2011/0041096 A1 | 2/2011 | Larco et al. |
| 2011/0041102 A1 | 2/2011 | Kim |
| 2011/0065384 A1 | 3/2011 | Cader et al. |
| 2011/0074824 A1 | 3/2011 | Srinivasan et al. |
| 2011/0087431 A1 | 4/2011 | Gupta et al. |
| 2011/0087955 A1 | 4/2011 | Ho et al. |
| 2011/0088086 A1 | 4/2011 | Swink et al. |
| 2011/0091182 A1 | 4/2011 | Look et al. |
| 2011/0107241 A1 | 5/2011 | Moore |
| 2011/0117898 A1 | 5/2011 | Pereira et al. |
| 2011/0138295 A1 | 6/2011 | Momchilov et al. |
| 2011/0145691 A1 | 6/2011 | Noyes |
| 2011/0145692 A1 | 6/2011 | Noyes et al. |
| 2011/0178811 A1 | 7/2011 | Sheridan |
| 2011/0179386 A1 | 7/2011 | Shaffer et al. |
| 2011/0191710 A1 | 8/2011 | Jang et al. |
| 2011/0205333 A1 | 8/2011 | Wu et al. |
| 2011/0209099 A1 | 8/2011 | Hinckley et al. |
| 2011/0209104 A1 | 8/2011 | Hinckley et al. |
| 2011/0227810 A1 | 9/2011 | Mckinney et al. |
| 2011/0234746 A1 | 9/2011 | Saleh et al. |
| 2011/0235549 A1 | 9/2011 | Ahlers et al. |
| 2011/0242356 A1 | 10/2011 | Aleksic et al. |
| 2011/0246944 A1* | 10/2011 | Byrne ................... G06F 3/0489 715/835 |
| 2011/0249073 A1 | 10/2011 | Cranfill et al. |
| 2011/0249074 A1 | 10/2011 | Cranfill et al. |
| 2011/0252062 A1 | 10/2011 | Hanatani et al. |
| 2011/0252364 A1 | 10/2011 | Anzures et al. |
| 2011/0252368 A1 | 10/2011 | Anzures et al. |
| 2011/0252369 A1 | 10/2011 | Chaudhri |
| 2011/0252376 A1 | 10/2011 | Chaudhri et al. |
| 2011/0252377 A1 | 10/2011 | Anzures et al. |
| 2011/0252381 A1 | 10/2011 | Chaudhri |
| 2011/0261030 A1 | 10/2011 | Bullock |
| 2011/0275358 A1 | 11/2011 | Faenger |
| 2011/0281568 A1 | 11/2011 | Le Clech |
| 2011/0291945 A1 | 12/2011 | Ewing, Jr. et al. |
| 2011/0295879 A1 | 12/2011 | Logis et al. |
| 2011/0296333 A1 | 12/2011 | Bateman et al. |
| 2011/0296344 A1 | 12/2011 | Habib et al. |
| 2011/0296351 A1* | 12/2011 | Ewing, Jr. ............ G06F 3/04815 715/854 |
| 2011/0314398 A1 | 12/2011 | Yano |
| 2012/0023438 A1 | 1/2012 | Xia et al. |
| 2012/0023462 A1 | 1/2012 | Rosing et al. |
| 2012/0084644 A1 | 4/2012 | Robert et al. |
| 2012/0096069 A1 | 4/2012 | Chan |
| 2012/0096076 A1 | 4/2012 | Chan |
| 2012/0096344 A1 | 4/2012 | Ho et al. |
| 2012/0096386 A1 | 4/2012 | Baumann et al. |
| 2012/0102387 A1 | 4/2012 | Badoiu et al. |
| 2012/0105225 A1 | 5/2012 | Valtonen |
| 2012/0121185 A1 | 5/2012 | Zavesky |
| 2012/0129496 A1 | 5/2012 | Park et al. |
| 2012/0131470 A1 | 5/2012 | Wessling et al. |
| 2012/0136998 A1 | 5/2012 | Hough et al. |
| 2012/0143694 A1 | 6/2012 | Zargahi et al. |
| 2012/0159364 A1* | 6/2012 | Hyun ................... G06F 3/04815 715/848 |
| 2012/0159373 A1 | 6/2012 | Archer et al. |
| 2012/0159380 A1 | 6/2012 | Kocienda et al. |
| 2012/0166950 A1 | 6/2012 | Frumar et al. |
| 2012/0173383 A1 | 7/2012 | Badawiyeh et al. |
| 2012/0179970 A1 | 7/2012 | Hayes |
| 2012/0185355 A1 | 7/2012 | Kilroy |
| 2012/0185467 A1 | 7/2012 | Prager et al. |
| 2012/0192068 A1 | 7/2012 | Migos et al. |
| 2012/0192102 A1 | 7/2012 | Migos et al. |
| 2012/0192118 A1 | 7/2012 | Migos et al. |
| 2012/0201479 A1 | 8/2012 | Zhang et al. |
| 2012/0214552 A1 | 8/2012 | Sirpal et al. |
| 2012/0223890 A1 | 9/2012 | Borovsky et al. |
| 2012/0229591 A1 | 9/2012 | Lee |
| 2012/0240085 A1 | 9/2012 | Sim et al. |
| 2012/0266098 A1* | 10/2012 | Webber ................. G06F 3/0482 345/650 |
| 2012/0274550 A1 | 11/2012 | Campbell et al. |
| 2012/0284256 A1 | 11/2012 | Mahajan et al. |
| 2012/0284673 A1 | 11/2012 | Lamb et al. |
| 2012/0289217 A1 | 11/2012 | Riemer et al. |
| 2012/0290657 A1 | 11/2012 | Parks et al. |
| 2012/0290943 A1 | 11/2012 | Toney et al. |
| 2012/0293605 A1 | 11/2012 | Seferian et al. |
| 2012/0304111 A1* | 11/2012 | Queru ................... G06F 3/0482 715/781 |
| 2013/0005487 A1 | 1/2013 | Frazzini et al. |
| 2013/0014040 A1* | 1/2013 | Jagannathan ..... H04M 1/72586 715/765 |
| 2013/0019182 A1 | 1/2013 | Gil et al. |
| 2013/0041790 A1 | 2/2013 | Murugesan et al. |
| 2013/0046893 A1 | 2/2013 | Hauser et al. |
| 2013/0050263 A1 | 2/2013 | Khoe et al. |
| 2013/0054697 A1 | 2/2013 | Cha |
| 2013/0055113 A1 | 2/2013 | Chazin et al. |
| 2013/0061155 A1 | 3/2013 | Hon |
| 2013/0061175 A1 | 3/2013 | Matas et al. |
| 2013/0080525 A1 | 3/2013 | Aoki et al. |
| 2013/0102281 A1 | 4/2013 | Kanda et al. |
| 2013/0111342 A1 | 5/2013 | Alameh et al. |
| 2013/0111603 A1 | 5/2013 | Sakai et al. |
| 2013/0120254 A1 | 5/2013 | Mun et al. |
| 2013/0122961 A1 | 5/2013 | Choi et al. |
| 2013/0145303 A1 | 6/2013 | Prakash et al. |
| 2013/0151623 A1 | 6/2013 | Weiser et al. |
| 2013/0151959 A1 | 6/2013 | Flynn, III et al. |
| 2013/0166580 A1 | 6/2013 | Maharajh et al. |
| 2013/0173699 A1 | 7/2013 | Parks et al. |
| 2013/0185642 A1 | 7/2013 | Gammons |
| 2013/0191911 A1 | 7/2013 | Dellinger et al. |
| 2013/0212212 A1 | 8/2013 | Addepalli et al. |
| 2013/0283199 A1 | 10/2013 | Selig et al. |
| 2013/0283283 A1 | 10/2013 | Wang et al. |
| 2013/0298024 A1 | 11/2013 | Rhee et al. |
| 2013/0318158 A1 | 11/2013 | Teng et al. |
| 2013/0318249 A1 | 11/2013 | McDonough et al. |
| 2013/0321340 A1* | 12/2013 | Seo ..................... G06F 3/04883 345/174 |
| 2013/0325949 A1 | 12/2013 | Virani et al. |
| 2013/0325967 A1 | 12/2013 | Parks et al. |
| 2013/0332856 A1 | 12/2013 | Sanders et al. |
| 2013/0332886 A1 | 12/2013 | Cranfill et al. |
| 2014/0013271 A1 | 1/2014 | Moore et al. |
| 2014/0018053 A1 | 1/2014 | Cho et al. |
| 2014/0024340 A1 | 1/2014 | Raleigh |
| 2014/0032706 A1 | 1/2014 | Kuscher et al. |
| 2014/0047020 A1 | 2/2014 | Matus et al. |
| 2014/0047382 A1 | 2/2014 | Kim |
| 2014/0058941 A1 | 2/2014 | Moon et al. |
| 2014/0068477 A1 | 3/2014 | Roh |
| 2014/0082136 A1 | 3/2014 | Garcia et al. |
| 2014/0101597 A1 | 4/2014 | Bamford et al. |
| 2014/0105372 A1 | 4/2014 | Nowack et al. |
| 2014/0108084 A1 | 4/2014 | Bargetzi et al. |
| 2014/0122730 A1 | 5/2014 | Burch et al. |
| 2014/0136481 A1 | 5/2014 | Quan et al. |
| 2014/0149884 A1 | 5/2014 | Flynn, III et al. |
| 2014/0165012 A1 | 6/2014 | Shen et al. |
| 2014/0168696 A1 | 6/2014 | Matsuhara et al. |
| 2014/0171064 A1 | 6/2014 | Das |
| 2014/0173447 A1 | 6/2014 | Das |
| 2014/0201126 A1 | 7/2014 | Zadeh et al. |
| 2014/0201632 A1 | 7/2014 | Kunigita et al. |
| 2014/0215356 A1 | 7/2014 | Brander et al. |
| 2014/0280812 A1 | 9/2014 | Bealkowski et al. |
| 2014/0282103 A1 | 9/2014 | Crandall |

(56) References Cited

U.S. PATENT DOCUMENTS

| | | |
|---|---|---|
| 2014/0282110 A1 | 9/2014 | Chaudhri |
| 2014/0282208 A1 | 9/2014 | Chaudhri |
| 2014/0282240 A1 | 9/2014 | Flynn, III |
| 2014/0298253 A1* | 10/2014 | Jin ................. G06F 3/04883 715/790 |
| 2014/0320387 A1 | 10/2014 | Eriksson et al. |
| 2014/0320425 A1 | 10/2014 | Jeong et al. |
| 2014/0325447 A1 | 10/2014 | Jin et al. |
| 2014/0337791 A1* | 11/2014 | Agnetta ............. G06F 3/0483 715/784 |
| 2014/0351722 A1 | 11/2014 | Frederickson et al. |
| 2014/0354759 A1 | 12/2014 | Cranfill et al. |
| 2014/0359637 A1 | 12/2014 | Yan |
| 2014/0365929 A1 | 12/2014 | Ding |
| 2014/0368547 A1 | 12/2014 | Elings |
| 2014/0375577 A1 | 12/2014 | Yeh et al. |
| 2014/0380187 A1 | 12/2014 | Gardenfors et al. |
| 2015/0033149 A1 | 1/2015 | Kuchoor |
| 2015/0049591 A1 | 2/2015 | Adams et al. |
| 2015/0062158 A1 | 3/2015 | Hildreth et al. |
| 2015/0085057 A1 | 3/2015 | Ouyang et al. |
| 2015/0098309 A1* | 4/2015 | Adams ................. G04F 10/00 368/10 |
| 2015/0116363 A1 | 4/2015 | Monte et al. |
| 2015/0128042 A1* | 5/2015 | Churchill ............. G06F 3/017 715/718 |
| 2015/0163188 A1 | 6/2015 | Faaborg et al. |
| 2015/0169146 A1 | 6/2015 | Lalwani |
| 2015/0169182 A1 | 6/2015 | Khoe et al. |
| 2015/0193069 A1 | 7/2015 | Di Censo et al. |
| 2015/0193392 A1 | 7/2015 | Greenblatt et al. |
| 2015/0199082 A1* | 7/2015 | Scholler ............. G06F 3/0485 715/830 |
| 2015/0205488 A1* | 7/2015 | Yi ................. G06F 3/04842 715/769 |
| 2015/0304366 A1 | 10/2015 | Bader-Natal et al. |
| 2015/0304413 A1 | 10/2015 | Park |
| 2015/0309689 A1* | 10/2015 | Jin ................. G06F 3/04817 715/765 |
| 2015/0319144 A1 | 11/2015 | Barton et al. |
| 2015/0324067 A1* | 11/2015 | Cabral ............. G06F 3/0338 715/811 |
| 2015/0332031 A1 | 11/2015 | Mistry et al. |
| 2015/0339007 A1 | 11/2015 | Yoshizawa et al. |
| 2015/0339466 A1 | 11/2015 | Gao et al. |
| 2015/0347010 A1 | 12/2015 | Yang et al. |
| 2015/0350296 A1 | 12/2015 | Yang et al. |
| 2015/0350297 A1 | 12/2015 | Yang et al. |
| 2015/0358484 A1 | 12/2015 | Permude |
| 2015/0365306 A1 | 12/2015 | Chaudhri et al. |
| 2015/0370529 A1 | 12/2015 | Zambetti et al. |
| 2015/0373065 A1 | 12/2015 | Holmquist et al. |
| 2016/0048296 A1 | 2/2016 | Gan et al. |
| 2016/0059864 A1 | 3/2016 | Feit et al. |
| 2016/0062567 A1 | 3/2016 | Yang et al. |
| 2016/0062589 A1 | 3/2016 | Wan et al. |
| 2016/0065708 A1 | 3/2016 | Yang et al. |
| 2016/0072861 A1 | 3/2016 | Woolsey et al. |
| 2016/0139785 A1 | 5/2016 | Griffin et al. |
| 2016/0142450 A1 | 5/2016 | Paul et al. |
| 2016/0170608 A1 | 6/2016 | Zambetti et al. |
| 2016/0180259 A1 | 6/2016 | Marianko et al. |
| 2016/0210602 A1 | 7/2016 | Siddique et al. |
| 2016/0299679 A1* | 10/2016 | Park ................. G06F 1/163 |
| 2016/0306328 A1* | 10/2016 | Ko ................. G04C 17/00 |
| 2016/0308920 A1 | 10/2016 | Brunsch et al. |
| 2016/0316038 A1 | 10/2016 | Jolfaei |
| 2016/0327911 A1 | 11/2016 | Eim et al. |
| 2016/0364106 A1 | 12/2016 | Koum et al. |
| 2017/0006162 A1 | 1/2017 | Bargetzi et al. |
| 2017/0024100 A1 | 1/2017 | Pieper et al. |
| 2017/0024226 A1 | 1/2017 | Yan |
| 2017/0034583 A1 | 2/2017 | Long et al. |
| 2017/0126592 A1 | 5/2017 | El |
| 2017/0212667 A1 | 7/2017 | Miyazaki |
| 2017/0357917 A1 | 12/2017 | Holmes et al. |
| 2017/0359285 A1 | 12/2017 | Weinig et al. |
| 2017/0359461 A1 | 12/2017 | De Vries et al. |
| 2017/0367484 A1 | 12/2017 | Salvoni et al. |
| 2017/0373868 A1 | 12/2017 | Deets, Jr. |
| 2018/0013799 A1 | 1/2018 | Davies |
| 2018/0081522 A1 | 3/2018 | Greenberg et al. |
| 2018/0081538 A1* | 3/2018 | Kim ................. G06F 3/04883 |
| 2018/0095616 A1 | 4/2018 | Valdivia et al. |
| 2018/0124128 A1 | 5/2018 | Faulkner et al. |
| 2018/0131732 A1 | 5/2018 | Aronoff et al. |
| 2018/0150433 A1 | 5/2018 | Sowden et al. |
| 2018/0160072 A1 | 6/2018 | Cranfill et al. |
| 2018/0191965 A1 | 7/2018 | Faulkner et al. |
| 2018/0204111 A1 | 7/2018 | Zadeh et al. |
| 2018/0205797 A1 | 7/2018 | Faulkner |
| 2018/0309801 A1 | 10/2018 | Rathod |
| 2018/0321842 A1* | 11/2018 | Lee ................. H04M 1/725 |
| 2018/0359293 A1 | 12/2018 | Faulkner et al. |
| 2018/0367484 A1 | 12/2018 | Rodriguez et al. |
| 2018/0375676 A1 | 12/2018 | Bader-Natal et al. |
| 2019/0005419 A1 | 1/2019 | Howard |
| 2019/0034849 A1 | 1/2019 | Romaine et al. |
| 2019/0102049 A1 | 4/2019 | Anzures et al. |
| 2019/0149887 A1 | 5/2019 | Williams et al. |
| 2019/0208028 A1 | 7/2019 | Larabie-Belanger |
| 2019/0236142 A1 | 8/2019 | Balakrishnan et al. |
| 2019/0297039 A1 | 9/2019 | Rodriguez et al. |
| 2019/0342519 A1 | 11/2019 | Van Os et al. |
| 2019/0347181 A1 | 11/2019 | Cranfill et al. |
| 2019/0361694 A1 | 11/2019 | Gordon et al. |
| 2019/0370805 A1 | 12/2019 | Van Os et al. |
| 2020/0034033 A1 | 1/2020 | Chaudhri et al. |
| 2020/0059628 A1 | 2/2020 | Cranfill et al. |
| 2020/0112690 A1 | 4/2020 | Harrison et al. |
| 2020/0183548 A1 | 6/2020 | Anzures et al. |
| 2020/0226896 A1 | 7/2020 | Robertson et al. |
| 2020/0274726 A1 | 8/2020 | Setteboun et al. |
| 2020/0296329 A1 | 9/2020 | Tang et al. |
| 2020/0322479 A1 | 10/2020 | De Vries et al. |
| 2020/0356063 A1 | 11/2020 | Guzman et al. |
| 2021/0136129 A1 | 5/2021 | Ponnusamy et al. |
| 2021/0152503 A1 | 5/2021 | Rodriguez et al. |
| 2021/0182169 A1 | 6/2021 | Mardente et al. |
| 2021/0217106 A1 | 7/2021 | Hauser et al. |
| 2021/0360192 A1 | 11/2021 | Cranfill et al. |
| 2021/0409359 A1 | 12/2021 | Eirinberg et al. |
| 2022/0050578 A1 | 2/2022 | Waldman et al. |
| 2022/0100362 A1 | 3/2022 | Kim |
| 2022/0100812 A1 | 3/2022 | Anvaripour et al. |
| 2022/0122089 A1 | 4/2022 | Bonilla Kuhlmann et al. |
| 2022/0163996 A1 | 5/2022 | Yang et al. |
| 2022/0207840 A1 | 6/2022 | Cansizoglu et al. |
| 2022/0253136 A1 | 8/2022 | Holder et al. |
| 2022/0254074 A1 | 8/2022 | Berliner et al. |
| 2022/0263940 A1 | 8/2022 | De Vries et al. |
| 2022/0278992 A1 | 9/2022 | Baker et al. |
| 2022/0365739 A1 | 11/2022 | Chang et al. |
| 2022/0365740 A1 | 11/2022 | Chang et al. |
| 2022/0368548 A1 | 11/2022 | Chang et al. |
| 2022/0368659 A1 | 11/2022 | Chang et al. |
| 2022/0368742 A1 | 11/2022 | Chang et al. |
| 2022/0374136 A1 | 11/2022 | Chang et al. |
| 2023/0246857 A1 | 8/2023 | Boucheron et al. |
| 2023/0262196 A1 | 8/2023 | Cranfill et al. |
| 2023/0370507 A1 | 11/2023 | Chang et al. |
| 2023/0393616 A1 | 12/2023 | Chao et al. |
| 2024/0036804 A1 | 2/2024 | Chang et al. |
| 2024/0103677 A1 | 3/2024 | Mckenzie et al. |
| 2024/0103678 A1 | 3/2024 | Dryer et al. |
| 2024/0111333 A1 | 4/2024 | Yang et al. |
| 2024/0163365 A1 | 5/2024 | De Vries et al. |

FOREIGN PATENT DOCUMENTS

| | | |
|---|---|---|
| CN | 1525723 A | 9/2004 |
| CN | 1801926 A | 7/2006 |
| CN | 1918533 A | 2/2007 |

(56) References Cited

FOREIGN PATENT DOCUMENTS

| | | |
|---|---|---|
| CN | 1985319 A | 6/2007 |
| CN | 101226444 A | 7/2008 |
| CN | 101296356 A | 10/2008 |
| CN | 101356493 A | 1/2009 |
| CN | 101409743 A | 4/2009 |
| CN | 101535938 A | 9/2009 |
| CN | 101828166 A | 9/2010 |
| CN | 102262506 A | 11/2011 |
| CN | 102439558 A | 5/2012 |
| CN | 102707994 A | 10/2012 |
| CN | 102750086 A | 10/2012 |
| CN | 103250138 A | 8/2013 |
| CN | 103336651 A | 10/2013 |
| CN | 103582873 A | 2/2014 |
| CN | 103765385 A | 4/2014 |
| CN | 104182123 A | 12/2014 |
| CN | 104834439 A | 8/2015 |
| CN | 105094551 A | 11/2015 |
| CN | 105308634 A | 2/2016 |
| CN | 105637451 A | 6/2016 |
| CN | 108933965 A | 12/2018 |
| CN | 110456971 A | 11/2019 |
| CN | 111108740 A | 5/2020 |
| CN | 112416223 A | 2/2021 |
| EP | 0483777 A2 | 5/1992 |
| EP | 0584392 A1 | 3/1994 |
| EP | 1215575 A2 | 6/2002 |
| EP | 1517228 A2 | 3/2005 |
| EP | 1760584 A1 | 3/2007 |
| EP | 1903791 A2 | 3/2008 |
| EP | 1986431 A2 | 10/2008 |
| EP | 2151745 A2 | 2/2010 |
| EP | 2600584 A1 | 6/2013 |
| EP | 2682850 A1 | 1/2014 |
| EP | 2703974 A1 | 3/2014 |
| EP | 2725473 A1 | 4/2014 |
| EP | 2770708 A1 | 8/2014 |
| EP | 2446619 B1 | 10/2015 |
| EP | 3091421 A2 | 11/2016 |
| EP | 3163866 B1 | 5/2020 |
| JP | 6-110881 A | 4/1994 |
| JP | 6-113297 A | 4/1994 |
| JP | 6-276335 A | 9/1994 |
| JP | 6-276515 A | 9/1994 |
| JP | 7-135594 A | 5/1995 |
| JP | 7-325700 A | 12/1995 |
| JP | 8-76926 A | 3/1996 |
| JP | 9-182046 A | 7/1997 |
| JP | 9-247655 A | 9/1997 |
| JP | 10-240488 A | 9/1998 |
| JP | 2000-40158 A | 2/2000 |
| JP | 2000-200092 A | 7/2000 |
| JP | 2000-242390 A | 9/2000 |
| JP | 2000-283772 A | 10/2000 |
| JP | 2001-101202 A | 4/2001 |
| JP | 2001-169166 A | 6/2001 |
| JP | 2002-251365 A | 9/2002 |
| JP | 2002-288125 A | 10/2002 |
| JP | 2002-320140 A | 10/2002 |
| JP | 2002-351802 A | 12/2002 |
| JP | 2003-134382 A | 5/2003 |
| JP | 2003-189168 A | 7/2003 |
| JP | 2003-195998 A | 7/2003 |
| JP | 2003-274376 A | 9/2003 |
| JP | 2003-526820 A | 9/2003 |
| JP | 2003-299050 A | 10/2003 |
| JP | 2003-348444 A | 12/2003 |
| JP | 2004-187273 A | 7/2004 |
| JP | 2004-193860 A | 7/2004 |
| JP | 2004-221738 A | 8/2004 |
| JP | 2005-45744 A | 2/2005 |
| JP | 2005-159567 A | 6/2005 |
| JP | 2005-260289 A | 9/2005 |
| JP | 2005-286445 A | 10/2005 |
| JP | 2005-332368 A | 12/2005 |
| JP | 2006-135495 A | 5/2006 |
| JP | 2006-166414 A | 6/2006 |
| JP | 2006-222822 A | 8/2006 |
| JP | 2006-245732 A | 9/2006 |
| JP | 2006-246019 A | 9/2006 |
| JP | 2006-254350 A | 9/2006 |
| JP | 2006-319742 A | 11/2006 |
| JP | 2007-88630 A | 4/2007 |
| JP | 2007-140060 A | 6/2007 |
| JP | 2007-200329 A | 8/2007 |
| JP | 2007-201727 A | 8/2007 |
| JP | 2007-274034 A | 10/2007 |
| JP | 2007-282263 A | 10/2007 |
| JP | 2007-300452 A | 11/2007 |
| JP | 2008-28586 A | 2/2008 |
| JP | 2008-125105 A | 5/2008 |
| JP | 2008-136119 A | 6/2008 |
| JP | 2008-533838 A | 8/2008 |
| JP | 2008-276801 A | 11/2008 |
| JP | 2008-289014 A | 11/2008 |
| JP | 2009-80710 A | 4/2009 |
| JP | 2009-159253 A | 7/2009 |
| JP | 2009-188975 A | 8/2009 |
| JP | 2009-232290 A | 10/2009 |
| JP | 2009-296577 A | 12/2009 |
| JP | 2009-296583 A | 12/2009 |
| JP | 2010-15239 A | 1/2010 |
| JP | 2010-97353 A | 4/2010 |
| JP | 2010-511939 A | 4/2010 |
| JP | 2010-109789 A | 5/2010 |
| JP | 2010-522935 A | 7/2010 |
| JP | 2010-245940 A | 10/2010 |
| JP | 2011-118662 A | 6/2011 |
| JP | 2012-168966 A | 9/2012 |
| JP | 2012-215938 A | 11/2012 |
| JP | 2012-244340 A | 12/2012 |
| JP | 2013-25357 A | 2/2013 |
| JP | 2013-74499 A | 4/2013 |
| JP | 2013-93699 A | 5/2013 |
| JP | 2013-105468 A | 5/2013 |
| JP | 2013-530433 A | 7/2013 |
| JP | 2013-191065 A | 9/2013 |
| JP | 2014-503861 A | 2/2014 |
| JP | 2014-44724 A | 3/2014 |
| JP | 2015-520456 A | 7/2015 |
| JP | 2016-53929 A | 4/2016 |
| JP | 2017-532645 A | 11/2017 |
| JP | 2018-136828 A | 8/2018 |
| JP | 2019-114282 A | 7/2019 |
| JP | 2020-510929 A | 4/2020 |
| KR | 1997-0031883 A | 6/1997 |
| KR | 1999-0044201 A | 6/1999 |
| KR | 10-2004-0016688 A | 2/2004 |
| KR | 10-2004-0045338 A | 6/2004 |
| KR | 10-2005-0054684 A | 6/2005 |
| KR | 10-2006-0031959 A | 4/2006 |
| KR | 10-2006-0116902 A | 11/2006 |
| KR | 10-2007-0111270 A | 11/2007 |
| KR | 10-2008-0057326 A | 6/2008 |
| KR | 10-2008-0096042 A | 10/2008 |
| KR | 10-2009-0002641 A | 1/2009 |
| KR | 10-2009-0004176 A | 1/2009 |
| KR | 10-2009-0017901 A | 2/2009 |
| KR | 10-2009-0017906 A | 2/2009 |
| KR | 10-2009-0036226 A | 4/2009 |
| KR | 10-2009-0042499 A | 4/2009 |
| KR | 10-2009-0122805 A | 12/2009 |
| KR | 10-2009-0126516 A | 12/2009 |
| KR | 10-2012-0003323 A | 1/2012 |
| KR | 10-2012-0088746 A | 8/2012 |
| KR | 10-2012-0100433 A | 9/2012 |
| KR | 10-2013-0063019 A | 6/2013 |
| KR | 10-2013-0075783 A | 7/2013 |
| KR | 10-2013-0082190 A | 7/2013 |
| KR | 10-2013-0141688 A | 12/2013 |
| KR | 10-2014-0016244 A | 2/2014 |
| KR | 10-2014-0026263 A | 3/2014 |
| KR | 10-2014-0043370 A | 4/2014 |
| KR | 10-1989433 B1 | 6/2019 |

(56) References Cited

FOREIGN PATENT DOCUMENTS

| TW | 1321955 B | 3/2010 |
|---|---|---|
| TW | 201415345 A | 4/2014 |
| TW | 201416959 A | 5/2014 |
| WO | 02/11022 A2 | 2/2002 |
| WO | 2003/077553 A1 | 9/2003 |
| WO | 2005/086159 A2 | 9/2005 |
| WO | 2005/109829 A1 | 11/2005 |
| WO | 2006/048028 A1 | 5/2006 |
| WO | 2006/063343 A2 | 6/2006 |
| WO | 2007/002621 A2 | 1/2007 |
| WO | 2007/102110 A2 | 9/2007 |
| WO | 2008/030779 A2 | 3/2008 |
| WO | 2008/030879 A2 | 3/2008 |
| WO | 2008/040566 A1 | 4/2008 |
| WO | 2008/067498 A2 | 6/2008 |
| WO | 2008/090902 A1 | 7/2008 |
| WO | 2009/143076 A2 | 11/2009 |
| WO | 2010/001672 A1 | 1/2010 |
| WO | 2010/134729 A2 | 11/2010 |
| WO | 2011/126502 A1 | 10/2011 |
| WO | 2012/028773 A1 | 3/2012 |
| WO | 2012/051052 A1 | 4/2012 |
| WO | 2012/079530 A1 | 6/2012 |
| WO | 2012/087939 A1 | 6/2012 |
| WO | 2012/103117 A1 | 8/2012 |
| WO | 2012/126078 A1 | 9/2012 |
| WO | 2012/154748 A1 | 11/2012 |
| WO | 2012/170446 A2 | 12/2012 |
| WO | 2013/097896 A1 | 7/2013 |
| WO | 2013/132144 A1 | 9/2013 |
| WO | 2013/173838 A2 | 11/2013 |
| WO | 2014/197279 A1 | 12/2014 |
| WO | 2014/200730 A1 | 12/2014 |
| WO | 2015/192085 A2 | 12/2015 |
| WO | 2016/022204 A1 | 2/2016 |
| WO | 2019/067131 A1 | 4/2019 |
| WO | 2019/217009 A1 | 11/2019 |
| WO | 2021/112983 A1 | 6/2021 |

OTHER PUBLICATIONS

Screen captures from YouTube clip entitled "Samsung Gear S3 Apps Launcher" 1 page, published on Feb. 5, 2017 by Trish's World. Retrieved from Internet <https://www.youtube.com/watch?v=zlamYA-4XSQ> (Year: 2017).*

Screen captures from YouTube clip entitled "Samsung Gear S3 App launcher widget—App review" 11 pages, published on Dec. 26, 2016 by Mr Analytical. Retrieved from Internet (Year: 2016).*

Office Action received for Australian Patent Application No. 2016266010, mailed on May 4, 2018, 4 pages.

Extended European Search Report received for European Patent Application No. 18185408.4, mailed on Oct. 17, 2018, 10 Pages.

Esther, Instructions for Kobo Books: How to change to scrolling mode and do table of contents navigation—Google Groups, XP055513050, Retrieved from the Internet: URL:https://groups.google.com/forum/print/msg/viphone/-dkqODh_31A/8acJK2dGPe8J?ctz=4607561_48_52_123900_48_436380 [retrieved on Oct. 5, 2018], Aug. 28, 2010, 3 Pages.

International Search Report and Written Opinion received for PCT Patent Application No. PCT/US2018/032396, mailed on Jul. 30, 2018, 13 pages.

Office Action received for Australian Patent Application No. 2016266010, mailed on Aug. 23, 2018, 4 pages.

Decision to Grant received for European Patent Application No. 12704175.4, mailed on Jul. 19, 2018, 2 pages.

Final Office Action received for U.S. Appl. No. 14/641,304, mailed on Jul. 24, 2018, 19 pages.

Notice of Allowance received for Taiwanese Patent Application No. 106144804, mailed on Jun. 27, 2018, 6 pages (2 pages of English Translation and 4 pages of Official copy).

Office Action received for Korean Patent Application No. 10-2018-0035949, mailed on Jun. 20, 2018, 9 pages (4 pages of English Translation and 5 pages of Official Copy).

"Q Pair, Posting Of A Blog", Online Available at: <"http://www.leaderyou.co.kr/2595">, Dec. 7, 2013, 24 pages (Official Copy Only) (See Communication under 37 CFR § 1.98(a) (3)).

Intention to Grant received for European Patent Application No. 15713062.6, mailed on Oct. 8, 2018, 8 pages.

Non-Final Office Action received for U.S. Appl. No. 14/641,298, mailed on Sep. 19, 2018, 41 pages.

Office Action received for Japanese Patent Application No. 2017-101107, mailed on Sep. 7, 2018, 14 pages (7 pages of English Translation and 7 pages of Official Copy).

International Search Report and Written Opinion received for PCT Patent Application No. PCT/US2017/035326, mailed on Oct. 5, 2017, 22 pages.

Invitation to Pay Additional Fee received for PCT Patent Application No. PCT/US2017/035326, mailed on Aug. 7, 2017, 2 pages.

Notice of Allowance received for Taiwanese Patent Application No. 104117042, mailed on Nov. 17, 2017, 5 pages (2 Pages of English Translation and 3 Pages of Official Copy).

Notice of Allowance received for U.S. Appl. No. 14/641,289, mailed on Dec. 12, 2017, 5 pages.

Office Action received for Australian Patent Application No. 2016266010, mailed on Nov. 30, 2017, 5 pages.

Office Action received for European Patent Application No. 15713062.6, mailed on Dec. 6, 2017, 7 pages.

Office Action received for Chinese Patent Application No. 201510288981.9, mailed on Jul. 3, 2018, 19 pages (8 pages of English Translation and 11 pages of Official Copy).

Hanley, Ryan, "Aero Effects", Windows 7 Editions, 2010, 13 pages.

Non-Final Office Action received for U.S. Appl. No. 15/608,866, mailed on Nov. 2, 2018, 46 pages.

Intention to Grant received for European Patent Application No. 12704175.4, mailed on Mar. 22, 2018, 8 pages.

Notice of Allowance received for Korean Patent Application No. 10-2015-0072162, mailed on Dec. 27, 2017, 4 pages (2 pages of English Translation and 2 pages of Official copy).

Advisory Action received for U.S. Appl. No. 10/179,775, mailed on Oct. 13, 2015, 4 pages.

Advisory Action received for U.S. Appl. No. 10/179,775, mailed on Oct. 14, 2010, 2 pages.

Advisory Action received for U.S. Appl. No. 10/179,775, mailed on Sep. 15, 2009, 2 pages.

Advisory Action received for U.S. Appl. No. 12/890,499, mailed on Jan. 11, 2016, 3 pages.

Advisory Action received for U.S. Appl. No. 13/077,850, mailed on Apr. 24, 2014, 3 pages.

Advisory Action received for U.S. Appl. No. 13/077,855, mailed on Jun. 15, 2016, 4 pages.

Advisory Action received for U.S. Appl. No. 13/077,862, mailed on Apr. 7, 2016, 3 pages.

Advisory Action received for U.S. Appl. No. 13/077,874, mailed on Aug. 19, 2016, 3 pages.

Apple, "iPhone User's Guide", Available at: <http://mesnotices.20minutes.fr/manuel-notice-mode-emploi/APPLE/IPHONE%2D%5FE#>, 2007, 137 pages.

Baig, ED, "Palm Pre: The Missing Manual", Safari Books Online, Available at <http://my.safaribooksonline.com/book/operating-systems/0596528264>, Aug. 27, 2009, 16 pages.

Benge et al., "Designing Custom Controls", IBM OS/2 Developer, The Magazine for Advanced Software Development, vol. 5, No. 2, 1993, pp. 72-85.

Chan, Christine, "Handoff Your Browser to Your iPhone or iPad! Plus A Chance To Win A Copy!", Apr. 12, 2011, 2 pages.

"Chapter 13: Menus", Apple Human Interface Guidelines, Available at: <https://developer.apple.com/library/mac/documentation/UserExperience/Conceptual/OSXHIGuidelines/index.html>, Aug. 20, 2009, pp. 165-190.

Cuyamaca LRC Computer Labs, "Topics in CommonSpace Application", Available at: <http://www.cuyamaca.net/librarylab/Technical%20Help/cmspace.asp>, Retrieved on May 19, 2014, 16 pages.

(56) References Cited

OTHER PUBLICATIONS

Decision to Grant received for European Patent Application No. 10799259.6, mailed on Aug. 31, 2017, 2 pages.
Evaluation Report for Utility Model Patent received for Chinese Patent Application No. 201620051290.7, completed on Sep. 19, 2016, 11 pages (6 pages of English translation and 5 pages of Official Copy).
Fahey, M., "The iPad Blows Up iPhone Apps Real Good", Available at <www.kotaku.com.au/2010/01/the-ipad-blows-up-iphone-apps-real-good/>, Jan. 28, 2010, 3 pages.
Fehily, C., "Visual QuickStart Guide: Microsoft Windows 7", Peachpit Press, Sep. 8, 2009, 9 pages.
Final Office Action received for U.S. Appl. No. 10/179,775, mailed on Apr. 5, 2006, 14 pages.
Final Office Action received for U.S. Appl. No. 10/179,775, mailed on Aug. 16, 2013, 12 pages.
Final Office Action received for U.S. Appl. No. 10/179,775, mailed on Jul. 8, 2009, 11 pages.
Final Office Action received for U.S. Appl. No. 10/179,775, mailed on Jun. 22, 2010, 13 pages.
Final Office Action received for U.S. Appl. No. 10/179,775, mailed on May 22, 2015, 15 pages.
Final Office Action received for U.S. Appl. No. 10/179,775, mailed on Oct. 8, 2008, 12 pages.
Final Office Action received for U.S. Appl. No. 12/843,814, mailed on Apr. 23, 2015, 28 pages.
Final Office Action received for U.S. Appl. No. 12/843,814, mailed on Jan. 31, 2014, 20 pages.
Final Office Action received for U.S. Appl. No. 12/843,814, mailed on Nov. 14, 2012, 13 pages.
Final Office Action received for U.S. Appl. No. 12/890,472, mailed on Feb. 6, 2013, 10 pages.
Final Office Action received for U.S. Appl. No. 12/890,482, mailed on Sep. 12, 2013, 10 pages.
Final Office Action received for U.S. Appl. No. 12/890,489, mailed on Aug. 14, 2013, 9 pages.
Final Office Action received for U.S. Appl. No. 12/890,499, mailed on May 22, 2017, 17 pages.
Final Office Action received for U.S. Appl. No. 12/890,499, mailed on Jul. 8, 2013, 17 pages.
Final Office Action received for U.S. Appl. No. 12/890,499, mailed on Oct. 19, 2015, 14 pages.
Final Office Action received for U.S. Appl. No. 13/077,850, mailed on Nov. 7, 2013, 14 pages.
Final Office Action received for U.S. Appl. No. 13/077,855, mailed on Mar. 17, 2014, 11 pages.
Final Office Action received for U.S. Appl. No. 13/077,855, mailed on Nov. 7, 2013, 14 pages.
Final Office Action received for U.S. Appl. No. 13/077,855, mailed on Mar. 24, 2016, 19 pages.
Final Office Action received for U.S. Appl. No. 13/077,862, mailed on Nov. 8, 2013, 15 pages.
Final Office Action received for U.S. Appl. No. 13/077,862, mailed on Oct. 22, 2015, 16 pages.
Final Office Action received for U.S. Appl. No. 13/077,867, mailed on May 23, 2013, 10 pages.
Final Office Action received for U.S. Appl. No. 13/077,874, mailed on Dec. 3, 2014, 23 pages.
Final Office Action received for U.S. Appl. No. 13/077,874, mailed on May 5, 2016, 26 pages.
Final Office Action received for U.S. Appl. No. 13/333,909, mailed on Dec. 5, 2013, 24 pages.
Final Office Action received for U.S. Appl. No. 14/641,289, mailed on Jul. 1, 2016, 32 pages.
Final Office Action received for U.S. Appl. No. 14/641,298, mailed on Oct. 4, 2017, 30 pages.
G Pad, "LG's Latest Uls That Shine More Lightly On The G-Pad", Online Available at: <http://bungq.com/1014>, Nov. 11, 2013, 38 pages (2 pages of English Translation and 36 pages of Official Copy).

Harris et al., "Inside WordPerfect 6 for Windows", New Riders Publishing, 1994, pp. 1104-1108.
Intention to Grant received for European Patent Application No. 10799259.6, mailed on Apr. 20, 2017, 8 pages.
International Preliminary Report on Patentability received for PCT Patent Application No. PCT/US2010/062314, issued on Jul. 10, 2012, 14 pages.
International Preliminary Report on Patentability received for PCT Patent Application No. PCT/US2012/022401, mailed on Aug. 8, 2013, 12 pages.
International Preliminary Report on Patentability received for PCT Patent Application No. PCT/US2015/019306, mailed on Dec. 15, 2016, 10 pages.
International Preliminary Report on Patentability Received for PCT Patent Application No. PCT/US2015/019309, mailed on Dec. 15, 2016, 10 pages.
International Search Report and Written Opinion received for PCT Patent Application No. PCT/US2010/062314, mailed on Jun. 22, 2011, 17 pages.
International Search Report and Written Opinion received for PCT Patent Application No. PCT/US2012/022401, Jul. 6, 2012, 16 pages.
International Search Report and Written Opinion received for PCT Patent Application No. PCT/US2015/019306, mailed on Jun. 17, 2015, 15 pages.
International Search Report and Written Opinion received for PCT Application No. PCT/US2015/019309, mailed on Jun. 25, 2015, 15 pages.
International Search Report received for PCT Patent Application No. PCT/US95/11025, mailed on Jan. 3, 1996, 3 pages.
Invitation to Pay Additional Fees received for PCT Patent Application No. PCT/US2012/022401, May 4, 2012, 8 pages.
Kimura, Ryoji, "Keynote presentation practice guide for iPad & iPhone", K.K. Rutles, first edition, Feb. 29, 2012, 4 pages. {See Communication under 37 CFR § 1.98(a) (3)}.
King, Adrian, "Inside Windows 95", Microsoft Press, Aug. 1994, pp. 176-182.
"Microsoft Windows 3.1", Available at: <http://www.guidebookgallery.org/screenshots/win31>, 1992, pp. 1-31.
Non-Final Office Action received for U.S. Appl. No. 10/179,775, mailed on Aug. 14, 2014, 13 pages.
Non-Final Office Action received for U.S. Appl. No. 10/179,775, mailed on Dec. 23, 2009, 13 Pages.
Non-Final Office Action received for U.S. Appl. No. 10/179,775, mailed on Dec. 23, 2015, 14 Pages.
Non-Final Office Action received for U.S. Appl. No. 10/179,775, mailed on Jan. 22, 2009, 11 pages.
Non-Final Office Action received for U.S. Appl. No. 10/179,775, mailed on Jul. 2, 2007, 12 pages.
Non-Final Office Action received for U.S. Appl. No. 10/179,775, mailed on Mar. 14, 2008, 11 pages.
Non-Final Office Action received for U.S. Appl. No. 10/179,775, mailed on Mar. 28, 2013, 11 pages.
Non-Final Office Action received for U.S. Appl. No. 10/179,775, mailed on Oct. 12, 2005, 16 Pages.
Non-Final Office Action received for U.S. Appl. No. 12/789,436, mailed on Jun. 25, 2012, 23 pages.
Non-Final Office Action received for U.S. Appl. No. 12/843,814, mailed on Apr. 27, 2012, 26 pages.
Non-Final Office Action received for U.S. Appl. No. 12/843,814, mailed on May 28, 2013, 17 pages.
Non-Final Office Action received for U.S. Appl. No. 12/843,814, mailed on Oct. 8, 2014, 14 pages.
Non-Final Office Action received for U.S. Appl. No. 12/890,472, mailed on Jul. 5, 2012, 9 pages.
Non-Final Office Action received for U.S. Appl. No. 12/890,482, mailed on Sep. 27, 2012, 11 pages.
Non-Final Office Action received for U.S. Appl. No. 12/890,489, mailed on Nov. 6, 2014, 22 pages.
Non-Final Office Action received for U.S. Appl. No. 12/890,489, mailed on Nov. 30, 2012, 8 pages.
Non-Final Office Action received for U.S. Appl. No. 12/890,499, mailed on Apr. 6, 2015, 14 pages.

(56) References Cited

OTHER PUBLICATIONS

Non-Final Office Action received for U.S. Appl. No. 12/890,499, mailed on Nov. 1, 2016, 16 pages.
Non-Final Office Action received for U.S. Appl. No. 12/890,499, mailed on Nov. 26, 2012, 12 pages.
Non-Final Office Action received for U.S. Appl. No. 12/890,499, mailed on Sep. 11, 2014, 11 pages.
Non-Final Office Action received for U.S. Appl. No. 13/077,850, mailed on Mar. 28, 2013, 15 pages.
Non-Final Office Action received for U.S. Appl. No. 13/077,850, mailed on Sep. 10, 2015, 14 pages.
Non-Final Office Action received for U.S. Appl. No. 13/077,855, mailed on Aug. 13, 2015, 13 pages.
Non-Final Office Action received for U.S. Appl. No. 13/077,855, mailed on Mar. 28, 2013, 15 pages.
Non-Final Office Action received for U.S. Appl. No. 13/077,862, mailed on Dec. 29, 2014, 11 pages.
Non-Final Office Action received for U.S. Appl. No. 13/077,862, mailed on Mar. 15, 2013, 10 pages.
Non-Final Office Action received for U.S. Appl. No. 13/077,867, mailed on Dec. 21, 2012, 9 pages.
Non-Final Office Action received for U.S. Appl. No. 13/077,867, mailed on Jul. 20, 2012, 10 pages.
Non-Final Office Action received for U.S. Appl. No. 13/077,874, mailed on Jun. 19, 2014, 15 pages.
Non-Final Office Action received for U.S. Appl. No. 13/077,874, mailed on Dec. 3, 2015, 23 pages.
Non-Final Office Action received for U.S. Appl. No. 13/333,909, mailed on Mar. 19, 2013, 18 pages.
Non-Final Office Action received for U.S. Appl. No. 14/456,852, mailed on Jul. 1, 2015, 19 pages.
Non-Final Office Action received for U.S. Appl. No. 14/641,298, mailed on Mar. 6, 2017, 26 pages.
Non Final Office Action received for U.S. Appl. No. 14/641,289, mailed on Mar. 11, 2016, 26 pages.
Non Final Office Action received for U.S. Appl. No. 14/641,289, mailed on Jul. 16, 2015, 31 pages.
Non-Final Office Action received for U.S. Appl. No. 14/641,304, mailed on Sep. 11, 2017, 18 pages.
Notice of Acceptance received for Australian Patent Application No. 2010339636, mailed on Jul. 3, 2014, 2 pages.
Notice of Acceptance received for Australian Patent Application No. 2012209199, mailed on Jan. 27, 2016, 3 pages.
Notice of Acceptance received for Australian Patent Application No. 2015201884, mailed on Oct. 4, 2016, 3 pages.
Notice of Allowance received for Australian Patent Application No. 2016202837, mailed on Apr. 21, 2017, 3 Pages.
Notice of Allowance received for Chinese Patent Application No. 201080064125.0, mailed on Sep. 8, 2015, 3 pages (1 page of English Translation and 2 pages of Official Copy).
Notice Of Allowance received for Chinese Patent Application No. 201280006317.5, mailed on Feb. 17, 2017, 2 pages (1 pages of English Translation and 1 pages of Official Copy).
Notice of Allowance received for Chinese Patent Application No. 201520364847.8, mailed on Nov. 5, 2015, 9 pages (7 page of English Translation and 2 pages of Official Copy).
Notice of Allowance received for Chinese Patent Application No. 201620051290.7, mailed on Jun. 22, 2016, 2 Pages (Official Copy only) {See Communication under 37 CFR § 1.98(a) (3)}.
Notice of Allowance received for Japanese Patent Application No. 2015-095183, mailed on Apr. 21, 2017, 3 pages. (Official Copy Only) {See Communication under 37 CFR § 1.98(a) (3)}.
Notice of Allowance received for Japanese Patent Application No. 2016-130565, mailed on Aug. 28, 2017, 3 pages (Official Copy Only) {See Communication under 37 CFR § 1.98(a) (3)}.
Notice of Allowance received for Korean Patent Application No. 10-2013-7022057, mailed on Apr. 27, 2015, 2 pages (Official Copy only) {See Communication under 37 CFR § 1.98(a) (3)}.
Notice of Allowance received for Korean Patent Application No. 10-2014-7033660, mailed on Sep. 25, 2015, 3 pages (1 page of English Translation and 2 pages of Official Copy).
Notice of Allowance received for Korean Patent Application No. 10-2015-7013849, mailed on Mar. 28, 2016, 3 pages (1 page of English Translation and 2 pages of Official Copy).
Notice of Allowance received for Korean Patent Application No. 10-2016-7017508, issued on Apr. 27, 2017, 3 pages (1 page of English translation and 2 pages of Official Copy).
Notice of Allowance received for Taiwanese Patent Application No. 104117041, mailed on Feb. 24, 2017, 3 pages (Official Copy Only) {See Communication under 37 CFR § 1.98(a) (3)}.
Notice of Allowance received for U.S. Appl. No. 10/179,775, mailed on Aug. 24, 2017, 3 Pages.
Notice of Allowance received for U.S. Appl. No. 10/179,775, mailed on Jul. 13, 2017, 11 pages.
Notice of Allowance received for U.S. Appl. No. 12/789,436, mailed on Jan. 7, 2013, 9 pages.
Notice of Allowance received for U.S. Appl. No. 12/843,814, mailed on Jun. 22, 2016, 13 pages.
Notice of Allowance received for U.S. Appl. No. 12/890,482, mailed on May 8, 2014, 5 pages.
Notice of Allowance received for U.S. Appl. No. 12/890,489, mailed on Jul. 27, 2015, 8 pages.
Notice of Allowance received for U.S. Appl. No. 13/077,850, mailed on May 5, 2016, 15 pages.
Notice of Allowance received for U.S. Appl. No. 13/077,855, mailed on Jan. 30, 2017, 7 pages.
Notice of Allowance received for U.S. Appl. No. 13/077,867, mailed on Mar. 12, 2014, 7 pages.
Notice of Allowance received for U.S. Appl. No. 13/077,867, mailed on Sep. 18, 2013, 8 pages.
Notice of Allowance received for U.S. Appl. No. 13/077,874, mailed on Dec. 9, 2016, 2 pages.
Notice of Allowance received for U.S. Appl. No. 13/077,874, mailed on Nov. 22, 2016, 13 pages.
Notice of Allowance received for U.S. Appl. No. 13/333,909, mailed on Mar. 31, 2014, 20 pages.
Notice of Allowance received for U.S. Appl. No. 14/456,852, mailed on Jul. 31, 2015, 8 pages.
Notice of Allowance received for U.S. Appl. No. 14/641,289, mailed on Aug. 24, 2017, 6 pages.
Office Action received for Australian Patent Application No. 2010339636, mailed on Jun. 19, 2013, 3 pages.
Office Action received for Australian Patent Application No. 2012209199, mailed on Dec. 17, 2015, 3 pages.
Office Action received for Australian Patent Application No. 2012209199, mailed on Jan. 15, 2015, 3 pages.
Office Action received for Australian Patent Application No. 2015100490, mailed on Dec. 15, 2016, 2 pages.
Office Action received for Australian Patent Application No. 2015100490, mailed on Jun. 9, 2015, 6 pages.
Office Action received for Australian Patent Application No. 2015201884, mailed on Oct. 12, 2015, 4 pages.
Office Action received for Australian Patent Application No. 2016202837, mailed on Jan. 10, 2017, 2 pages.
Office Action received for Chinese Patent Application No. 201080064125.0, mailed on Jun. 10, 2014, 8 pages (Official Copy only) {See Communication under 37 CFR § 1.98(a) (3)}.
Office Action received for Chinese Patent Application No. 201080064125.0, mailed on Mar. 11, 2015, 7 pages (2 pages of English Translation and 5 pages of Official Copy).
Office Action received for Chinese Patent Application No. 201280006317.5, mailed on Jan. 11, 2016, 10 pages (5 pages of English Translation and 5 pages of official Copy).
Office Action received for Chinese Patent Application No. 201280006317.5, mailed on Jul. 11, 2016, 6 pages (1 page of English Translation and 5 pages of Official Copy).
Office Action received for Danish Patent Application No. PA201570256, mailed on Jul. 7, 2015, 2 pages.
Office Action received for Danish Patent Application No. PA201570256, mailed on Mar. 17, 2016, 5 pages.

(56) References Cited

OTHER PUBLICATIONS

Office Action received for Danish Patent Application No. PA201570256, mailed on May 23, 2017, 3 pages.
Office Action received for Danish Patent Application PA201570256, mailed on Oct. 10, 2016, 3 pages.
Office Action received for European Patent Application No. 10799259.6, mailed on Jun. 1, 2015, 9 pages.
Office Action received for Hong Kong Patent Application No. 151051633, mailed on Jun. 5, 2015, 11 pages (Official Copy Only) {See Communication under 37 CFR § 1.98(a) (3)}.
Office Action received for Japanese Patent Application No. 2013-550664, mailed on Aug. 24, 2015, 9 pages (4 pages of English Translation and 5 pages of Official Copy).
Office Action received for Japanese Patent Application No. 2013-550664, mailed on Jun. 10, 2016, 3 pages (Official Copy only) {See Communication under 37 CFR § 1.98(a) (3)}.
Office Action received for Japanese Patent Application No. 2013-550664, mailed on Sep. 12, 2014, 10 pages (6 pages of English Translation and 4 pages of Official Copy).
Office Action received for Japanese Patent Application No. 2015-095183, mailed on Jun. 3, 2016, 13 pages (6 pages of English Translation and 7 pages of Official copy).
Office Action received for Korean Patent Application No. 10-2012-7020548, mailed on Oct. 10, 2013, 5 pages (Official Copy only) {See Communication under 37 CFR § 1.98(a) (3)}.
Office Action received for Korean Patent Application No. 10-2013-7022057, mailed on May 28, 2014, 7 pages (3 pages of English Translation and 4 copies of Official Copy).
Office Action received for Korean Patent Application No. 10-2014-7033660, mailed on Feb. 23, 2015, 3 pages (Official Copy only) {See Communication under 37 CFR § 1.98(a) (3)}.
Office Action received for Korean Patent Application No. 10-2015-0072162, mailed on Apr. 20, 2016, 11 pages (6 pages of English Translation and 5 pages of Official Copy).
Office Action received for Korean Patent Application No. 10-2015-0072162, mailed on Feb. 27, 2017, 12 pages (6 pages of English Translation and 6 pages of Official Copy).
Office Action received for Korean Patent Application No. 10-2015-7013849, mailed on Aug. 20, 2015, 5 pages (2 pages of English Translation and 3 pages of Official Copy).
Office Action received for Korean Patent Application No. 10-2016-7017508, mailed on Oct. 20, 2016, 5 pages (2 pages of English Translation and 3 pages of Official Copy).
Office Action received for Taiwanese Patent Application No. 104117041, mailed on Aug. 22, 2016, 6 pages (3 pages of English Translation and 3 pages of Official Copy).
Office Action received for Taiwanese Patent Application No. 104117042, mailed on Apr. 20, 2017, 18 pages (7 pages of English Translation and 11 pages of Official Copy).
Pogue, David, "Windows Vista for Starters: The Missing Manual", Available at: <http://academic.safaribooksonline.com/book/operating-systems/0596528264>, Jan. 25, 2007, 18 pages.
"QPair", Available at: <http://mongri.net/entry/G-Pad-83-0pair>, Dec. 20, 2013, 22 pages (10 pages of English translation and 12 pages of Official Copy).
Search Report received For Netherlands Patent Application No. 2014737, mailed on Oct. 29, 2015, 9 pages.
Summons to Attend Oral Proceedings received for European Application No. 10799259.6, mailed on Aug. 2, 2016, 16 pages.
Wolfe, Joanna, "Annotation Technologies: A Software and Research Review", Computers and Composition, vol. 19, No. 4, 2002, pp. 471-497.
Written Opinion received for PCT Patent Application No. PCT/US95/11025, mailed on Oct. 4, 1996, 6 pages.
Ziegler, Chris, "Palm® Pre.™. for Dummies®", For Dummies, Oct. 19, 2009, 9 pages.
International Preliminary Report on Patentability received for PCT Patent Application No. PCT/US2017/035326, mailed on Dec. 20, 2018, 19 pages.

Appeal Decision received for U.S. Appl. No. 13/077,862, mailed on Mar. 22, 2019, 10 pages.
Decision to Grant received for European Patent Application No. 15713062.6, mailed on Apr. 11, 2019, 2 pages.
Intention to Grant received for European Patent Application No. 15713062.6, mailed on Mar. 25, 2019, 7 pages.
Office Action received for Chinese Patent Application No. 201510288981.9, mailed on Mar. 6, 2019, 20 pages (10 pages of English Translation and 10 pages of Official Copy).
Final Office Action received for U.S. Appl. No. 15/608,866, mailed on Mar. 8, 2019, 36 pages.
Non-Final Office Action received for U.S. Appl. No. 14/641,304, mailed on Feb. 27, 2019, 18 pages.
Office Action received for Australian Patent Application No. 2016266010, mailed on Nov. 28, 2018, 5 pages.
Office Action received for Korean Patent Application No. 10-2018-0035949, mailed on Dec. 24, 2018, 7 pages (3 pages of English Translation and 4 pages of Official Copy).
Office Action received for German Patent Application No. 102015208532.5, mailed on Apr. 1, 2019, 20 pages (10 pages of English Translation and 10 pages of Official Copy).
Office Action received for Korean Patent Application No. 10-2018-0035949, mailed on Apr. 24, 2019, 9 pages (4 pages of English Translation and 5 pages of Official Copy).
Extended European Search Report received for European Patent Application No. 17810737.1, mailed on Oct. 28, 2019, 11 pages.
Notice of Allowance received for U.S. Appl. No. 15/608,866, mailed on Dec. 18, 2019, 9 pages.
Minutes of Oral Hearing received for German Patent Application No. 102015208532.5, mailed on Dec. 13, 2019, 21 pages (3 pages of English Translation and 18 pages of Official Copy).
Applicant Initiated Interview Summary received for U.S. Appl. No. 14/641,304, mailed on Dec. 2, 2019, 5 pages.
International Preliminary Report on Patentability received for PCT Patent Application No. PCT/US2018/032396, mailed on Nov. 28, 2019, 9 pages.
Non-Final Office Action received for U.S. Appl. No. 13/077,862, mailed on Nov. 21, 2019, 18 pages.
Non-Final Office Action received for U.S. Appl. No. 14/641,298, mailed on Nov. 29, 2019, 47 pages.
Notice of Allowance received for Chinese Patent Application No. 201710240907.9, mailed on Nov. 25, 2019, 2 pages (1 page of English Translation and 1 page of Official Copy).
Notice of Allowance received for Korean Patent Application No. 10-2018-0035949, mailed on Nov. 28, 2019, 3 pages (1 page of English Translation and 2 pages of Official Copy).
Final Office Action received for U.S. Appl. No. 14/641,298, mailed on May 16, 2019, 50 pages.
Final Office Action received for U.S. Appl. No. 14/641,304, mailed on Oct. 15, 2019, 21 pages.
Notice of Allowance received for Japanese Patent Application No. 2017-101107, mailed on Jun. 3, 2019, 5 pages (1 page of English Translation and 4 pages of Official Copy).
Notice of Allowance received for U.S. Appl. No. 13/077,862, mailed on Jun. 20, 2019, 9 pages.
Notice of Allowance received for U.S. Appl. No. 13/077,862, mailed on Sep. 20, 2019, 2 pages.
Office Action received for Chinese Patent Application No. 201510288981.9, mailed on Jul. 1, 2019, 16 pages (8 pages of English Translation and 8 pages of Official Copy).
Office Action received for Chinese Patent Application No. 201710240907.9, mailed on Jun. 5, 2019, 10 pages (5 pages of English Translation and 5 pages of Official Copy).
Office Action received for German Patent Application No. 102015208532.5, mailed on Aug. 21, 2019, 15 pages (5 pages of English Translation and 10 pages of Official Copy).
Final Office Action received for U.S. Appl. No. 14/641,298, mailed on Jun. 26, 2020, 50 pages.
Office Action received for German Patent Application No. 102015208532.5, mailed on Apr. 21, 2020, 3 pages (1 page of English Translation and 2 pages of Official Copy).

(56) References Cited

OTHER PUBLICATIONS

Office Action received for Korean Patent Application No. 10-2020-0024632, mailed on May 18, 2020, 11 pages (5 pages of English Translation and 6 pages of Official Copy).
Examiner's Initiated Interview Summary received for U.S. Appl. No. 14/641,298, mailed on Mar. 10, 2020, 4 pages.
Non-Final Office Action received for U.S. Appl. No. 14/641,304, mailed on Mar. 4, 2020, 21 pages.
Notice of Allowance received for U.S. Appl. No. 15/608,866, mailed on Feb. 28, 2020, 2 pages.
Office Action received for Australian Patent Application No. 2018271366, mailed on Feb. 25, 2020, 5 pages.
Supplemental Notice of Allowance received for U.S. Appl. No. 15/608,866, mailed on Feb. 20, 2020, 2 pages.
Applicant Initiated Interview Summary received for U.S. Appl. No. 14/641,304, mailed on Jul. 28, 2020, 5 pages.
Decision to Grant received for German Patent Application No. 102015208532.5, mailed on Sep. 22, 2020, 10 pages (1 page of English Translation and 9 pages of Official Copy).
Groom, Gyeong-A, "LG G pad 8.3 reviews-Q pair connecting smartphone and tablet PC", Online Available at: https://m.blog.naver.com/PostView.nhn?blogId=feena74&logNo=140203710954&proxyReferer=https:%2F%2Fwww.google.com%2F, Dec. 30, 2013, 56 pages (28 pages of English Translation and 28 pages of Official Copy).
lazion.com, "G Pad 8.3, Q Pair to become one with your smartphone", Online available at: https://lazion.com/2512682, Dec. 30, 2013, 24 pages (11 pages of English Translation and 13 pages of Official Copy).
Non-Final Office Action received for U.S. Appl. No. 13/077,862, mailed on Jul. 17, 2020, 20 pages.
Notice of Allowance Action received for U.S. Appl. No. 14/641,304, mailed on Sep. 9, 2020, 15 pages.
Office Action received for Australian Patent Application No. 2018271366, mailed on Oct. 26, 2020, 5 pages.
Office Action received for Chinese Patent Application No. 201780033771.2, mailed on Jul. 15, 2020, 18 pages (9 pages of English Translation and 9 pages of Official Copy).
Office Action received for Japanese Patent Application No. 2019-124728, mailed on Sep. 18, 2020, 6 pages (3 pages of English Translation and 3 pages of Official Copy).
Q Pair, Posting of a blog, Online Available at: <http://www.leaderyou.co.kr/2595>, Dec. 7, 2013, 41 pages (23 page of English Translation and 18 pages of Official Copy).
Office Action received for Korean Patent Application No. 10-2020-0024632, mailed on Dec. 29, 2020, 11 pages (5 pages of English Translation and 6 pages of Official Copy).
Board Opinion received for Chinese Patent Application No. 201510288981.9, mailed on Jan. 4, 2021, 21 pages (9 pages of English Translation and 12 pages of Official Copy).
Office Action received for Australian Patent Application No. 2018271366, mailed on Jan. 19, 2021, 5 pages.
Office Action received for European Patent Application No. 17810737.1, mailed on Jan. 20, 2021, 6 pages.
Office Action received for Japanese Patent Application No. 2019-124728, mailed on Dec. 14, 2020, 4 pages (2 pages of English Translation and 2 pages of Official Copy).
"LG G Pad 8.3 Tablet Q Remote User", Available at:—<https://mushroomprincess.tistory.com/1320>, Dec. 26, 2013, 37 pages (20 pages of English Translation and 17 pages of Official Copy).
Notice of Allowance received for Chinese Patent Application No. 201780033771.2, mailed on Feb. 3, 2021, 2 pages (1 page of English Translation and 1 page of Official Copy).
Board Decision received for Chinese Patent Application No. 201510288981.9, mailed on May 6, 2021, 31 pages (3 pages of English Translation and 28 pages of Official Copy).
Notice of Allowance received for Korean Patent Application No. 10-2020-0024632, mailed on Jul. 26, 2021, 3 pages (1 page of English Translation and 2 pages of Official Copy).
Decision to Grant received for Japanese Patent Application No. 2019-124728, mailed on Apr. 2, 2021, 4 pages (1 page of English Translation and 3 pages of Official Copy).
Intention to Grant received for European Patent Application No. 17810737.1, mailed on Jul. 5, 2021, 8 pages.
Non-Final Office Action received for U.S. Appl. No. 16/859,101, mailed on Aug. 5, 2021, 19 pages.
Examiner's Answer to Appeal Brief received for U.S. Appl. No. 14/641,298, mailed on Mar. 22, 2021, 19 pages.
Applicant-Initiated Interview Summary received for U.S. Appl. No. 17/483,679, mailed on Aug. 23, 2022, 3 pages.
Corrected Notice of Allowance received for U.S. Appl. No. 17/483,549, mailed on Aug. 24, 2022, 3 pages.
Notice of Allowance received for Chinese Patent Application No. 202110409273.1, mailed on Aug. 2, 2022, 4 pages (1 page of English Translation and 3 pages of Official Copy).
Notice of Allowance received for Chinese Patent Application No. 201910055588.3, mailed on Mar. 2, 2022, 2 pages (1 page of English Translation and 1 page of Official Copy).
Office Action received for Australian Patent Application No. 2021201243, mailed on Feb. 17, 2022, 4 pages.
Supplemental Notice of Allowance received for U.S. Appl. No. 16/859,101, mailed on Feb. 25, 2022, 2 pages.
Corrected Notice of Allowance received for U.S. Appl. No. 16/859,101, mailed on Mar. 25, 2022, 2 pages.
Applicant-Initiated Interview Summary received for U.S. Appl. No. 17/483,564, mailed on Mar. 14, 2022, 2 pages.
Applicant-Initiated Interview Summary received for U.S. Appl. No. 17/483,679, mailed on Apr. 29, 2022, 2 pages.
Applicant-Initiated Interview Summary received for U.S. Appl. No. 17/484,899, mailed on Apr. 27, 2022, 5 pages.
Corrected Notice of Allowance received for U.S. Appl. No. 17/483,582, mailed on Feb. 15, 2022, 2 pages.
Final Office Action received for U.S. Appl. No. 17/483,564, mailed on Apr. 18, 2022, 23 pages.
Final Office Action received for U.S. Appl. No. 17/483,679, mailed on May 24, 2022, 21 pages.
Final Office Action received for U.S. Appl. No. 17/484,899, mailed on May 12, 2022, 29 pages.
Non-Final Office Action received for U.S. Appl. No. 17/483,549, mailed on Jan. 11, 2022, 5 pages.
Non-Final Office Action received for U.S. Appl. No. 17/483,564, mailed on Jan. 6, 2022, 23 pages.
Non-Final Office Action received for U.S. Appl. No. 17/483,679, mailed on Feb. 1, 2022, 19 pages.
Non-Final Office Action received for U.S. Appl. No. 17/484,899, mailed on Jan. 24, 2022, 24 pages.
Notice of Allowance received for U.S. Appl. No. 17/483,549, mailed on Apr. 15, 2022, 10 pages.
Notice of Allowance received for U.S. Appl. No. 17/483,582, mailed on Apr. 19, 2022, 5 pages.
Notice of Allowance received for U.S. Appl. No. 17/483,582, mailed on Jan. 20, 2022, 10 pages.
Office Action received for Australian Patent Application No. 2021201243, mailed on Jun. 1, 2022, 5 pages.
Applicant-Initiated Interview Summary received for U.S. Appl. No. 17/483,564, mailed on Jul. 21, 2022, 5 pages.
Notice of Allowance received for Japanese Patent Application No. 2021-074395, mailed on Jun. 27, 2022, 4 pages (1 page of English Translation and 3 pages of Official Copy).
Applicant Initiated Interview Summary received for U.S. Appl. No. 16/859,101, mailed on Nov. 30, 2021, 2 pages.
Corrected Notice of Allowance received for U.S. Appl. No. 14/641,298, mailed on Dec. 9, 2021, 5 pages.
Decision on Appeal received for U.S. Appl. No. 14/641,298, mailed on Nov. 1, 2021, 9 pages.
Decision to Grant received for European Patent Application No. 17810737.1, mailed on Nov. 11, 2021, 2 pages.
Examiner-Initiated Interview Summary received for U.S. Appl. No. 16/859,101, mailed on Dec. 1, 2021, 2 pages.
Extended European Search Report received for European Patent Application No. 21206800.1, mailed on Jan. 24, 2022, 8 pages.

(56) References Cited

OTHER PUBLICATIONS

Notice of Allowance received for U.S. Appl. No. 14/641,298, mailed on Nov. 29, 2021, 8 pages.
Notice of Allowance received for U.S. Appl. No. 16/859,101, mailed on Jan. 18, 2022, 10 pages.
Office Action received for Chinese Patent Application No. 201910055588.3, mailed on Nov. 24, 2021, 24 pages (14 pages of English Translation and 10 pages of Official Copy).
Office Action received for European Patent Application No. 15714698.6, mailed on Oct. 13, 2021, 2 pages.
Record of Oral Hearing received for U.S. Appl. No. 14/641,298, mailed on Oct. 8, 2021, 17 pages.
Notice of Allowance received for Korean Patent Application No. 10-2021-0143923, mailed on Jan. 27, 2022, 4 pages (1 page of English Translation and 3 pages of Official Copy).
Office Action received for Chinese Patent Application No. 202110409273.1, mailed on Jan. 11, 2022, 11 pages (6 pages of English Translation and 5 pages of Official Copy).
Supplemental Notice of Allowance received for U.S. Appl. No. 16/859,101, mailed on Feb. 7, 2022, 2 pages.
Office Action received for Australian Patent Application No. 2018271366, mailed on May 17, 2021, 5 pages.
Applicant-Initiated Interview Summary received for U.S. Appl. No. 17/484,899, mailed on Sep. 1, 2022, 5 pages.
Advisory Action received for U.S. Appl. No. 17/483,679, mailed on Sep. 20, 2022, 8 pages.
Invitation to Pay Additional Fees and Partial International Search Report received for PCT Patent Application No. PCT/US2022/029261, mailed on Aug. 29, 2022, 16 pages.
Non-Final Office Action received for U.S. Appl. No. 17/483,542, mailed on Sep. 22, 2022, 18 pages.
International Search Report and Written Opinion received for PCT Patent Application No. PCT/US2022/029261, mailed on Oct. 20, 2022, 18 pages.
Advisory Action received for U.S. Appl. No. 14/263,889, mailed on May 26, 2016, 4 pages.
Advisory Action received for U.S. Appl. No. 15/725,868, mailed on Dec. 10, 2018, 5 pages.
Advisory Action received for U.S. Appl. No. 16/666,073, mailed on Jul. 7, 2020, 5 pages.
Applicant-Initiated Interview Summary received for U.S. Appl. No. 17/666,971, mailed on Jun. 9, 2023, 2 pages.
Applicant-Initiated Interview Summary received for U.S. Appl. No. 17/666,971, mailed on Apr. 15, 2016, 3 pages.
Applicant-Initiated Interview Summary received for U.S. Appl. No. 15/725,868, mailed on Jul. 25, 2018, 3 pages.
Applicant-Initiated Interview Summary received for U.S. Appl. No. 15/725,868, mailed on May 13, 2019, 3 pages.
Applicant-Initiated Interview Summary received for U.S. Appl. No. 15/725,868, mailed on Nov. 20, 2018, 3 pages.
Applicant-Initiated Interview Summary received for U.S. Appl. No. 17/483,542, mailed on May 22, 2023, 3 pages.
Applicant-Initiated Interview Summary received for U.S. Appl. No. 17/483,542, mailed on Nov. 23, 2022, 4 pages.
Applicant-Initiated Interview Summary received for U.S. Appl. No. 17/483,542, mailed on Apr. 21, 2023, 5 pages.
Applicant-Initiated Interview Summary received for U.S. Appl. No. 17/483,542, mailed on Jun. 21, 2023, 4 pages.
Applicant-Initiated Interview Summary received for U.S. Appl. No. 17/483,679, mailed on Aug. 18, 2023, 2 pages.
Applicant-Initiated Interview Summary received for U.S. Appl. No. 17/483,679, mailed on Dec. 18, 2023, 2 pages.
Applicant-Initiated Interview Summary received for U.S. Appl. No. 17/483,679, mailed on May 19, 2023, 3 pages.
Applicant-Initiated Interview Summary received for U.S. Appl. No. 17/484,899, mailed on Feb. 14, 2024, 8 pages.
Applicant-Initiated Interview Summary received for U.S. Appl. No. 17/484,899, mailed on Jun. 24, 2024, 4 pages.
Applicant-Initiated Interview Summary received for U.S. Appl. No. 17/484,899, mailed on Sep. 12, 2023, 6 pages.
Applicant-Initiated Interview Summary received for U.S. Appl. No. 17/732,355, mailed on Sep. 20, 2023, 2 pages.
Applicant-Initiated Interview Summary received for U.S. Appl. No. 18/067,350, mailed on Jul. 29, 2024, 3 pages.
Applicant-Initiated Interview Summary received for U.S. Appl. No. 18/067,350, mailed on Mar. 13, 2024, 4 pages.
Applicant-Initiated Interview Summary received for U.S. Appl. No. 18/067,350, mailed on Sep. 11, 2023, 4 pages.
Applicant-Initiated Interview Summary received for U.S. Appl. No. 18/140,449, mailed on Aug. 27, 2024, 2 pages.
Applicant-Initiated Interview Summary received for U.S. Appl. No. 18/165,144, mailed on Feb. 27, 2024, 3 pages.
Applicant-Initiated Interview Summary received for U.S. Appl. No. 18/165,144, mailed on Jul. 15, 2024, 4 pages.
Baudisch et al., "Back-of-device interaction allows creating very small touch devices", Chi 2009—Digital Life, New World: Conference Proceedings and Extended Abstracts; The 27th Annual Chi Conference on Human Factors in Computing Systems, Available online at <http://dx.doi.org/10.1145/1518701.1518995>, Apr. 9, 2009, pp. 1923-1932.
Corrected Notice of Allowance received for U.S. Appl. No. 15/725,868, mailed on Aug. 23, 2019, 2 pages.
Corrected Notice of Allowance received for U.S. Appl. No. 15/725,868, mailed on Sep. 30, 2019, 3 pages.
Corrected Notice of Allowance received for U.S. Appl. No. 16/666,073, mailed on Apr. 6, 2021, 3 pages.
Corrected Notice of Allowance received for U.S. Appl. No. 16/666,073, mailed on Apr. 26, 2021, 4 pages.
Corrected Notice of Allowance received for U.S. Appl. No. 16/666,073, mailed on Feb. 22, 2021, 3 pages.
Corrected Notice of Allowance received for U.S. Appl. No. 16/666,073, mailed on Mar. 11, 2021, 3 pages.
Notice of Allowance received for U.S. Appl. No. 17/483,542, mailed on Aug. 25, 2023, 3 pages.
Notice of Allowance received for U.S. Appl. No. 17/483,542, mailed on Feb. 5, 2024, 3 pages.
Notice of Allowance received for U.S. Appl. No. 17/666,971, mailed on Jan. 16, 2024, 2 pages.
Notice of Allowance received for U.S. Appl. No. 17/666,971, mailed on Sep. 29, 2023, 2 pages.
Notice of Allowance received for U.S. Appl. No. 17/732,204, mailed on Dec. 4, 2023, 5 pages.
Notice of Allowance received for U.S. Appl. No. 17/732,204, mailed on Jan. 18, 2024, 5 pages.
Notice of Allowance received for U.S. Appl. No. 17/732,204, mailed on Nov. 16, 2023, 6 pages.
On Appeal received for Korean Patent Application No. 10-2020-7034959, mailed on Jul. 25, 2022, 28 pages (5 pages of English Translation and 23 pages of Official Copy).
On Opposition received for Australian Patent Application No. 2018271366, mailed on Mar. 3, 2023, 3 pages.
To Grant received for European Patent Application No. 10763539.3, mailed on Jul. 19, 2018, 3 pages.
To Grant received for European Patent Application No. 15714698.6, mailed on Apr. 5, 2024, 2 pages.
To Grant received for European Patent Application No. 18188433.9, mailed on Aug. 13, 2020, 3 pages.
To Grant received for Japanese Patent Application No. 2023-571312, mailed on Aug. 29, 2024, 3 pages (1 page of English Translation and 2 pages of Official Copy). Decision to Grant received for Japanese Patent Application No. 2024-003876, mailed on.
Sep. 2, 2024, 3 pages (1 page of English Translation and 2 pages of Official Copy).
To Refuse received for Japanese Patent Application No. 2013-503731, mailed on Jun. 23, 2014, 4 pages (2 pages of English Translation and 2 pages of Official Copy).
To Refuse received for Japanese Patent Application No. 2022-116534, mailed on Jan. 29, 2024, 5 pages (2 pages of English Translation and 3 pages of Official Copy).
Pre-Review Report received for Japanese Patent Application No. 2014-212867, mailed on Nov. 4, 2016, 5 pages (2 pages of English Translation and 3 pages of Official Copy).

(56) References Cited

OTHER PUBLICATIONS

Extended European Search Report received for European Patent Application No. 18188433.9, mailed on Oct. 29, 2018, 8 pages.
Extended European Search Report received for European Patent Application No. 23172038.4, mailed on Oct. 11, 2023, 10 pages.
Extended European Search Report received for European Patent Application No. 24160234.1, mailed on May 28, 2024, 6 pages.
Extended European Search Report received for European Patent Application No. 24164409.5, mailed on Jun. 14, 2024, 5 pages.
Final Office Action received for U.S. Appl. No. 12/794,766, mailed on Nov. 26, 2012, 23 pages.
Final Office Action received for U.S. Appl. No. 14/263,889, mailed on Jan. 4, 2016, 9 pages.
Final Office Action received for U.S. Appl. No. 15/725,868, mailed on Sep. 27, 2018, 25 pages.
Final Office Action received for U.S. Appl. No. 16/666,073, mailed on Apr. 17, 2020, 18 pages.
Final Office Action received for U.S. Appl. No. 17/332,829, mailed on Feb. 6, 2023, 19 pages.
Final Office Action received for U.S. Appl. No. 17/483,564, mailed on May 25, 2023, 26 pages.
Final Office Action received for U.S. Appl. No. 17/483,679, mailed on Feb. 6, 2024, 45 pages.
Final Office Action received for U.S. Appl. No. 17/483,679, mailed on Jun. 13, 2023, 33 pages.
Final Office Action received for U.S. Appl. No. 17/484,899, mailed on Nov. 6, 2023, 39 pages.
Final Office Action received for U.S. Appl. No. 17/666,971, mailed on May 12, 2023, 29 pages.
Final Office Action received for U.S. Appl. No. 17/732,355, mailed on Nov. 3, 2023, 21 pages.
Final Office Action received for U.S. Appl. No. 18/067,350, mailed on Dec. 13, 2023, 44 pages.
Final Office Action received for U.S. Appl. No. 18/067,350, mailed on Oct. 31, 2024, 44 pages.
Final Office Action received for U.S. Appl. No. 18/140,449, mailed on Oct. 18, 2024, 11 pages.
Final Office Action received for U.S. Appl. No. 18/165,144, mailed on Jun. 11, 2024, 32 pages.
Intention to Grant received for European Patent Application No. 10763539.3, mailed on Mar. 15, 2018, 6 pages.
Intention to Grant received for European Patent Application No. 15714698.6, mailed on Dec. 8, 2023, 9 pages.
Intention to Grant received for European Patent Application No. 18188433.9, mailed on Apr. 6, 2020, 9 pages.
International Preliminary Report on Patentability received for PCT Patent Application No. PCT/US2010/050311, mailed on Oct. 18, 2012, 11 pages.
International Preliminary Report on Patentability received for PCT Patent Application No. PCT/US2022/029261, mailed on Nov. 30, 2023, 12 pages.
International Preliminary Report on Patentability received for PCT Patent Application No. PCT/US2022/029580, mailed on Nov. 30, 2023, 14 pages.
International Search Report and Written Opinion received for PCT Patent Application No. PCT/US2010/050311, mailed on Aug. 24, 2011, 15 pages.
International Search Report and Written Opinion received for PCT Patent Application No. PCT/US2022/029580, mailed on Nov. 7, 2022, 20 pages.
International Search Report and Written Opinion received for PCT Patent Application No. PCT/US2023/020569, mailed on Nov. 13, 2023, 23 pages.
International Search Report and Written Opinion received for PCT Patent Application No. PCT/US2023/032911, mailed on Jan. 4, 2024, 18 pages.
International Search Report and Written Opinion received for PCT Patent Application No. PCT/US2023/033372, mailed on Jan. 12, 2024, 21 pages.
Invitation to Pay Additional Fees and Partial International Search Report received for PCT Patent Application No. PCT/US2010/050311, mailed on Dec. 21, 2010, 6 pages.
Invitation to Pay Additional Fees and Partial International Search Report received for PCT Patent Application No. PCT/US2022/029580, mailed on Sep. 5, 2022, 13 pages.
Invitation to Pay Additional Fees and Partial International Search Report received for PCT Patent Application No. PCT/US2023/020569, mailed on Sep. 21, 2023, 14 pages.
Invitation to Pay Additional Fees and Partial International Search Report received for PCT Patent Application No. PCT/US2023/033372, mailed on Nov. 22, 2023, 13 pages.
Invitation to Pay Search Fees received for European Patent Application No. 15714698.6, mailed on Dec. 16, 2022, 4 pages.
Koyama Kaori, "Mac Fan Macintosh Master Book Mac Os X v10.4 "Tiger" & iLife", '06 version, Mainichi Communications Inc. Nobuyuki Nakagawa, Jul. 9, 2007, 4 pages (Official Copy Only). {See Communication Under Rule 37 CFR § 1.98(a) (3)}.
Non-Final Office Action received for U.S. Appl. No. 12/794,766, mailed on Aug. 5, 2013, 9 pages.
Non-Final Office Action received for U.S. Appl. No. 12/794,766, mailed on Jun. 25, 2012, 18 pages.
Non-Final Office Action received for U.S. Appl. No. 12/794,768, mailed on Oct. 10, 2012, 14 pages.
Non-Final Office Action received for U.S. Appl. No. 14/263,889, mailed on Jul. 2, 2015, 9 pages.
Non-Final Office Action received for U.S. Appl. No. 14/263,889, mailed on Jul. 26, 2016, 11 pages.
Non-Final Office Action received for U.S. Appl. No. 15/725,868, mailed on Apr. 27, 2018, 17 pages.
Non-Final Office Action received for U.S. Appl. No. 15/725,868, mailed on Feb. 12, 2019, 26 pages.
Non-Final Office Action received for U.S. Appl. No. 16/666,073, mailed on Dec. 10, 2019, 16 pages.
Non-Final Office Action received for U.S. Appl. No. 17/332,829, mailed on Aug. 1, 2022, 17 pages.
Non-Final Office Action received for U.S. Appl. No. 17/483,542, mailed on Jan. 31, 2023, 14 pages.
Non-Final Office Action received for U.S. Appl. No. 17/483,564, mailed on Nov. 28, 2022, 24 pages.
Non-Final Office Action received for U.S. Appl. No. 17/483,679, mailed on Dec. 9, 2022, 31 pages.
Non-Final Office Action received for U.S. Appl. No. 17/483,679, mailed on Sep. 13, 2023, 32 pages.
Non-Final Office Action received for U.S. Appl. No. 17/484,899, mailed on Jun. 14, 2023, 41 pages.
Non-Final Office Action received for U.S. Appl. No. 17/484,899, mailed on Mar. 21, 2024, 42 pages.
Non-Final Office Action received for U.S. Appl. No. 17/666,971, mailed on Dec. 8, 2022, 26 pages.
Non-Final Office Action received for U.S. Appl. No. 17/732,204, mailed on Aug. 4, 2023, 18 pages.
Non-Final Office Action received for U.S. Appl. No. 17/732,355, mailed on Aug. 4, 2023, 19 pages.
Non-Final Office Action received for U.S. Appl. No. 18/067,350, mailed on Aug. 3, 2023, 41 pages.
Non-Final Office Action received for U.S. Appl. No. 18/067,350, mailed on May 28, 2024, 43 pages.
Non-Final Office Action received for U.S. Appl. No. 18/140,449, mailed on May 24, 2024, 19 pages.
Non-Final Office Action received for U.S. Appl. No. 18/165,144, mailed on Dec. 27, 2023, 20 pages.
Non-Final Office Action received for U.S. Appl. No. 18/165,144, mailed on Sep. 11, 2024, 25 pages.
Non-Final Office Action received for U.S. Appl. No. 18/380,116, mailed on Jul. 18, 2024, 16 pages.
Non-Final Office Action received for U.S. Appl. No. 18/422,571, mailed on Sep. 26, 2024, 19 pages.
Non-Final Office Action received for U.S. Appl. No. 18/535,820, mailed on Sep. 25, 2024, 27 pages.
Notice of Acceptance received for Australian Patent Application No. 2010350749, mailed on Jan. 13, 2015, 3 pages.

(56) References Cited

OTHER PUBLICATIONS

Notice of Acceptance received for Australian Patent Application No. 2015201127, mailed on Feb. 14, 2017, 3 pages.
Notice of Acceptance received for Australian Patent Application No. 2018271366, mailed on Mar. 31, 2023, 3 pages.
Notice of Acceptance received for Australian Patent Application No. 2021201243, mailed on Feb. 23, 2023, 3 pages.
Notice of Allowance received for Brazilian Patent Application No. BR112012025746-3, mailed on Jul. 6, 2021, 3 pages (1 page of English Translation and 2 pages of Official Copy).
Notice of Allowance received for Chinese Patent Application No. 201010602653.9, mailed on Nov. 15, 2014, 2 pages (1 page of English Translation and 1 page of Official Copy).
Notice of Allowance received for Chinese Patent Application No. 2010106600623.4, mailed on Aug. 11, 2014, 4 pages (1 page of English Translation and 3 pages of Official Copy).
Notice of Allowance received for Chinese Patent Application No. 201410575145.4, mailed on May 10, 2018, 3 pages (1 page of English Translation and 2 pages of Official Copy).
Notice of Allowance received for Japanese Patent Application No. 2014-212867, mailed on Mar. 30, 2018, 3 pages (1 page of English Translation and 2 pages of Official Copy).
Notice of Allowance received for Japanese Patent Application No. 2016-151497, mailed on Jun. 4, 2018, 4 pages (1 page of English Translation and 3 pages of Official Copy).
Notice of Allowance received for Japanese Patent Application No. 2019-182484, mailed on Aug. 30, 2021, 4 pages (1 page of English Translation and 3 pages of Official Copy).
Notice of Allowance received for Japanese Patent Application No. 2021-154573, mailed on Nov. 11, 2022, 4 pages (1 page of English Translation and 3 pages of Official Copy).
Notice of Allowance received for Japanese Patent Application No. 2022-116534, mailed on Jun. 24, 2024, 4 pages (1 page of English Translation and 3 pages of Official Copy).
Notice of Allowance received for Japanese Patent Application No. 2022-197327, mailed on May 31, 2024, 4 pages (1 page of English Translation and 3 pages of Official Copy).
Notice of Allowance received for Japanese Patent Application No. 2023-571161, mailed on Jul. 30, 2024, 3 pages (1 page of English Translation and 2 pages of Official Copy).
Notice of Allowance received for Korean Patent Application No. 10-2012-7028535, mailed on Jul. 16, 2014, 5 pages (1 page of English Translation and 4 pages of Official Copy).
Notice of Allowance received for Korean Patent Application No. 10-2014-7005164, mailed on Dec. 21, 2014, 4 pages (1 page of English Translation and 3 pages of Official Copy).
Notice of Allowance received for Korean Patent Application No. 10-2014-7029838, mailed on Jul. 28, 2015, 4 pages (1 page of English Translation and 3 pages of Official Copy).
Notice of Allowance received for Korean Patent Application No. 10-2015-7007050, mailed on Feb. 26, 2016, 4 pages (1 page of English Translation and 3 pages of Official Copy).
Notice of Allowance received for Korean Patent Application No. 10-2016-7014580, mailed on Dec. 17, 2019, 6 pages (2 pages of English Translation and 4 pages of Official Copy).
Notice of Allowance received for Korean Patent Application No. 10-2018-7036975, mailed on Sep. 18, 2019, 6 pages (2 pages of English Translation and 4 pages of Official Copy).
Notice of Allowance received for Korean Patent Application No. 10-2020-7002845, mailed on Sep. 24, 2020, 5 pages (1 page of English Translation and 4 pages of Official Copy).
Notice of Allowance received for Korean Patent Application No. 10-2022-0053111, mailed on Jun. 25, 2024, 7 pages (2 pages of English Translation and 5 pages of Official Copy).
Notice of Allowance received for Korean Patent Application No. 10-2023-7005442, mailed on Jan. 22, 2024, 8 pages (2 pages of English Translation and 6 pages of Official Copy).
Notice of Allowance received for Korean Patent Application No. 10-2023-7039382, mailed on Feb. 13, 2024, 6 pages (2 pages of English Translation and 4 pages of Official Copy).
Notice of Allowance received for Korean Patent Application No. 10-2024-7000870, mailed on Feb. 13, 2024, 5 pages (2 pages of English Translation and 3 pages of Official Copy).
Notice of Allowance received for Mexican Patent Application No. MX/a/2012/011623, mailed on Jan. 16, 2014, 2 pages (1 page of English Translation and 1 page of Official Copy).
Notice of Allowance received for Mexican Patent Application No. MX/a/2014/004295, mailed on May 21, 2015, 2 pages (1 page of English Translation and 1 page of Official Copy).
Notice of Allowance received for Mexican Patent Application No. MX/a/2015/010523, mailed on May 25, 2016, 2 pages (1 page of English Translation and 1 page of Official Copy).
Notice of Allowance received for Mexican Patent Application No. MX/a/2016/012174, mailed on Jan. 17, 2020, 3 pages (1 page of English Translation and 2 pages of Official Copy).
Notice of Allowance received for Mexican Patent Application No. MX/a/2020/003290, mailed on Feb. 9, 2023, 4 pages (1 page of English Translation and 3 pages of Official Copy).
Notice of Allowance received for Taiwanese Patent Application No. 099132253, mailed on Apr. 27, 2016, 3 pages (1 page of English Translation and 2 pages of Official Copy).
Notice of Allowance received for Taiwanese Patent Application No. 099132254, mailed on Feb. 18, 2014, 3 pages (1 page of English Translation and 2 pages of Official Copy).
Notice of Allowance received for U.S. Appl. No. 12/794,766, mailed on Jan. 17, 2014, 6 pages.
Notice of Allowance received for U.S. Appl. No. 12/794,768, mailed on Mar. 22, 2013, 6 pages.
Notice of Allowance received for U.S. Appl. No. 14/263,889, mailed on Feb. 1, 2017, 10 pages.
Notice of Allowance received for U.S. Appl. No. 14/263,889, mailed on Jun. 16, 2017, 6 pages.
Notice of Allowance received for U.S. Appl. No. 15/725,868, mailed on Jun. 12, 2019, 9 pages.
Notice of Allowance received for U.S. Appl. No. 16/666,073, mailed on Jan. 21, 2021, 11 pages.
Notice of Allowance received for U.S. Appl. No. 17/483,542, mailed on Aug. 11, 2023, 9 pages.
Notice of Allowance received for U.S. Appl. No. 17/483,542, mailed on Dec. 20, 2023, 6 pages.
Notice of Allowance received for U.S. Appl. No. 17/483,564, mailed on Jul. 17, 2023, 46 pages.
Notice of Allowance received for U.S. Appl. No. 17/484,899, mailed on Aug. 26, 2024, 21 pages.
Notice of Allowance received for U.S. Appl. No. 17/666,971, mailed on Aug. 16, 2023, 8 pages.
Notice of Allowance received for U.S. Appl. No. 17/666,971, mailed on Dec. 15, 2023, 8 pages.
Notice of Allowance received for U.S. Appl. No. 17/732,204, mailed on Oct. 12, 2023, 8 pages.
Office Action received for Australian Patent Application No. 2010350749, mailed on Oct. 16, 2013, 3 pages.
Office Action received for Australian Patent Application No. 2015201127, mailed on Mar. 21, 2016, 3 pages.
Office Action received for Australian Patent Application No. 2021201243, mailed on Dec. 12, 2022, 3 pages.
Office Action received for Australian Patent Application No. 2023201057, mailed on Jan. 25, 2024, 6 pages.
Office Action received for Australian Patent Application No. 2023201057, mailed on Jun. 19, 2024, 5 pages.
Office Action received for Australian Patent Application No. 2023201057, mailed on Oct. 24, 2024, 3 pages.
Office Action received for Brazilian Patent Application No. BR112012025746-3, mailed on Jun. 2, 2020, 7 pages (4 pages of English Translation and 3 pages of Official Copy).
Office Action received for Chinese Patent Application No. 201010602653.9, mailed on Apr. 1, 2013, 21 pages (13 pages of English Translation and 8 pages of Official Copy).
Office Action received for Chinese Patent Application No. 201010602653.9, mailed on Dec. 9, 2013, 10 pages (6 pages of English Translation and 4 pages of Official Copy).

(56) References Cited

OTHER PUBLICATIONS

Office Action received for Chinese Patent Application No. 201010602653.9, mailed on May 15, 2014, 6 pages (3 pages of English Translation and 3 pages of Official Copy).
Office Action received for Chinese Patent Application No. 2010106600623.4, mailed on Apr. 28, 2014, 7 pages (4 pages of English Translation and 3 pages of Official Copy).
Office Action received for Chinese Patent Application No. 2010106600623.4, mailed on Jan. 24, 2014, 7 pages (4 pages of English Translation and 3 pages of Official Copy).
Office Action received for Chinese Patent Application No. 2010106600623.4, mailed on May 2, 2013, 27 pages (15 pages of English Translation and 12 pages of Official Copy).
Office Action received for Chinese Patent Application No. 201410575145.4, mailed on Feb. 13, 2017, 18 pages (11 pages of English Translation and 7 pages of Official Copy).
Office Action received for Chinese Patent Application No. 201410575145.4, mailed on Nov. 30, 2017, 17 pages (11 pages of English Translation and 6 pages of Official Copy).
Office Action received for Chinese Patent Application No. 202110894284.3, mailed on Jun. 27, 2024, 10 pages (5 pages of English Translation and 5 pages of Official Copy).
Office Action received for Chinese Patent Application No. 202311835200.4, mailed on Aug. 29, 2024, 16 pages (7 pages of English Translation and 9 pages of Official Copy).
Office Action received for Chinese Patent Application No. 202410030102.1, mailed on Jul. 23, 2024, 18 pages (9 pages of English Translation and 9 pages of Official Copy).
Office Action received for European Patent Application No. 10763539.3, mailed on Jun. 13, 2016, 5 pages.
Office Action received for European Patent Application No. 15714698.6, mailed on Apr. 18, 2023, 14 pages.
Office Action received for European Patent Application No. 21206800.1, mailed on Jun. 30, 2023, 6 pages.
Office Action received for European Patent Application No. 22733778.9, mailed on Oct. 22, 2024, 6 pages.
Office Action received for Japanese Patent Application No. 2013-503731, mailed on Mar. 3, 2014, 8 pages (2 pages of English Translation and 6 pages of Official Copy).
Office Action received for Japanese Patent Application No. 2013-503731, mailed on Sep. 24, 2013, 3 pages (1 page of English Translation and 2 pages of Official Copy).
Office Action received for Japanese Patent Application No. 2014-212867, mailed on Aug. 18, 2017, 4 pages (1 page of English Translation and 3 pages of Official Copy).
Office Action received for Japanese Patent Application No. 2014-212867, mailed on Jun. 29, 2015, 8 pages (4 pages of English Translation and 4 pages of Official Copy).
Office Action received for Japanese Patent Application No. 2016-151497, mailed on Sep. 25, 2017, 7 pages (2 pages of English Translation and 5 pages of Official Copy).
Office Action received for Japanese Patent Application No. 2018-127760, mailed on Feb. 22, 2019, 10 pages (5 pages of English Translation and 5 pages of Official Copy).
Office Action received for Japanese Patent Application No. 2018-127760, mailed on Jul. 5, 2019, 4 pages (1 page of English Translation and 3 pages of Official Copy).
Office Action received for Japanese Patent Application No. 2019-182484, mailed on Dec. 4, 2020, 6 pages (1 page of English Translation and 5 pages of Official Copy).
Office Action received for Japanese Patent Application No. 2022-116534, mailed on Aug. 28, 2023, 10 pages (5 pages of English Translation and 5 pages of Official Copy).
Office Action received for Japanese Patent Application No. 2022-197327, mailed on Mar. 1, 2024, 14 pages (7 pages of English Translation and 7 pages of Official Copy).
Office Action received for Japanese Patent Application No. 2023-571161, mailed on May 28, 2024, 4 pages (2 pages of English Translation and 2 pages of Official Copy).
Office Action received for Japanese Patent Application No. 2023-571312, mailed on Jul. 16, 2024, 4 pages (2 pages of English Translation and 2 pages of Official Copy).
Office Action received for Japanese Patent Application No. 2024-003876, mailed on Jul. 2, 2024, 3 pages (1 page of English Translation and 2 pages of Official Copy).
Office Action received for Korean Patent Application No. 10-2012-7028535, mailed on Nov. 26, 2013, 10 pages (4 pages of English Translation and 6 pages of Official Copy).
Office Action received for Korean Patent Application No. 10-2014-7005164, mailed on May 23, 2014, 15 pages (6 pages of English Translation and 9 pages of Official Copy).
Office Action received for Korean Patent Application No. 10-2014-7029838, mailed on Dec. 20, 2014, 13 pages (5 pages of English Translation and 8 pages of Official Copy).
Office Action received for Korean Patent Application No. 10-2015-7007050, mailed on Apr. 16, 2015, 14 pages (6 pages of English Translation and 8 pages of Official Copy).
Office Action received for Korean Patent Application No. 10-2015-7007050, mailed on Oct. 23, 2015, 7 pages (3 pages of English Translation and 4 pages of Official Copy).
Office Action received for Korean Patent Application No. 10-2016-7014580, mailed on Jan. 30, 2018, 10 pages (4 pages of English Translation and 6 pages of Official Copy).
Office Action received for Korean Patent Application No. 10-2016-7014580, mailed on Jul. 30, 2018, 7 pages (3 pages of English Translation and 4 pages of Official Copy).
Office Action received for Korean Patent Application No. 10-2016-7014580, mailed on Jun. 29, 2017, 7 pages (1 page of English Translation and 6 pages of Official Copy).
Office Action received for Korean Patent Application No. 10-2016-7014580, mailed on Sep. 19, 2018, 7 pages (3 pages of English Translation and 4 pages of Official Copy).
Office Action received for Korean Patent Application No. 10-2016-7014580, mailed on Sep. 27, 2016, 9 pages (4 pages of English Translation and 5 pages of Official Copy).
Office Action received for Korean Patent Application No. 10-2017-7002774, mailed on Apr. 18, 2017, 10 pages (4 pages of English Translation and 6 pages of Official Copy).
Office Action received for Korean Patent Application No. 10-2017-7002774, mailed on Jul. 30, 2018, 6 pages (3 pages of English Translation and 3 pages of Official Copy).
Office Action received for Korean Patent Application No. 10-2017-7002774, mailed on Sep. 20, 2018, 12 pages (6 pages of English Translation and 6 pages of Official Copy).
Office Action received for Korean Patent Application No. 10-2018-7036975, mailed on Mar. 22, 2019, 11 pages (5 pages of English Translation and 6 pages of Official Copy).
Office Action received for Korean Patent Application No. 10-2020-7002845, mailed on Feb. 17, 2020, 14 pages (6 pages of English Translation and 8 pages of Official Copy).
Office Action received for Korean Patent Application No. 10-2020-7034959, mailed on Jan. 27, 2022, 7 pages (3 pages of English Translation and 4 pages of Official Copy).
Office Action received for Korean Patent Application No. 10-2020-7034959, mailed on Mar. 2, 2021, 12 pages (5 pages of English Translation and 7 pages of Official Copy).
Office Action received for Korean Patent Application No. 10-2020-7034959, mailed on Oct. 27, 2021, 8 pages (4 pages of English Translation and 4 pages of Official Copy).
Office Action received for Korean Patent Application No. 10-2022-0053111, mailed on Dec. 12, 2022, 9 pages (4 pages of English Translation and 5 pages of Official Copy).
Office Action received for Korean Patent Application No. 10-2022-0053111, mailed on Jun. 29, 2023, 7 pages (3 pages of English Translation and 4 pages of Official Copy).
Office Action received for Korean Patent Application No. 10-2022-0053111, mailed on Oct. 23, 2023, 10 pages (5 pages of English Translation and 5 pages of Official Copy).
Office Action received for Korean Patent Application No. 10-2022-7006973, mailed on May 19, 2022, 10 pages (4 pages of English Translation and 6 pages of Official Copy).

(56) References Cited

OTHER PUBLICATIONS

Office Action received for Korean Patent Application No. 10-2022-7006973, mailed on Nov. 24, 2022, 6 pages (3 pages of English Translation and 3 pages of Official Copy).
Office Action received for Korean Patent Application No. 10-2023-7005442, mailed on Jul. 25, 2023, 10 pages (4 pages of English Translation and 6 pages of Official Copy).
Office Action received for Mexican Patent Application No. MX/a/2014/004295, mailed on Aug. 21, 2014, 4 pages (2 pages of English Translation and 2 pages of Official Copy).
Office Action received for Mexican Patent Application No. MX/a/2014/004295, mailed on Jan. 20, 2015, 4 pages (1 page of English Translation and 3 pages of Official Copy).
Office Action received for Mexican Patent Application No. MX/a/2015/010523, mailed on Jan. 26, 2016, 4 pages (2 pages of English Translation and 2 pages of Official Copy).
Office Action received for Mexican Patent Application No. MX/a/2016/012174, mailed on Apr. 10, 2019, 7 pages (4 pages of English Translation and 3 pages of Official Copy).
Office Action received for Mexican Patent Application No. MX/a/2016/012174, mailed on Aug. 8, 2019, 7 pages (2 pages of English Translation and 5 pages of Official Copy).
Office Action received for Mexican Patent Application No. MX/a/2020/003290, mailed on Nov. 11, 2022, 7 pages (2 pages of English Translation and 5 pages of Official Copy).
Office Action received for Mexican Patent Application No. MX/a/2020/003290, mailed on Oct. 26, 2022, 8 pages (3 pages of English Translation and 5 pages of Official Copy).
Office Action received for Mexican Patent Application No. MX/a/2023/005388, mailed on Dec. 15, 2023, 18 pages (9 pages of English Translation and 9 pages of Official Copy).
Office Action received for Mexican Patent Application No. MX/a/2023/005388, mailed on Jun. 2, 2023, 24 pages (12 pages of English Translation and 12 pages of Official Copy).
Office Action received for Taiwanese Patent Application No. 099132253, mailed on Jun. 24, 2013, 16 pages (8 pages of English Translation and 8 pages of Official Copy).
Office Action received for Taiwanese Patent Application No. 099132253, mailed on Mar. 27, 2014, 10 pages (4 pages of English Translation and 6 pages of Official Copy).
Office Action received for Taiwanese Patent Application No. 099132254, mailed on May 27, 2013, 24 pages (12 pages of English Translation and 12 pages of Official Copy).
Sharf et al., "SnapPaste: an interactive technique for easy mesh composition", The Visual Computer; International Journal of Computer Graphics, Springer, Berlin, De, vol. 22, No. 9-11, Available Online at <http://dx.doi.org/10.1007/s00371-006-0068-5>, Aug. 25, 2006, pp. 835-844.
Supplemental Notice of Allowance received for U.S. Appl. No. 17/484,899, mailed on Oct. 29, 2024, 5 pages.
Supplemental Notice of Allowance received for U.S. Appl. No. 17/484,899, mailed on Sep. 30, 2024, 5 pages.
Applicant-Initiated Interview Summary received for U.S. Appl. No. 18/165,144, mailed on Dec. 23, 2024, 4 pages.
Notice of Allowance received for U.S. Appl. No. 17/745,680, mailed on Dec. 12, 2024, 2 pages.
Office Action received for Australian Patent Application No. 2023201057, mailed on Dec. 19, 2024, 4 pages.
Applicant-Initiated Interview Summary received for U.S. Appl. No. 18/067,350, mailed on Nov. 26, 2024, 3 pages.
Applicant-Initiated Interview Summary received for U.S. Appl. No. 18/140,449, mailed on Nov. 26, 2024, 2 pages.
Corrected Notice of Allowance received for U.S. Appl. No. 17/745,680, mailed on Nov. 20, 2024, 2 pages.
Intention to Grant received for European Patent Application No. 24160234.1, mailed on Nov. 4, 2024, 9 pages.
International Preliminary Report on Patentability received for PCT Patent Application No. PCT/US2023/020569, mailed on Nov. 21, 2024, 16 pages.
Notice of Allowance received for U.S. Appl. No. 17/483,679, mailed on Nov. 21, 2024, 8 pages.
Notice of Allowance received for U.S. Appl. No. 17/745,680, mailed on Nov. 12, 2024, 8 pages.

* cited by examiner

DISPLAYING AND MOVING APPLICATION VIEWS ON A DISPLAY OF AN ELECTRONIC DEVICE

CROSS-REFERENCE TO RELATED APPLICATIONS

This application claims priority to U.S. Provisional Patent Application No. 62/506,548, filed May 15, 2017, titled "DISPLAYING A SET OF APPLICATION VIEWS," the content of which is hereby incorporated by reference in its entirety.

This application relates to U.S. Provisional Patent Application No. 62/348,849, entitled "DISPLAYING AND UPDATING A SET OF APPLICATION VIEWS," filed on Jun. 10, 2016, the content of which is hereby incorporated by reference in its entirety.

FIELD

The present disclosure relates generally to computer user interfaces, and more specifically to techniques for displaying application views.

BACKGROUND

Many modern electronic devices provide the capability to select and open applications for accessing the content and functionality of the applications. Some techniques for selecting and opening applications are based on scrolling through many applications. These techniques can be cumbersome and inefficient.

BRIEF SUMMARY

Some techniques for selecting and opening applications using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for selecting and opening applications. Such methods and interfaces optionally complement or replace other methods for selecting and opening applications. Such methods and interfaces reduce the cognitive burden on a user and produce a more efficient human-machine interface. For battery-operated computing devices, such methods and interfaces conserve power and increase the time between battery charges.

In some embodiments, a method is performed at an electronic device with a display, one or more processors, memory, and a rotatable input mechanism, where the rotatable input mechanism is rotatable around a rotation axis substantially perpendicular to a normal axis that is normal to a face of the display. The method includes detecting a first user input, and, in response to detecting the first user input, displaying a first subset of application views of a set of application views, where the first subset of application views is displayed along a first dimension of the display that is substantially perpendicular to both the rotation axis and the normal axis. A rotation of the rotatable input mechanism is detected, and, in response to detecting the rotation of the rotatable input mechanism, a second subset of application views of the set of application views is displayed. Displaying the second subset of application views includes moving the set of application views on the display along the first dimension of the display.

In some embodiments, a non-transitory computer-readable storage medium stores one or more programs configured to be executed by one or more processors of an electronic device with a display and a rotatable input mechanism, where the rotatable input mechanism is rotatable around a rotation axis substantially perpendicular to a normal axis that is normal to a face of the display. The one or more programs include instructions for detecting a first user input, and, in response to detecting the first user input, displaying a first subset of application views of a set of application views, where the first subset of application views is displayed along a first dimension of the display that is substantially perpendicular to both the rotation axis and the normal axis. The one or more programs further include detecting a rotation of the rotatable input mechanism, and, in response to detecting the rotation of the rotatable input mechanism, displaying a second subset of application views of the set of application views, where displaying the second subset of application views includes moving the set of application views on the display along the first dimension of the display.

In some embodiments, a transitory computer-readable storage medium stores one or more programs configured to be executed by one or more processors of an electronic device with a display and a rotatable input mechanism, where the rotatable input mechanism is rotatable around a rotation axis substantially perpendicular to a normal axis that is normal to a face of the display. The one or more programs include instructions for detecting a first user input, and, in response to detecting the first user input, displaying a first subset of application views of a set of application views, where the first subset of application views is displayed along a first dimension of the display that is substantially perpendicular to both the rotation axis and the normal axis. The one or more programs further include detecting a rotation of the rotatable input mechanism, and, in response to detecting the rotation of the rotatable input mechanism, displaying a second subset of application views of the set of application views, where displaying the second subset of application views includes moving the set of application views on the display along the first dimension of the display.

In some embodiments, an electronic device includes a display, a rotatable input mechanism rotatable around a rotation axis substantially perpendicular to a normal axis that is normal to a face of the display, one or more processors, and memory storing one or more programs configured to be executed by the one or more processors. The one or more programs include instructions for detecting a first user input, and, in response to detecting the first user input, displaying a first subset of application views of a set of application views, where the first subset of application views is displayed along a first dimension of the display that is substantially perpendicular to both the rotation axis and the normal axis. The one or more programs further include instructions for detecting a rotation of the rotatable input mechanism, and, in response to detecting the rotation of the rotatable input mechanism, displaying a second subset of application views of the set of application views, where displaying the second subset of application views includes moving the set of application views on the display along the first dimension of the display.

In some embodiments, an electronic device includes a display, a rotatable input mechanism rotatable around a rotation axis substantially perpendicular to a normal axis that is normal to a face of the display. The electronic device further includes means for detecting a first user input and means for, in response to detecting the first user input, displaying a first subset of application views of a set of application views, where the first subset of application views is displayed along a first dimension of the display that is substantially perpendicular to both the rotation axis and the normal axis. The electronic device further includes means for detecting a rotation of the rotatable input mechanism and means for, in response to detecting the rotation of the rotatable input mechanism, displaying a second subset of application views of the set of application views, where displaying the second subset of application views includes moving the set of application views on the display along the first dimension of the display.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for selecting and opening applications, thereby increasing the effectiveness, efficiency, and user satisfaction with such devices. Such methods and interfaces may complement or replace other methods for selecting and opening applications.

DESCRIPTION OF THE FIGURES

For a better understanding of the various described embodiments, reference should be made to the Description of Embodiments below, in conjunction with the following drawings in which like reference numerals refer to corresponding parts throughout the figures.

DESCRIPTION OF EMBODIMENTS

Figure 1A:
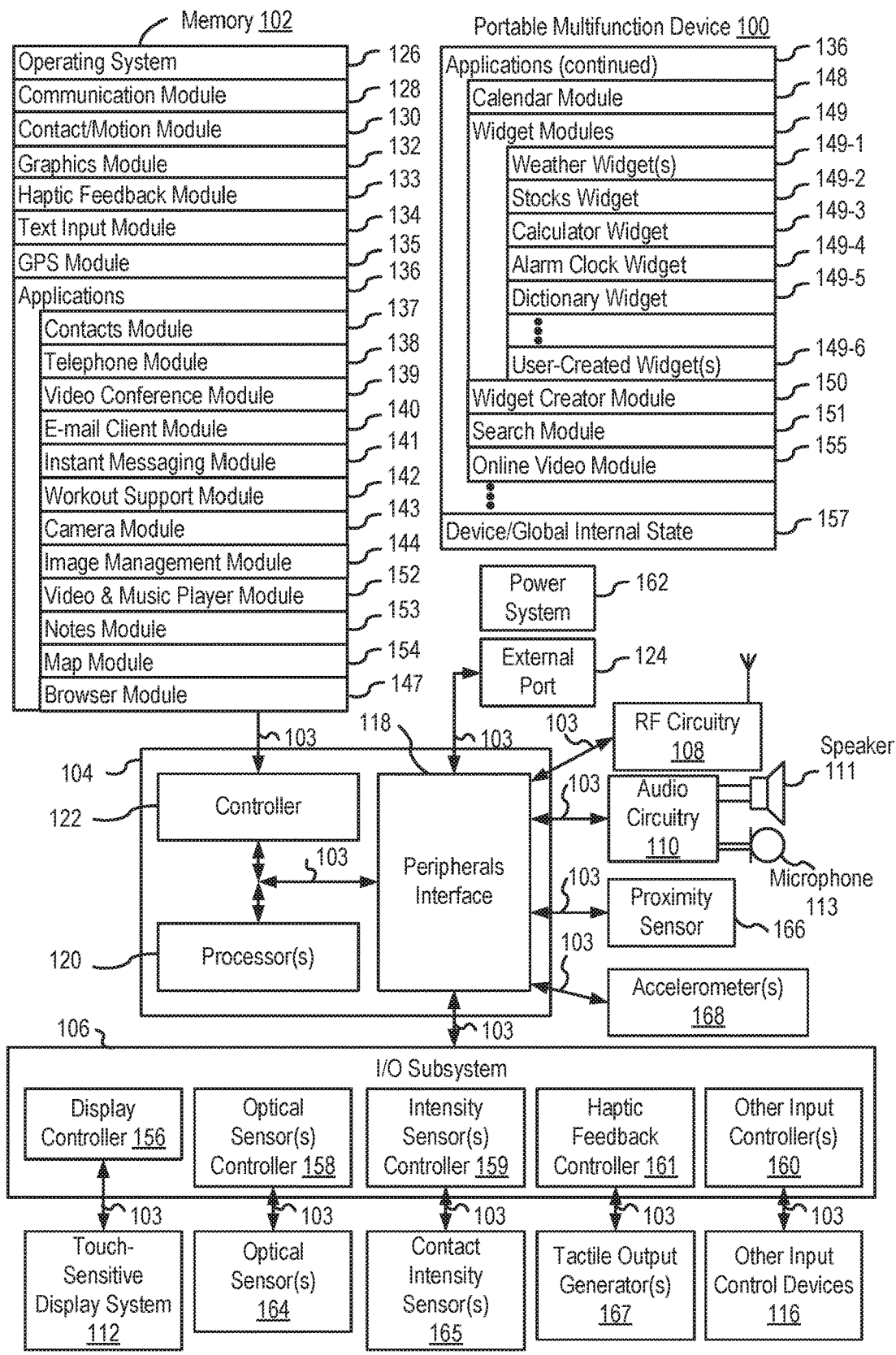
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for selecting and opening applications. In one example, a device displays a plurality of application views that can be selected to open corresponding applications. The application views are navigated by rotating an input mechanism, which moves the application views on the display of the device. The arrangement and movement of the application views are intuitively aligned with the rotation of the input mechanism based on the physical configuration of the device. Such techniques can reduce the cognitive burden on a user who accesses applications on an electronic device, thereby enhancing productivity. Further, such techniques can reduce processor and battery power otherwise wasted on redundant user inputs.

Below, FIGS. 1A-1B, 2, 3, 4A-4B, and 5A-5H provide a description of exemplary devices for performing techniques for selecting and opening applications. FIGS. 6A-6AH illustrate exemplary user interfaces for selecting and opening applications. FIGS. 7A-7D are flow diagrams illustrating methods of selecting and opening applications in accordance with some embodiments. The user interfaces in FIGS. 6A-6AH are used to illustrate the processes described below, including the processes in FIGS. 7A-7D.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoW), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; U.S. patent application Ser. No. 11/240,788, "Proximity Detector In Handheld Device"; U.S. patent application Ser. No. 11/620,702, "Using Ambient Light Sensor To Augment Proximity Sensor Output"; U.S. patent application Ser. No. 11/586,862, "Automated Response To And Sensing Of User Activity In Portable Devices"; and U.S. patent application Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
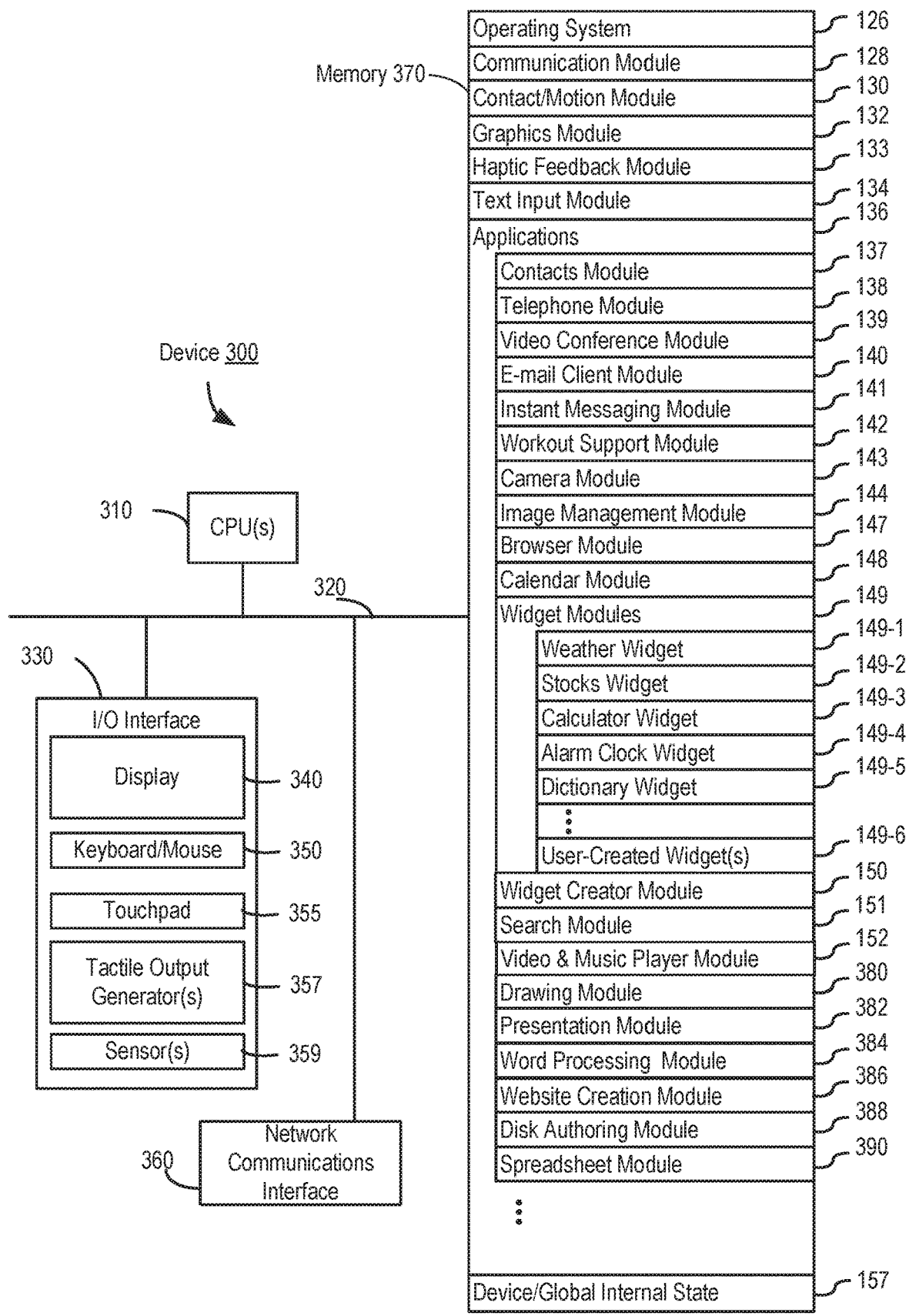
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
 Contacts module 137 (sometimes called an address book or contact list);
 Telephone module 138;
 Video conference module 139;
 E-mail client module 140;
 Instant messaging (IM) module 141;
 Workout support module 142;
 Camera module 143 for still and/or video images;
 Image management module 144;
 Video player module;
 Music player module;
 Browser module 147;
 Calendar module 148;
 Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
 Widget creator module 150 for making user-created widgets 149-6;
 Search module 151;
 Video and music player module 152, which merges video player module and music player module;
 Notes module 153;
 Map module 154; and/or
 Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
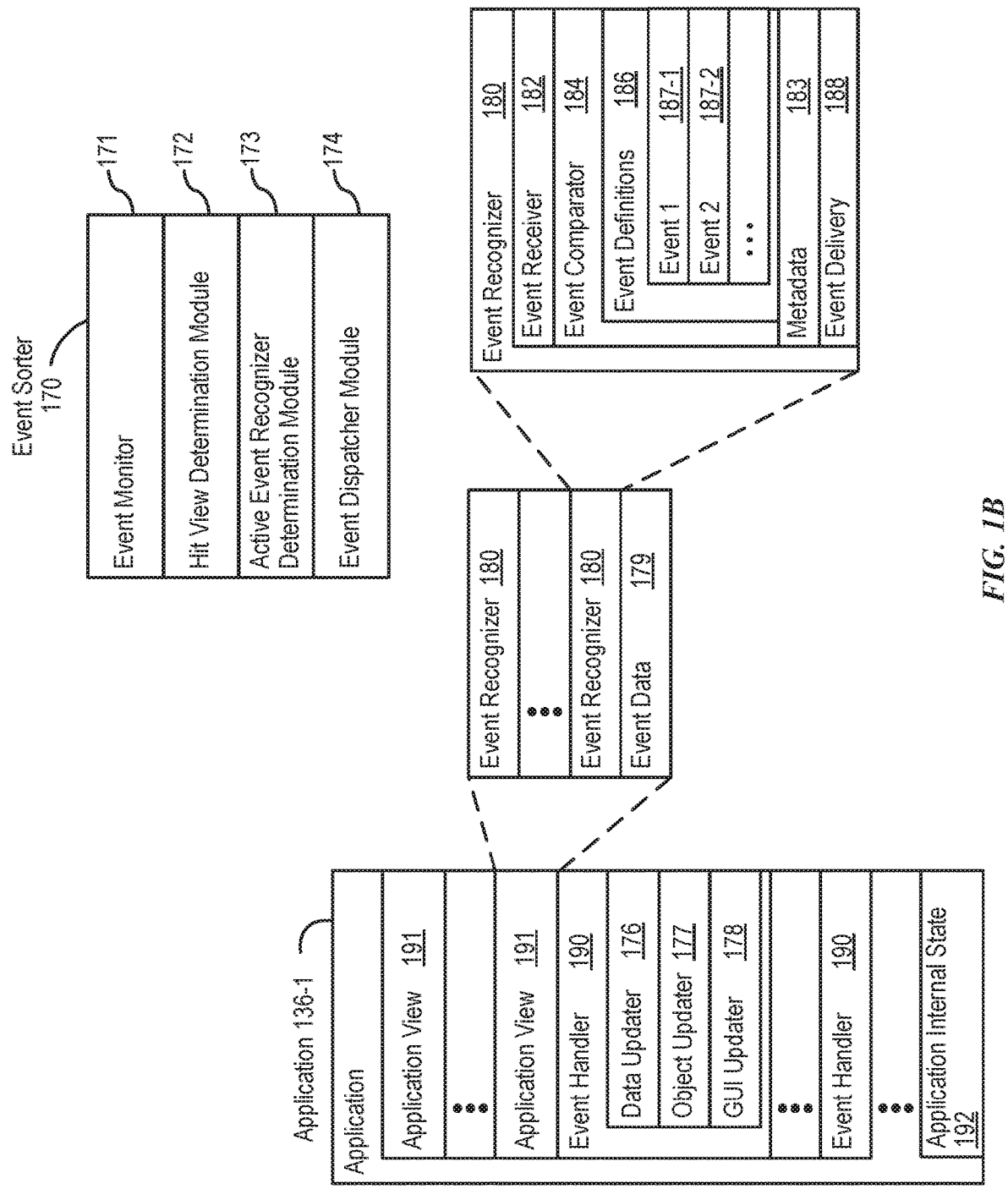
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180).

In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
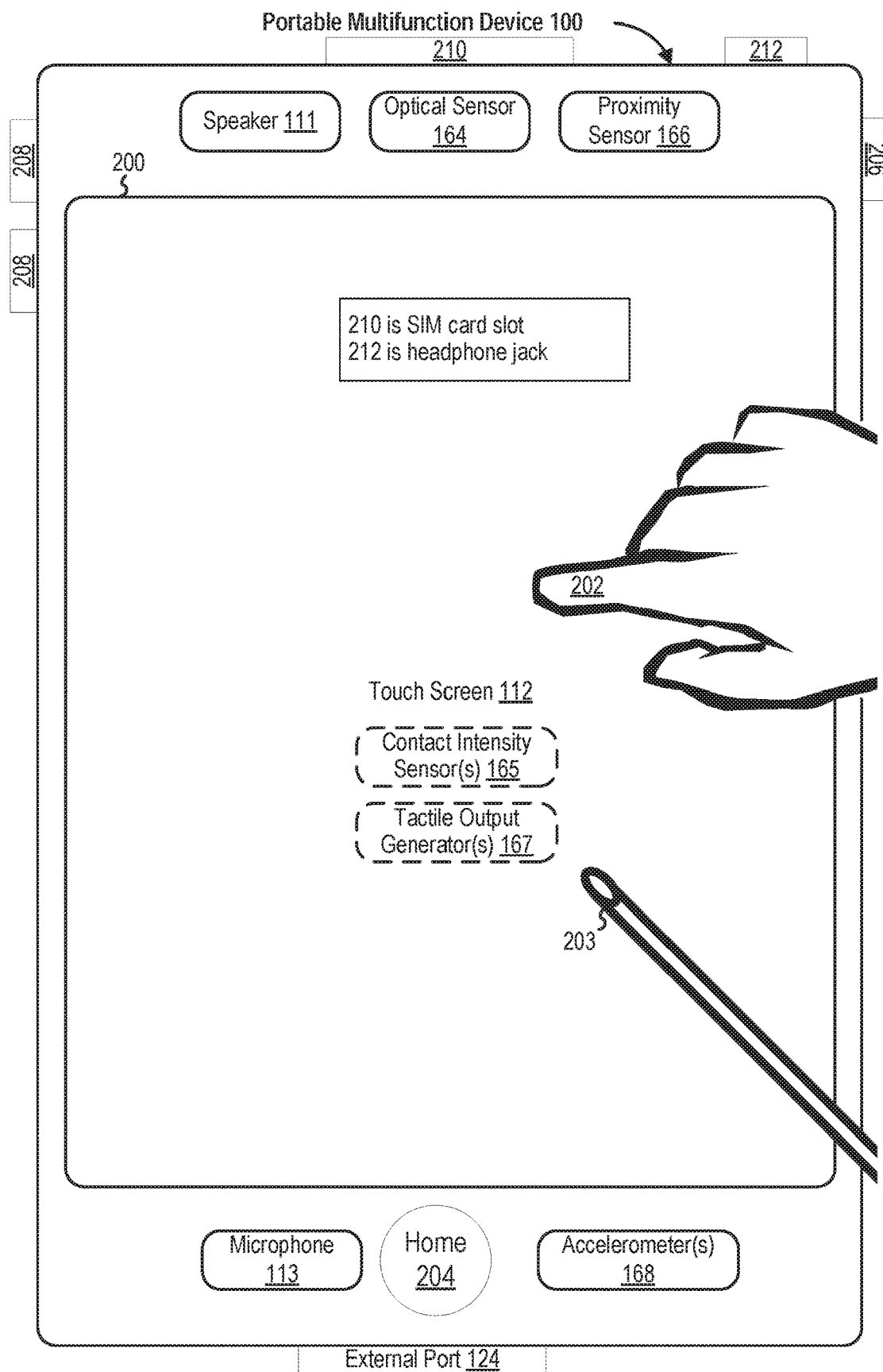
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
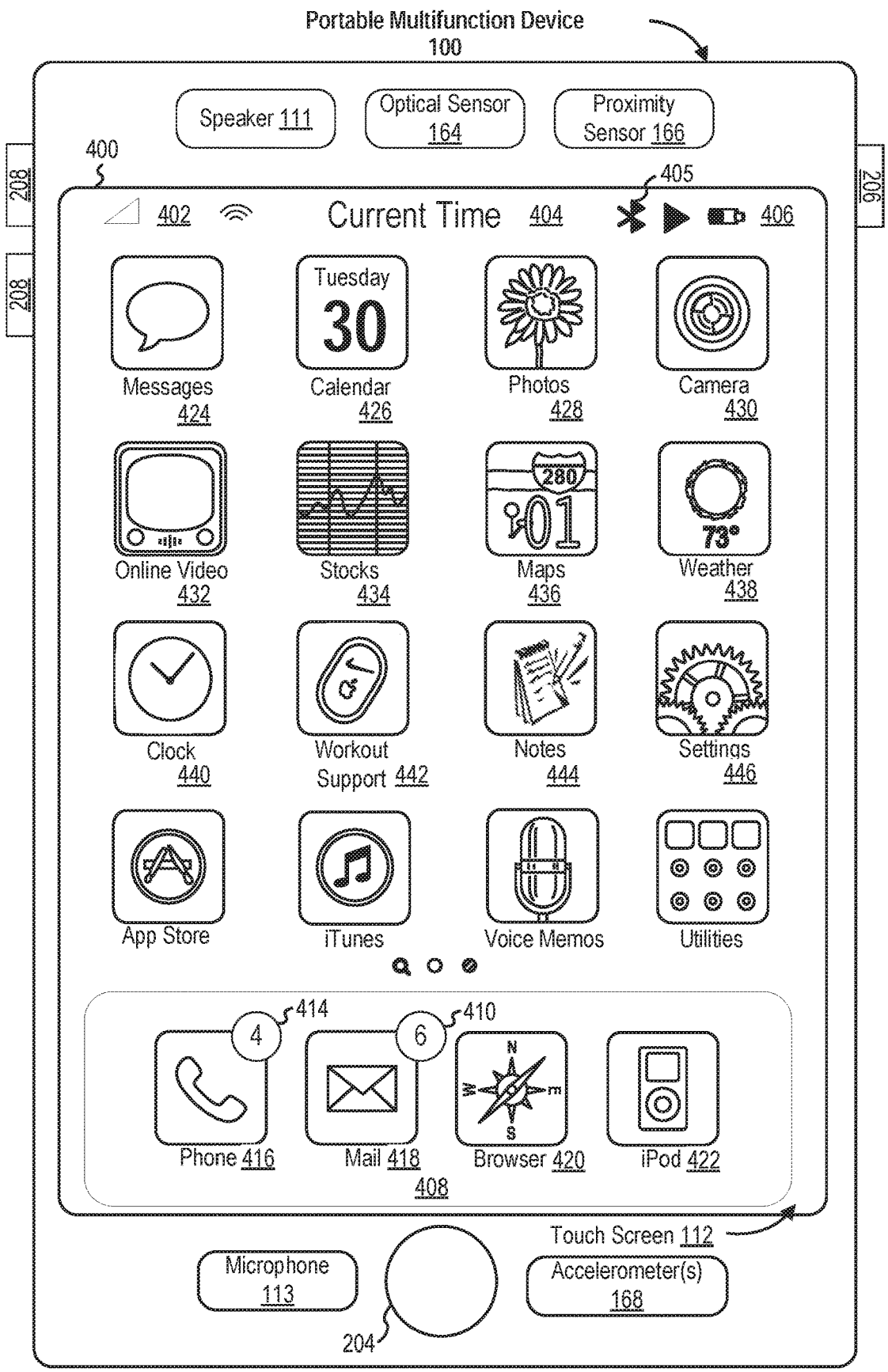
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
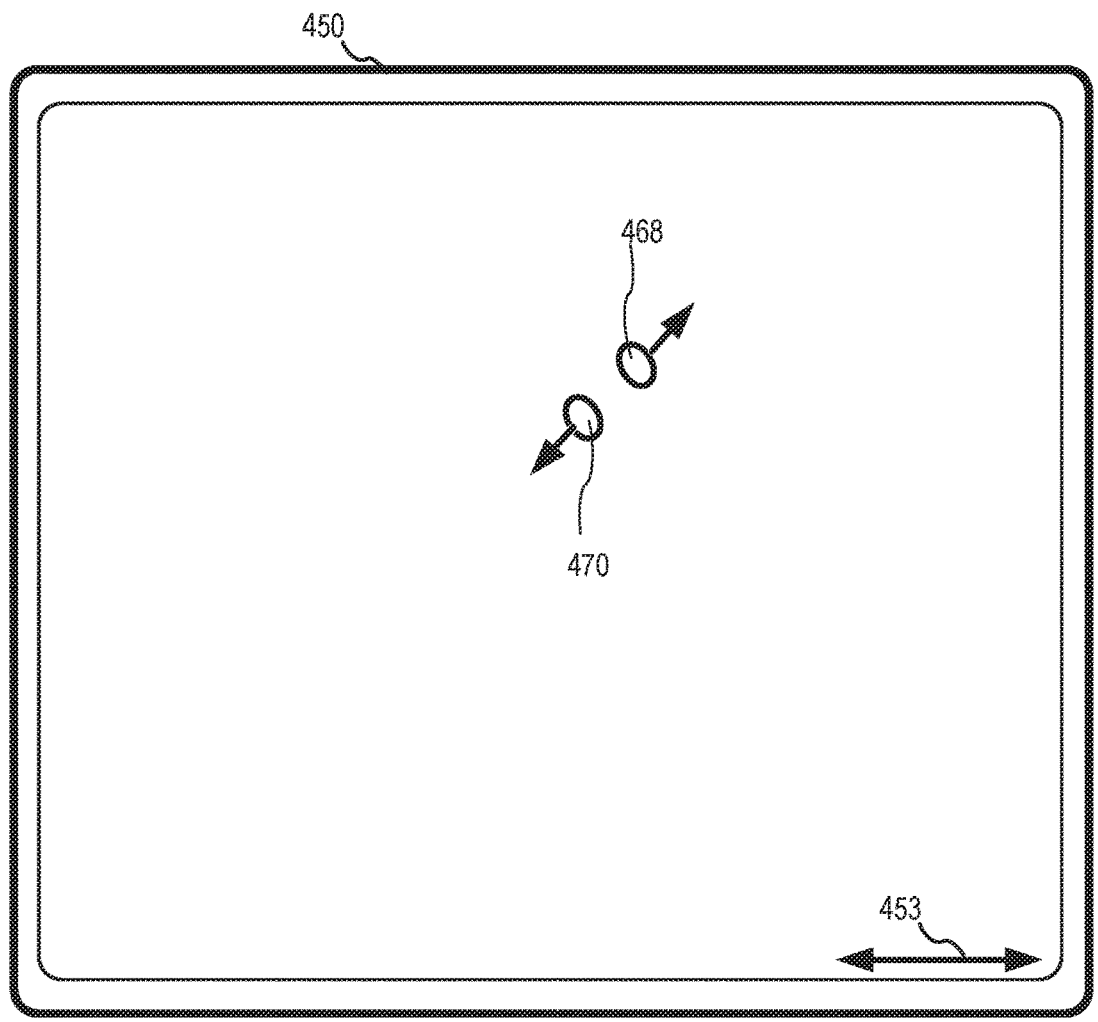
FIG. 4B illustrates an exemplary user interface for a multifunction device with a touch-sensitive surface that is separate from the display in accordance with some embodiments.
Figure 4B:
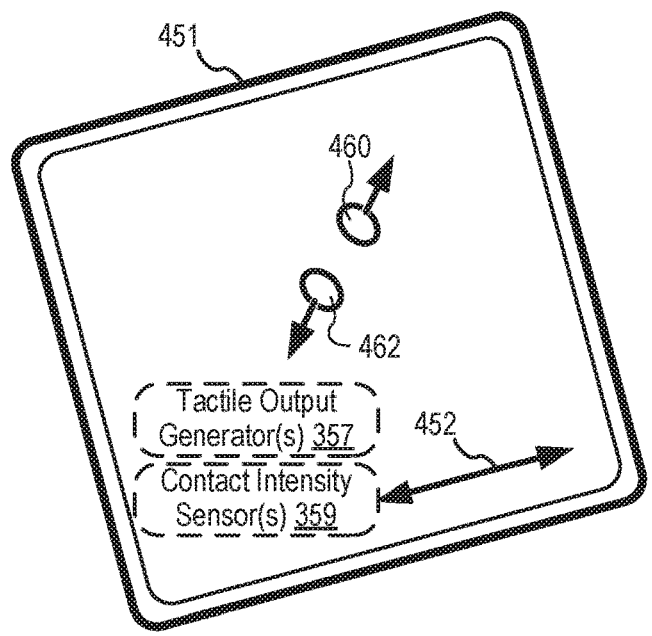

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
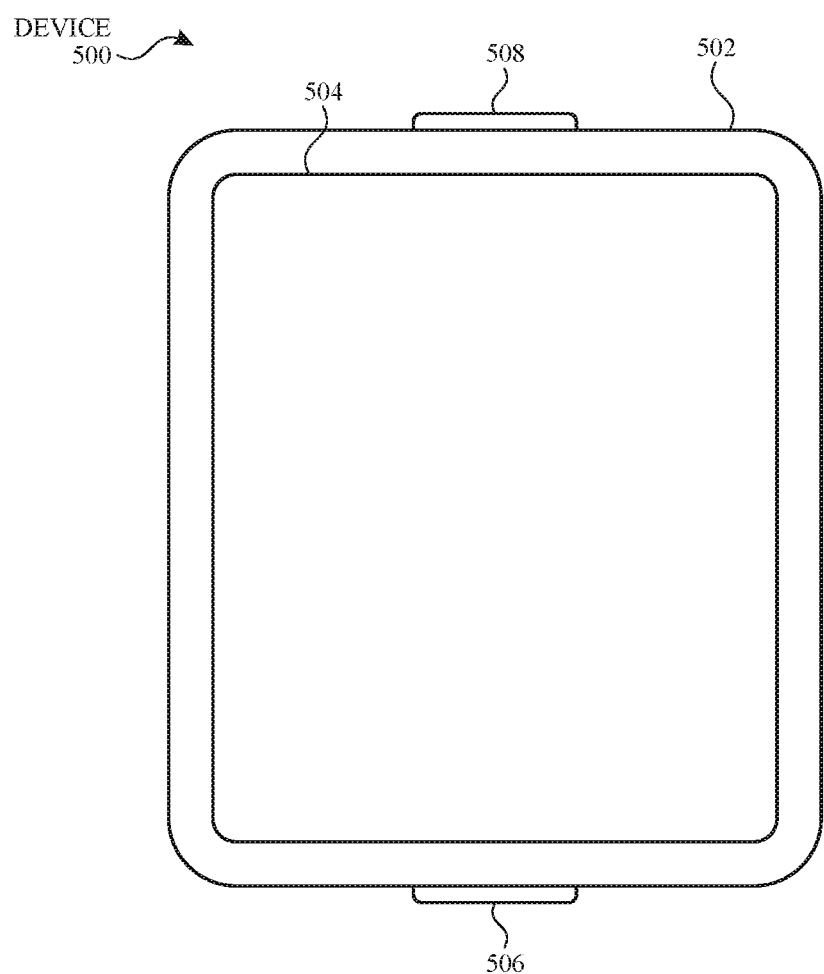
FIG. 5A illustrates a personal electronic device in accordance with some embodiments.
Figure 6A:
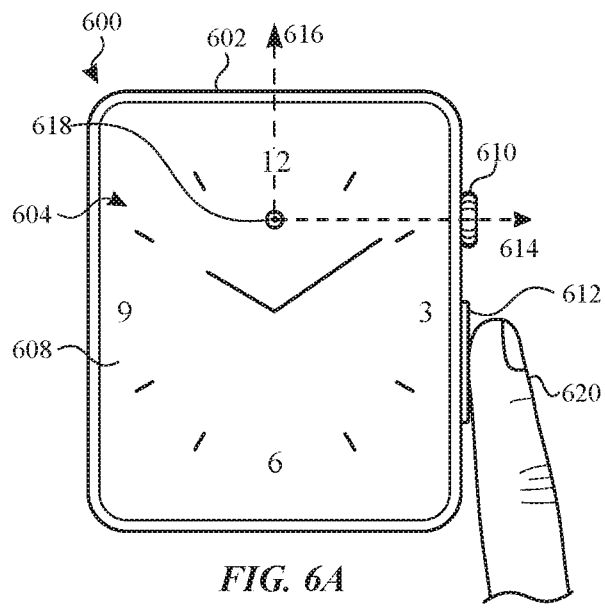
FIGS. 6A-6AH illustrate exemplary user interfaces in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Ser. No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Ser. No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
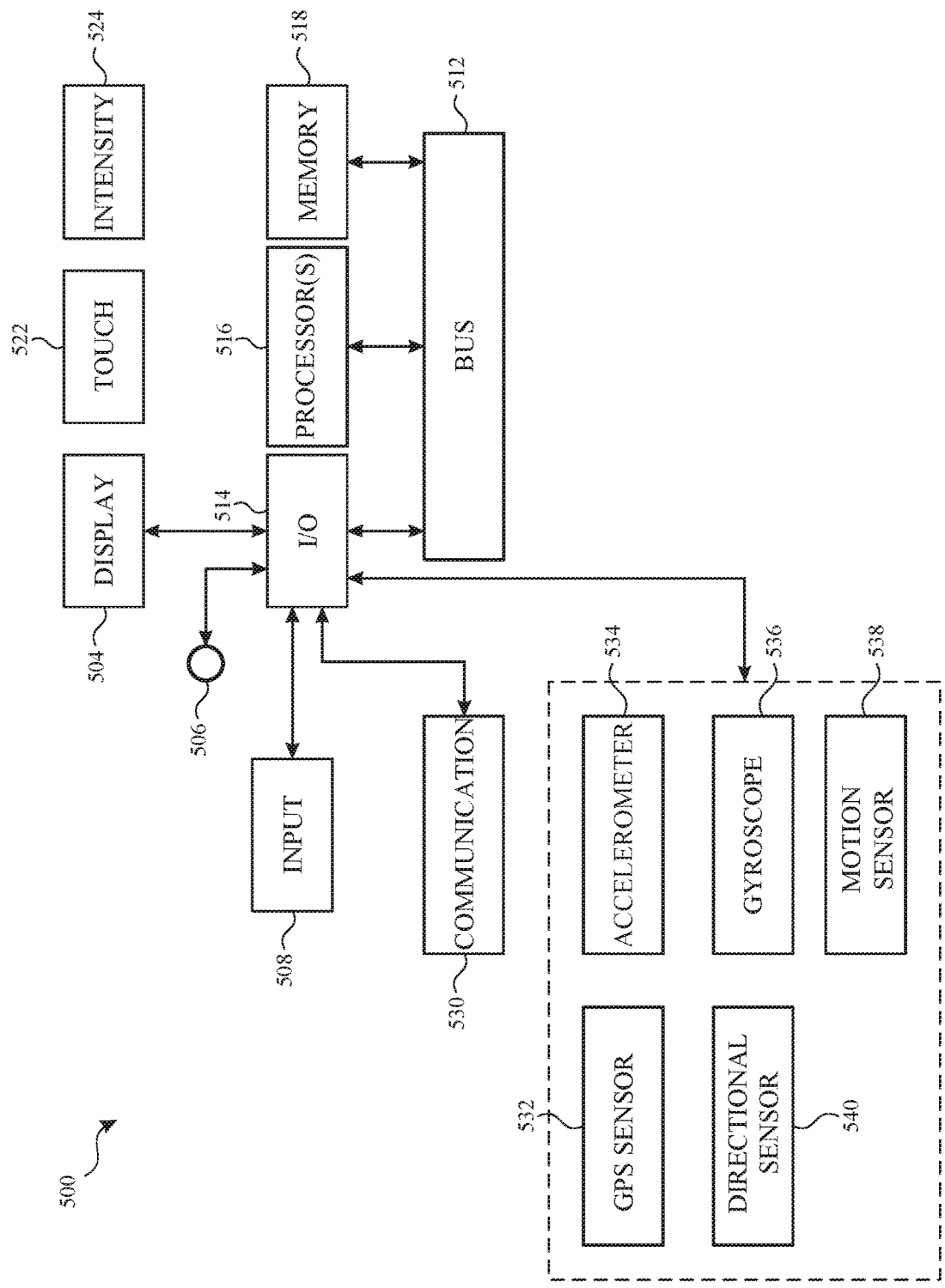
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including process 700 (FIGS. 7A-7D). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
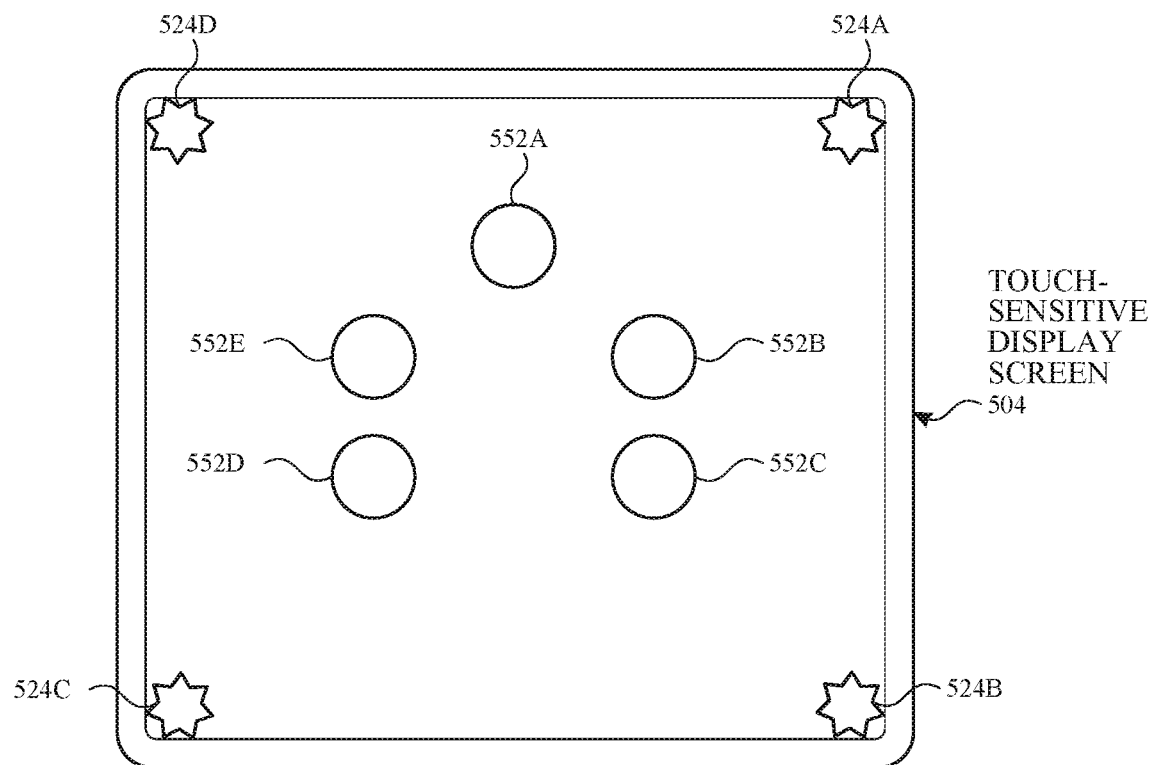
FIGS. 5C-5D illustrate exemplary components of a personal electronic device having a touch-sensitive display and intensity sensors in accordance with some embodiments.
Figure 5C:
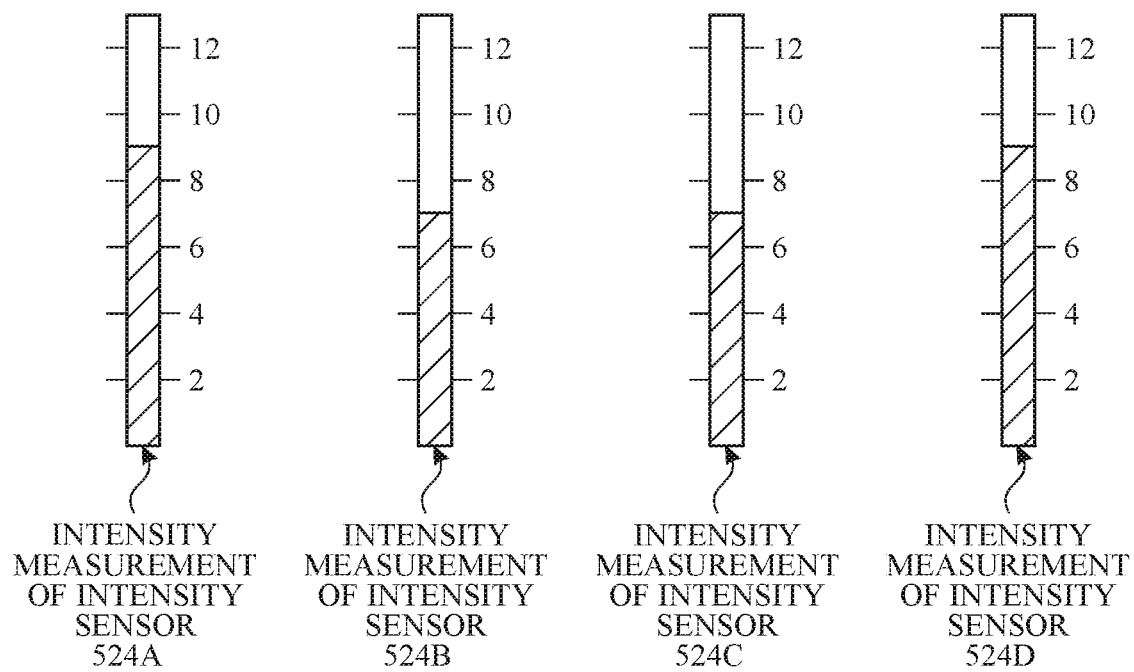
Figure 5D:
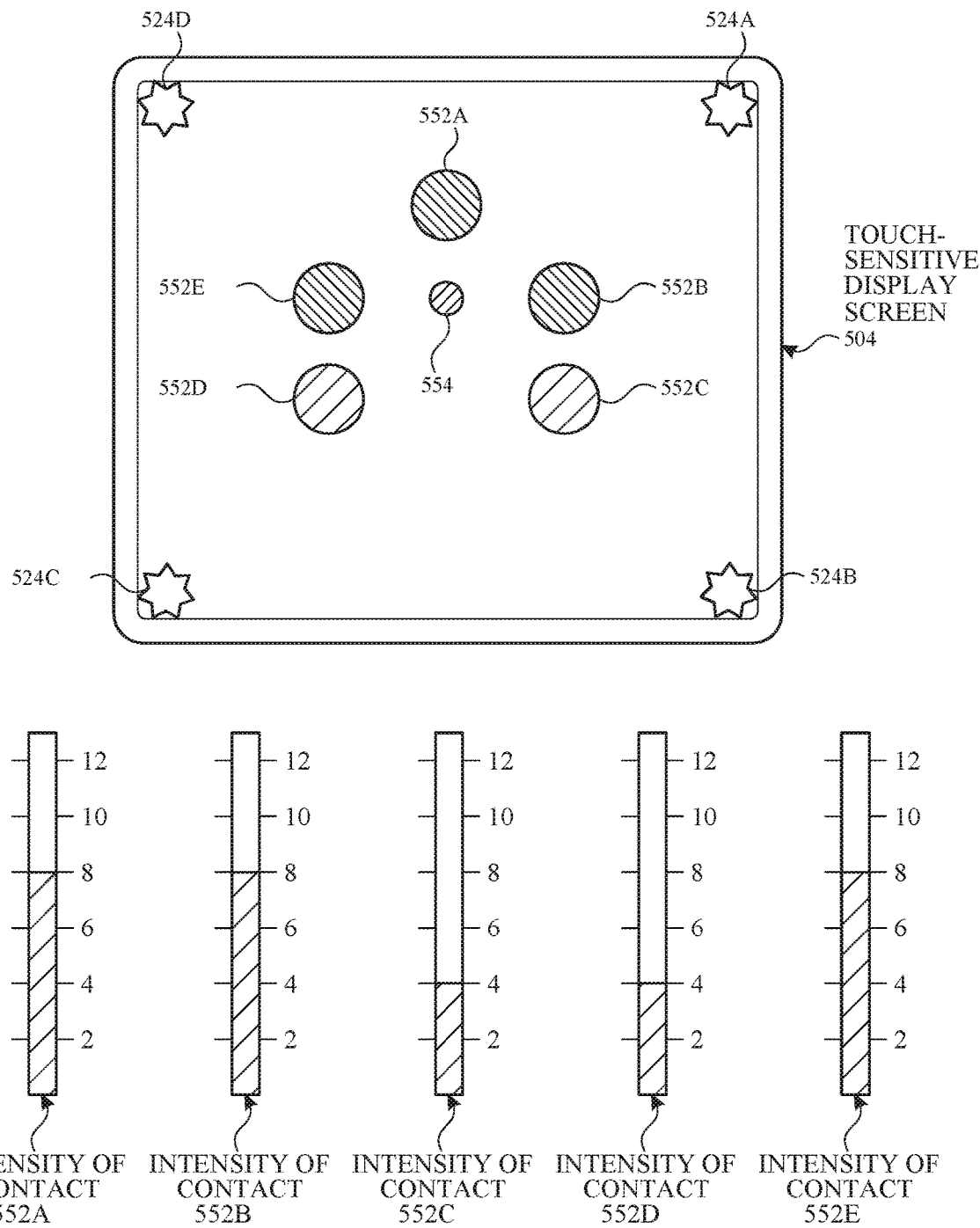

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A \cdot (Dj/\Sigma Di)$, where Dj is the distance of the respective contact j to the center of force, and $\Sigma Di$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
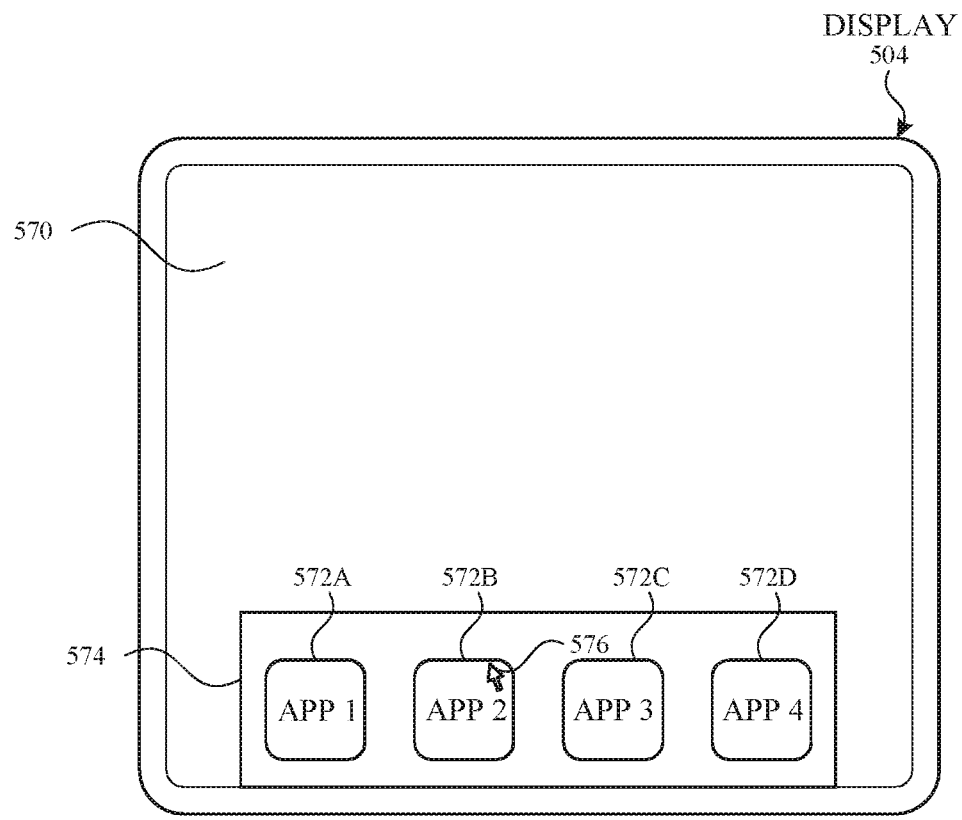
FIGS. 5E-5H illustrate exemplary components and user interfaces of a personal electronic device in accordance with some embodiments.
Figure 5F:
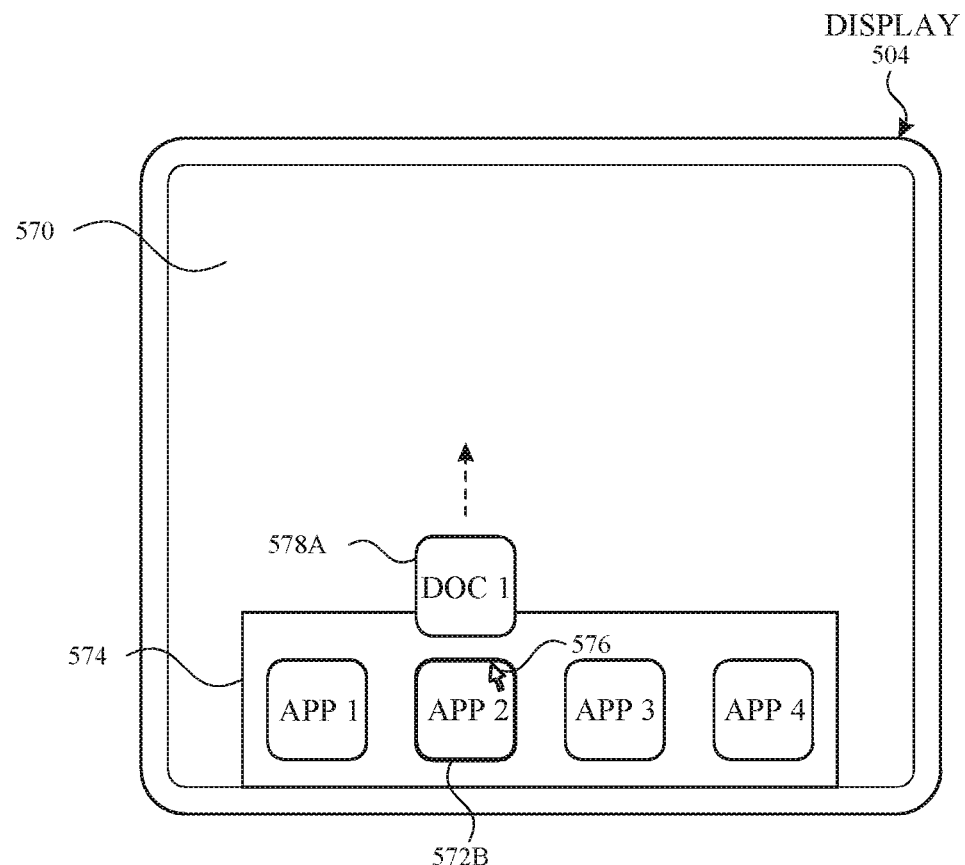
Figure 5F:
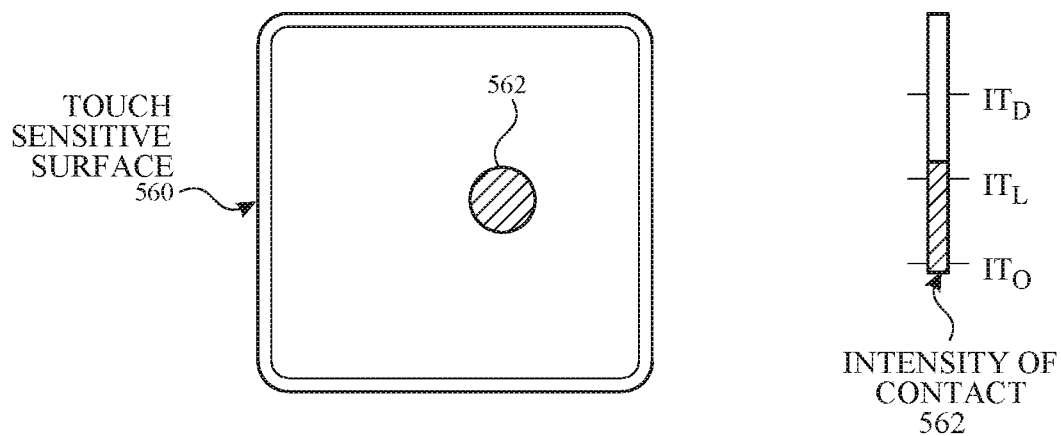
Figure 5G:
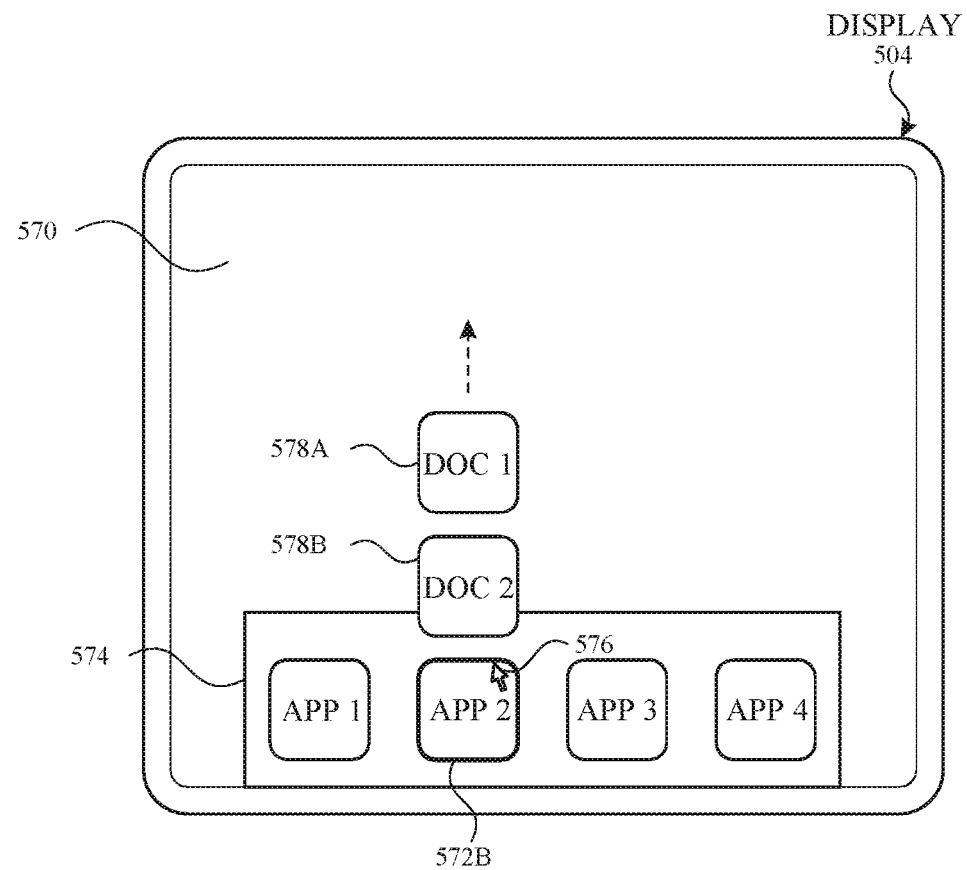
Figure 5G:
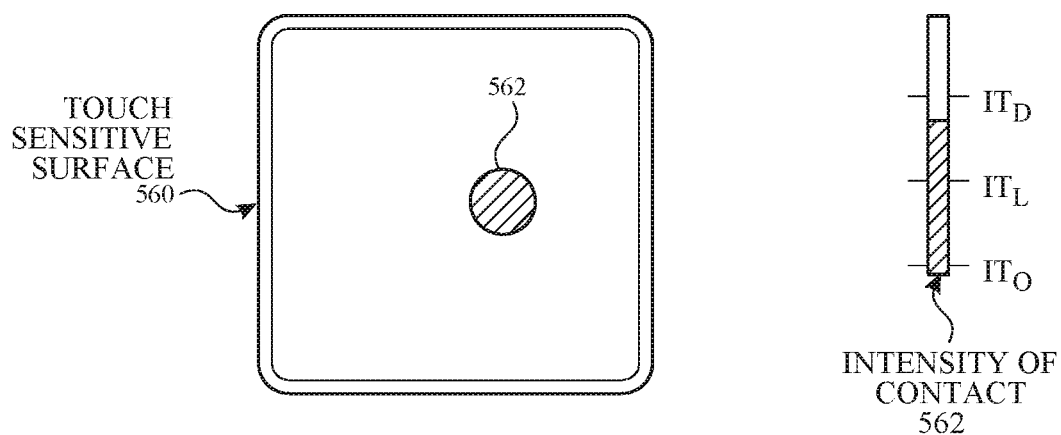
Figure 5H:
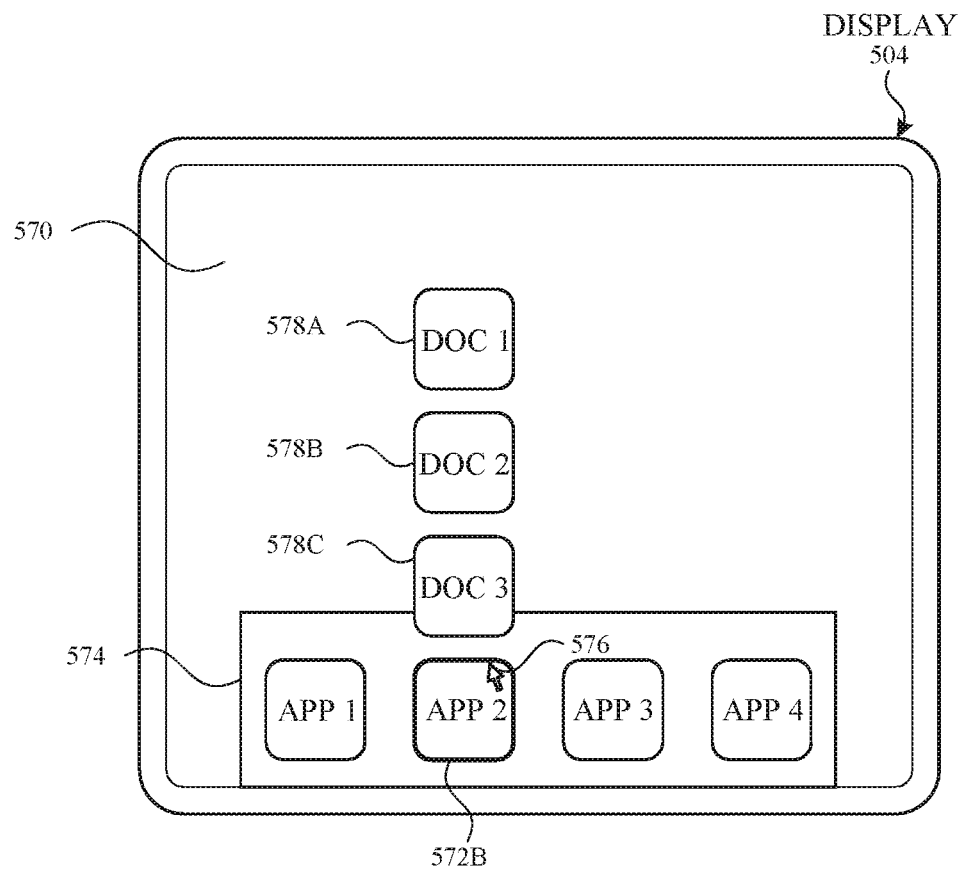
Figure 5H:
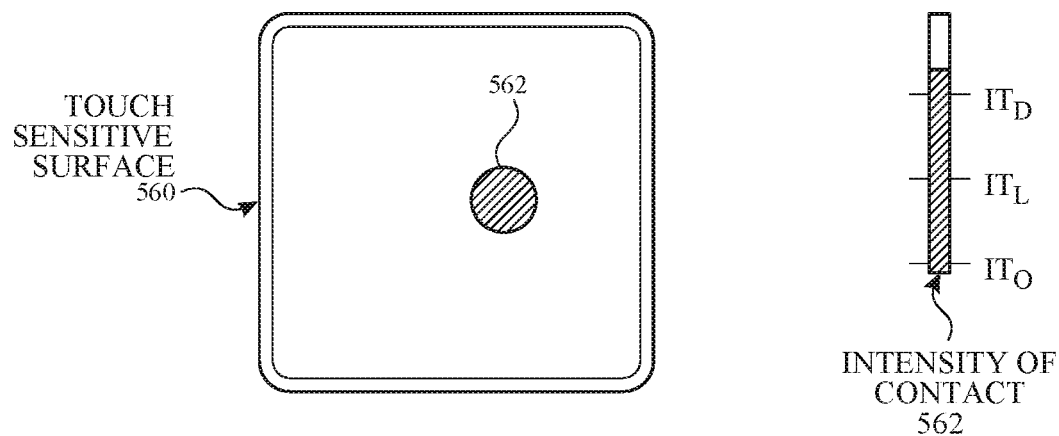

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

FIGS. 6A-6AH illustrate exemplary user interfaces for displaying application views in a set of application views, in accordance with some embodiments. The user interfaces in these figures are used to illustrate the processes described below, including the processes in FIGS. 7A-7D.

FIG. 6A illustrates device 600 with touch-sensitive display 602. Device 600 may be device 100, 300, or 500 in some embodiments. User interface 604 is displayed on touch-sensitive display 602. User interface 604, as illustrated in FIG. 6A, includes watch face 608 of a watch application. In some embodiments, user interface 604 includes a user interface for an application or an application springboard that includes a plurality of affordances (e.g., a menu) for launching respective applications.

Device 600 includes various input mechanisms that receive user input, such as, rotatable input mechanism 610, that is able to receive a rotatable input (and may also receive a push input), and input mechanism 612 that is able to receive a push user input. Rotatable input mechanism 610, as illustrated in FIG. 6A, is in a fixed position on the right side of device 600 and is rotatable about a rotation axis 614. Rotation axis 614 is normal to the plane of rotation in which rotatable input mechanism 610 rotates. Rotation axis 614 is also substantially perpendicular to normal axis 615 (represented by a dot in FIG. 6A to indicate that it points out of the page), which is normal to the surface of touch-sensitive display 602. Axis 616 represents a first dimension of display 602 that is substantially perpendicular to both rotation axis 614 and normal axis 615.

In response to detecting user input 620 at input mechanism 612, a plurality of application views of a set of application views 630 are displayed. In some embodiments, the plurality of application views are displayed in response to other types of user inputs, such as a tap or a swipe (e.g., a vertical swipe up or down) on touch-sensitive display 602. The set of application views 630 are a sequential list of application views that correspond to respective applications. The set of application views 630 can include any number of application views (e.g., ten application views) that correspond to a respective number of applications. In some embodiments, the number of application views in the set of application views is predefined.

Figure 6B:
Figure 6C:
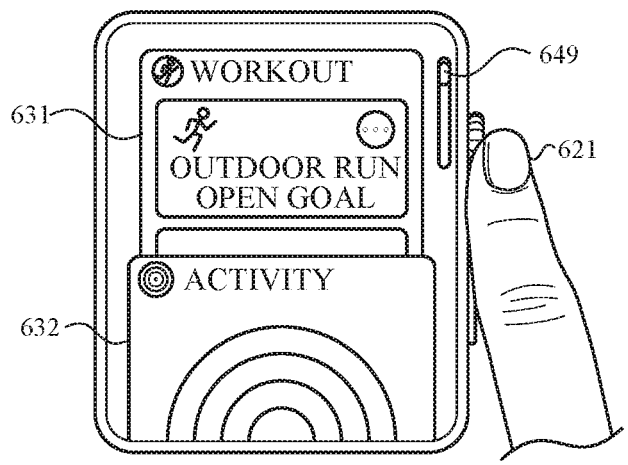
Figure 6D:
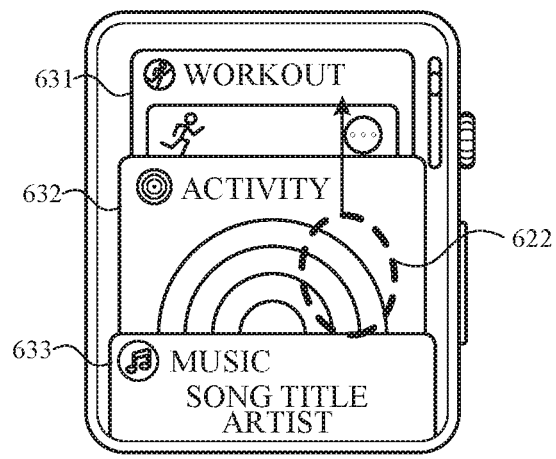
Figure 6E:
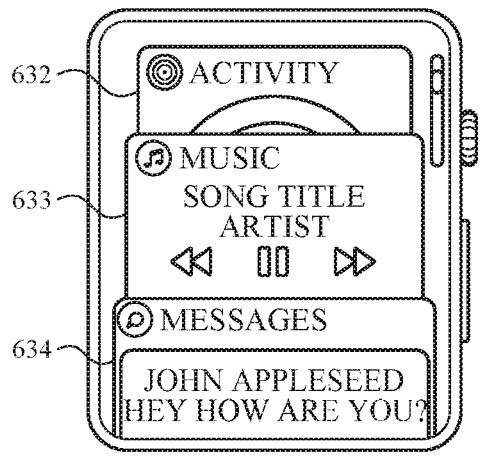
Figure 6F:
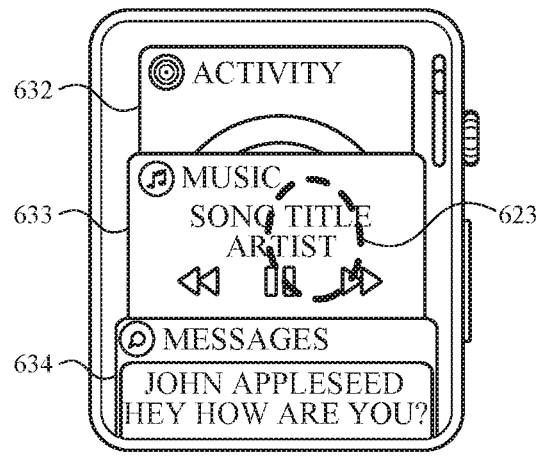
Figure 6G:
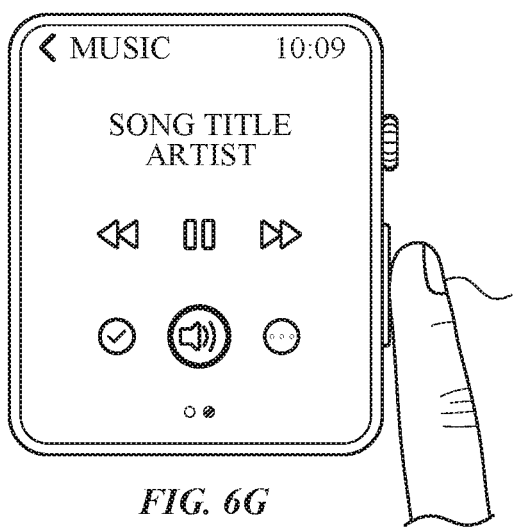
Figure 6H:
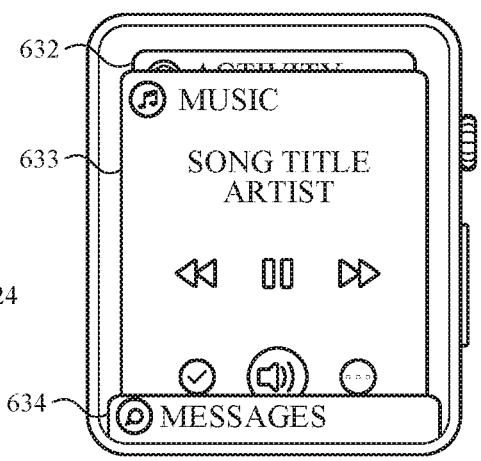
Figure 6I:
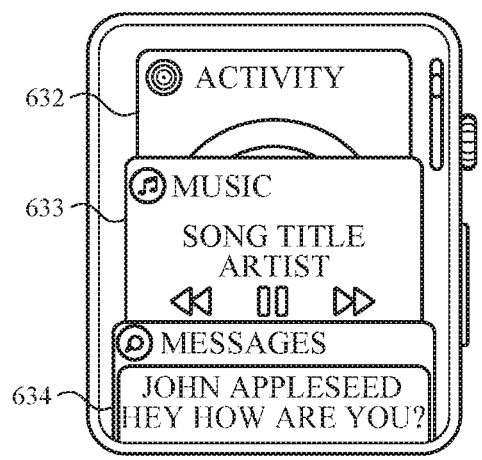
Figure 6J:
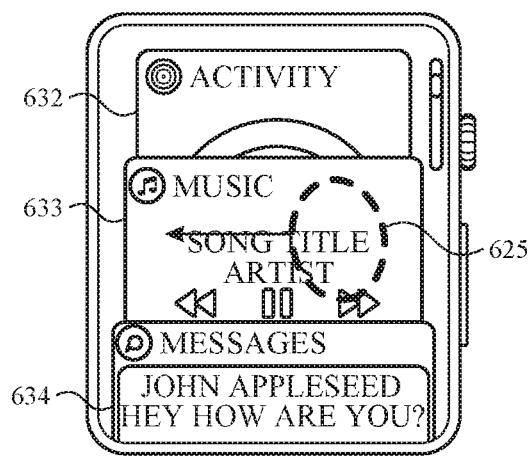
Figure 6K:
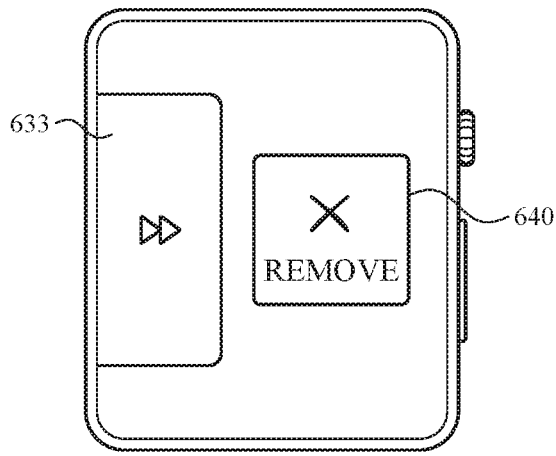
Figure 6L:
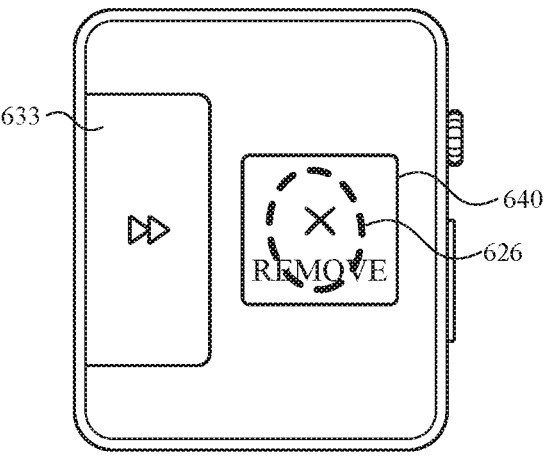
Figure 6M:
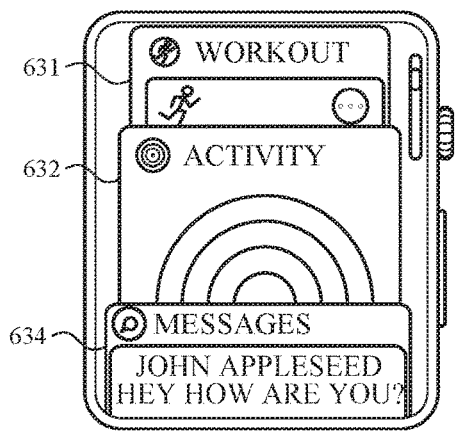
Figure 6N:
Figure 6O:
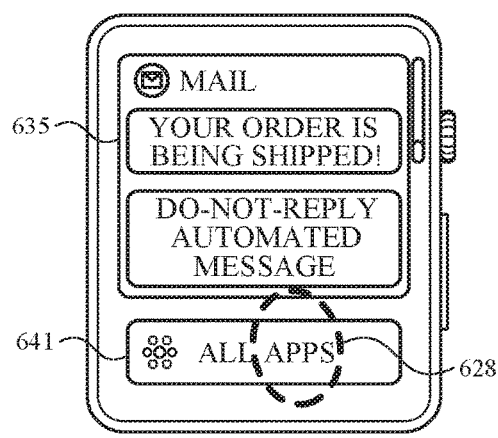
Figure 6P:
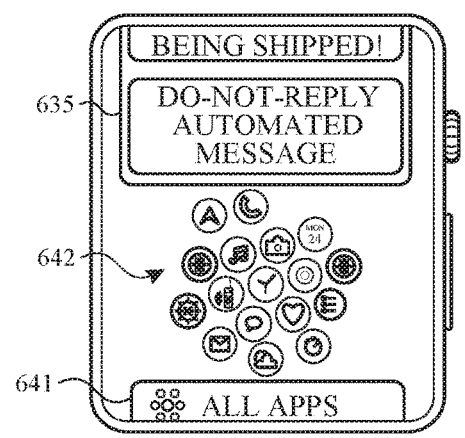
Figure 6Q:
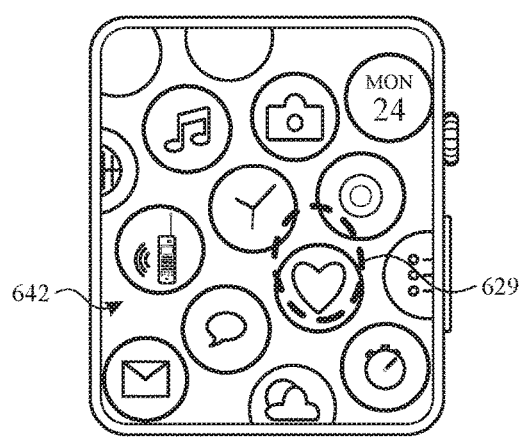
Figure 6R:
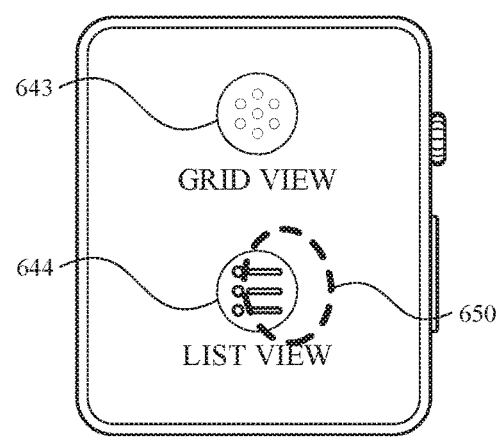
Figure 6S:
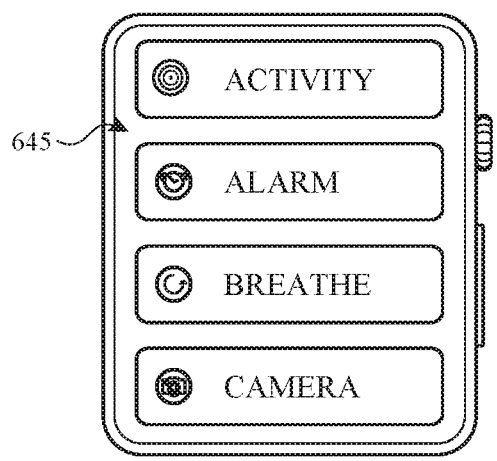
Figure 6T:
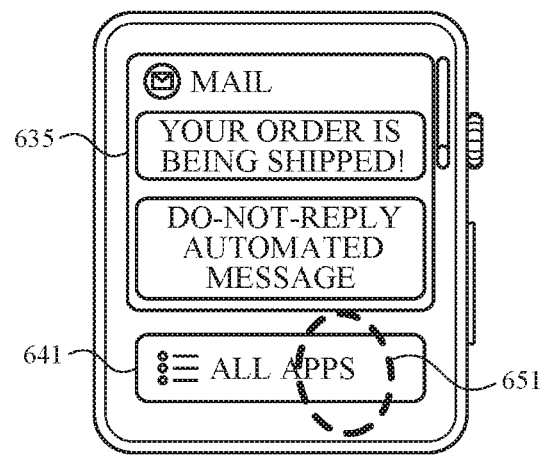
Figure 6U:
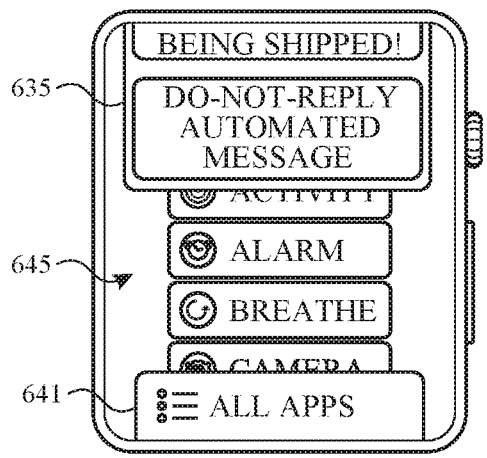
Figure 6V:
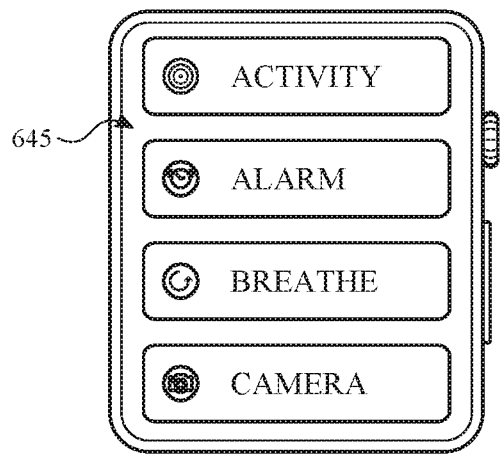

As shown in FIGS. 6B-6V, in some embodiments, the set of application views 630 includes a first application view 631 corresponding to a first application (e.g., workout application), a second application view 632 corresponding to second application (e.g., activity application), a third application view 633 corresponding to a third application (e.g., music application), a fourth application view 634 corresponding to a fourth application (e.g., messages application), and a fifth application view 635 corresponding to a fifth application (e.g., mail application). The set of application views 630 may include one or more application views that are not displayed on display 602 at a given time.

In some embodiments, in response to user input 620, device 600 displays a subset of the set of application views. The subset of application views are displayed along the first dimension of display 602 (e.g., substantially perpendicular to both rotation axis 614 and normal axis 615). According to the configuration of device 600 shown in FIG. 6A, for example, the application views are aligned vertically on display 602. With the rotatable input mechanism 610 positioned on the side of device 600, arranging the application views along a dimension of the display perpendicular to the rotation axis provides an intuitive alignment between the plane of rotation of the rotatable input mechanism and the display of the set of application views.

Referring now to FIGS. 6B-6C, the subset of application views displayed in response to user input 620 includes application view 631 and application view 632, with application view 631 above application view 632, because they are the first and second application views, respectively, in the sequential list of application views. In some embodiments, displaying the subset of application views includes an animation. FIG. 6B illustrates an exemplary transition of an animation between the display of the watch face 608 in FIG. 6A and the subset of application views displayed in response to user input 620 in FIG. 6C. As illustrated, the application views translate onto the display from the bottom edge of the display toward the top of the display.

In some embodiments, as shown in FIG. 6C, the application views include screenshots of corresponding applications (e.g., live or still images of the corresponding applications in a particular state). A partial view of application view 631 is displayed and at least a partial view of application view 632 is displayed below the partial view of application view 631. Application view 631 is smaller than application view 632, and the bottom portion of application view 631 is truncated by the top of application view 632, giving the visual effect that application view 631 is above and behind application view 632 and that application view 632 overlaps application view 631. Alternatively, in some embodiments, the subset of application views displayed in response to user input 620 includes three or more application views (e.g., as shown in FIG. 6D). More generally, the application views are displayed sequentially, with the first application view 631 at the top and the fifth application view 635 at the bottom, and such that an application view appears to be in front of and overlapping the application view before (e.g., above) it. In some embodiments, overlapping the application views allows a greater number of application views to be displayed and offers greater context to the user by providing a visual indication of the order in which the sequence of application views is arranged.

In some embodiments, in response to a user input (e.g., press of input mechanism 612) while displaying the set of application views, device 600 returns to the display that was displayed at the time the input that caused display of the set of application views was detected. In one example, in response to a press of input mechanism 612 while displaying the set of application views in FIG. 6C, device 600 ceases to display application view 631 and application view 632 and displays watch face 608. In another example, in response to a press of input mechanism 612 while displaying an application (e.g., as described below with reference to FIG. 6G), device 600 ceases to display the set of application views and displays the previously displayed application. In some embodiments, the application views are removed from the display according to a reverse of the animation described above for displaying the application views. In one example, the application views translate downward and off the bottom edge of the display.

In some embodiments, each of the application views in the set of application views 630 is an affordance that, when selected, displays the application that corresponds to the application view (e.g., launches the corresponding application or, if the corresponding application is open and running in the background or suspended, switches the display to the application). For example, the selection (e.g., a touch input on the affordance) of application view 631 that corresponds with a workout application launches the workout application. Similarly, the selection of application view 634 that corresponds to a messages application launches the messages application. In some embodiments, the applications respectively corresponding to the set of application views 630 are stored in memory (e.g., volatile memory). As such, the applications corresponding to the respective application views in the set of application views 630 are quickly and easily accessed (e.g., launch instantaneously) in response to selection of the respective application view.

Referring again to FIG. 6C, while application view 631 and application view 632 are displayed, rotational input 621 for scrolling the set of application views is detected at rotatable input mechanism 610. In response to detecting rotational input 621 at rotatable input mechanism 610, a second subset of application views of the set of application views is displayed by moving (e.g., scrolling) the set of application views along the first (e.g., vertical) dimension of the display, as depicted in FIG. 6D. In some embodiments, the application views move in a first direction (e.g., up) along the first dimension in response to a rotation in a first direction (e.g., clockwise), and are moved in a second direction (e.g., down) along the first dimension in response to a rotation in a second direction (e.g., counter-clockwise). Similar to the vertical arrangement of the application views, based on the configuration of the device depicted in FIG. 6A, movement of the application views vertically on the display provides an intuitive response to rotation of the rotatable input mechanism 610 since the movement is substantially parallel to the plane of rotation of rotatable input mechanism 610.

Alternatively, or in addition, to scrolling the application views using the rotatable input mechanism 610, in some embodiments, the set of application views are moved along the first dimension of the display in response to detecting a gesture (e.g., a swipe along the first dimension) on display 602. Optionally, device 600 displays scroll indicator 649 that indicates the position of the sequence of the set of application views that is displayed. The scroll indicator allows the user to quickly and easily determine what portion of the sequence of application views is being displayed. In FIG. 6C, for example, scroll indicator 649 includes a pill at the top of the indicator, which indicates that the beginning of the sequence is displayed. In some embodiments, the scroll indicator is displayed in response to a user input (e.g., user input 620) for displaying the set of application views. In other embodiments, the scroll indicator is displayed in response to a scrolling input (e.g., a rotation of rotatable input mechanism 610 and/or a vertical swipe on display 602).

FIGS. 6C-6D illustrate an example of scrolling the set of application views 630. The set of application views is translated along the first dimension of the display and the size of the application views is changed (e.g., as they translate along the first dimension of the display). The application views are translated and scaled to maintain the appearance that each application view is in front of and overlaps the application view above it. As the set of application views is scrolled toward the end of the sequence of the set of application views, application view 631 is reduced in size, application view 632 translates upward, and previously hidden application view 633 (e.g., the third application view in the sequence of the set of application views) enters the screen from the bottom of the display. This gives the visual impression that the application views move along a three-dimensional curve in a plane parallel to the plane of rotation of rotatable input mechanism 610, with the application views moving up and back into the display when scrolling towards the end of the sequence of the set of application views. Conversely, as the set of application views is scrolled towards the beginning of the sequence of the set of application views, the animation is reversed (e.g., application views increase in size as they translate downward and translate off the bottom edge of the display). This gives the visual impression that the applications views move forward and down along the three-dimensional curve when scrolling towards the beginning of the sequence of the set of application views. In some embodiments, the combination of partially overlapping application views and scrolling along the three-dimensional curve described above reduces the movement of the application views while scrolling. A potential benefit is that the user can navigate through the set of application views more quickly and without becoming disoriented.

FIG. 6E illustrates a result of further scrolling toward the end of the sequence of the set of application views in response to detecting a swipe gesture 622 along the first (e.g., vertical) dimension of display 602 in FIG. 6D. Compared to FIG. 6D, application view 631 is no longer displayed, application view 632 is moved to the top of the display, application view 633 is in the center of the display, and application view 634 is at the bottom of the display.

Scroll indicator 649 is updated in FIGS. 6D-6E as the application views are scrolled to indicate that a lower position of the sequence is displayed. Updating the scroll indicator 649 provides feedback about the position and movement of the set of application views to help a user more quickly and easily navigate the set of application views.

In some embodiments, once an application view reaches the top edge of the display, it is no longer translated in response to further upward scrolling toward the end of the sequence of the set of application views. Instead, it remains at the top of the display and is covered by the adjacent application view below it. In some embodiments, after an application view reaches the top edge of the display, it continues to be reduced in size (e.g., appears to move back into the display, without translating) in response to further scrolling toward the end of the sequence of the set of application views. Conversely, in response to scrolling toward the beginning of the sequence of the set of application views, previously hidden application views towards the beginning of the sequence of the set of application views are revealed at the top of the display as adjacent application views move downward. In other embodiments, the application views continue to translate up off the display after reaching the top edge of the display. Conversely, in response to downward scrolling, previously hidden application views towards the beginning of the sequence of the set of application views translate downward onto the display from the top edge of the display.

Referring now to FIG. 6F, as mentioned, each of the application views in the set of application views 630 is an affordance that, when selected, displays the application that corresponds to the application view. In FIG. 6F, the selection 623 (e.g., touch input) of application view 633 that corresponds to a music application launches the music application, as shown in FIG. 6G. In response to user input 624 at input mechanism 612 while displaying the music application, device 600 displays the set of application views. In some embodiments, the transition from the display of the music application to the display of the set of application views with the music application view 633 at the center of the display is animated as illustrated by the sequence shown in FIGS. 6G-6I. A screenshot of the music application is reduced in size to become application view 633 in the center of the display, which reveals application view 632 at the top of the display, while application view 634 is translated up from the bottom of the display. The set of application view is displayed according to the sequence of the set of application views, with the application view 633 corresponding to the open music application in the center of the display because the music application was open while user input 624 was detected and the set of application views 630 includes an application view (e.g., application view 633) corresponding to the open application. In some embodiments, the last displayed position of the set of application views (e.g., FIG. 6E) is stored, and device 600 displays the set of application views 630 in accordance with the last displayed position of the set of application views. In either case, device 600 returns to the display of the set of application views that was displayed when application view 633 corresponding to the music application was selected, which helps the user maintain context while selecting applications using the set of application views.

In some embodiments, in response to receiving a rotation of rotatable input mechanism 610 or a vertical swipe gesture on the display, device 600 scrolls the application views based on the velocity of the rotation or swipe gesture, respectively (e.g., a faster rotation or swipe will result in faster scrolling). In some embodiments, scrolling continues after user input has ceased (e.g., if the velocity of the rotation or swipe gesture exceeds a predetermined velocity). In some embodiments, scrolling the application views includes a decrease in velocity after input has ceased. For example, the speed of the scrolling slows down over time, where the slowing down of the scrolling is based on a coefficient of friction.

Referring now to FIGS. 6J-6M, in some embodiments, an application view is removed from the set of application views 630. In FIG. 6J, device 600 detects, user input 625 (e.g., horizontal left swipe gesture) that corresponds to removing an application view from the set of application views 630. User input 625 is a swipe on application view 633 in a direction perpendicular to the dimension along which the set of application views are aligned and/or scrolled. In some embodiments, in response to user input 625 that corresponds to removing an application view from the set of application views 630, selected application view 633 is removed or deleted from the set of application views. Removing an application view in response to a gesture that is orthogonal to the dimension in which the application views are aligned and scrolled provides an intuitive way to remove an application view from the set of application views.

In other embodiments, in response to user input 625, device 600 displays an application view removal user interface, as shown in FIG. 6K. The application view removal user interface includes an application view removal affordance 640. Application view removal affordance 640, when selected, removes or deletes the selected application view (e.g., application view 633) from the set of application views 630. In some embodiments, the process of removing an application view is canceled in response to an input (e.g., a right swipe on the display) while displaying application view removal affordance 640. In some embodiments, a swipe in the direction opposite to that which caused application view removal affordance 640 to be displayed (e.g., a right swipe on the display) brings the set of application views back onto the display. Optionally, the ability to cancel the process of removing an application view in this way is indicated by displaying the right portion of the selected application view 633 simultaneously with the removal affordance 640, as shown in FIG. 6K. In response to user input 626 (e.g., a tap) selecting application view removal affordance 640, as shown in FIG. 6L, device 600 removes the selected application view 633 from the set of application views. As a result of removing application view 633, the set of application views 630 is reduced to four application views (from five application views) and application view 633 is not displayed in the set of application views, as illustrated in FIG. 6M.

Referring now to FIGS. 6N-6O, in response to further rotational input 627 of rotatable input mechanism 610, the set of application views is scrolled toward the end of the sequence of the set of application views and an affordance 641 for displaying a menu of applications is displayed. In some embodiments, the affordance 641 for displaying a menu of application views is displayed at a terminus (e.g., beginning or end) of the set of application views. As shown in FIG. 6O, the affordance 641 for displaying a menu of applications is displayed at the bottom of the set of application views, beneath the last application view 635. In some embodiments, the affordance 641 for displaying a menu of applications is displayed a predetermined amount of time after scrolling to the end of the sequence of the set of application views (e.g., affordance 641 is displayed a predetermined amount of time after application view 635 has been reached and scrolling has stopped). Alternatively, the affordance 641 for displaying a menu of application views is not displayed at the terminus of the sequence of application views. In some embodiments, the affordance 641 for displaying a menu of application views is itself an application view and, optionally, is displayed at the terminus (e.g., as the first or last application view) of the sequence of the set of application views. In FIG. 6O, the affordance 641 is labeled "All Apps" to indicate that selection of the affordance will display a menu that provides access to all applications available on device 600. In response to detecting a user input 628 (e.g., a tap) corresponding to selection of affordance 641 for displaying the menu of applications, device 600 ceases to display the set of application views and displays the menu of applications 642. Menu 642 includes affordances for launching respective application, and may be referred to as an application springboard.

In some embodiments, the transition from displaying the set of application views 630 to displaying the menu of applications 642 includes an animation. In one example, illustrated by the sequence shown in FIGS. 6O-6Q, the menu of applications 642 enlarges outward from the center of display 602, while application view 635 and affordance 641 separate vertically and move off of the top and bottom of the display 602, respectively.

Referring now to FIGS. 6Q-6S, while displaying the menu of applications 642, a contact 629 on the touch-sensitive display is detected. Device 600 determines a characteristic intensity of contact 629. In accordance with a determination that the characteristic intensity exceeds a predetermined intensity threshold, a second menu of applications 645 is displayed. In some embodiments, the second menu of applications 645 is a different style than the menu 642 displayed. In the illustrated example, the second menu of applications 645 provides a list (e.g., arranged in alphabetical order) of application affordances (e.g., a list view), whereas the first menu of applications 642 provides a grid of application affordances (e.g., a grid view). In some embodiments, in accordance with a determination that the characteristic intensity of contact 629 exceeds a predetermined intensity threshold, device 600 displays a user interface with options (affordances 643 and 644) for selecting different styles (e.g., a grid view style or a list view style) of the application menu, as shown in FIG. 6R. The second menu of applications 645 is displayed in response to user input 650 selecting affordance 633 corresponding to the list view style. In some embodiments, in accordance with a determination that the characteristic intensity does not exceed the predetermined threshold, an application is launched (e.g., an application associated with an affordance corresponding to the location on the contact 629 on the display).

In some embodiments, the affordance 641 for displaying the menu of applications indicates the style of the menu of applications that will be displayed upon selection of the affordance. Optionally, the appearance of affordance 641 for displaying the menu of applications is changed to reflect the currently selected menu style. FIG. 6T shows an example of affordance 641, which has been updated to indicate that the menu of applications will be displayed in a list view style upon selection of the affordance. FIGS. 6T-6V show an animated transition to the list view style menu 645 in response to user input 651 selecting affordance 641 in FIG. 6T. Similar to display of menu 642, menu of applications 645 enlarges outward from the center of display 602, while application view 635 and affordance 641 separate vertically and move off of the top and bottom of the display 602, respectively. In some embodiments, the affordances in menu 642 and/or menu 645 are capable of being rearranged in response to user input.

In some embodiments, device 600 is configured to operate in what may be referred to as a "Favorites" mode in which the set of application views 630 includes preselected application views. The preselected application views are application views corresponding to respective applications, where the respective applications have been preselected such that their corresponding application views are displayed in response to user input (e.g., user input 614). As a result, the set of application views 630 provides quick and easy access to the applications that have been preselected. In one example, application views 631-635 described above are preselected application views because they have been affirmatively selected to be in the set of application views 630. In some embodiments, a user of device 600 affirmatively selects the applications (or application views) that are a part of the set of application views 630 (e.g., the user designates "favorite" applications). In some embodiments, a user selects the applications using a user interface provided on device 600 or an external device (e.g., via an application on a companion device in communication with device 600).

In other embodiments, a party (other than the user) selects one or more applications (or application views) (e.g., "default" preselected applications) prior to shipping of the device for commercial sale or initial use by the user. In some embodiments, a user of device 600 selects an order (e.g., sequence) of the application views in the set of application views. In other embodiments, a party (other than the user) selects an order of the application views in the set of application views (e.g., a "default" sequence) prior to shipping of the device for commercial sale or initial use by the user. In some embodiments, a user of device 600 can select and/or change the order of the application views in the set of application views using device 600 or an external device.

In some embodiments, the preselected application views remain in the set of application views regardless of the operational state of the respective application. The various operational states of the application can be a launched (e.g., to become opened) application, an open or executing application, or a closed application. In particular, an open or executing application can be, but is not limited to (1) an active application, which is currently displayed on a display screen of the device on which the application is being used, (2) a background application (or background process(es)), which is not currently displayed, but for which one or more processes are being processed by one or more processors, and (3) a suspended or hibernated application, which is not running, but has state information that is stored in memory (volatile and non-volatile, respectively) and that can be used to resume execution of the application. As a result, in some embodiments, the preselected application views are able to be displayed regardless of the operational state of the application.

In some embodiments, the techniques described above are applied when application views 631-635 are preselected application views. In one example, referring to FIGS. 6A-6C, in accordance with device 600 displaying watch face 608 when user input 620 is detected, device 600 displays the first two preselected application views in the sequence of the set of application views. In some embodiments, device 600 displays the first two preselected application views in the sequence of the set of application views in accordance with device 600 not displaying an application corresponding to a preselected application view (e.g., device 600 is displaying a menu for launching applications 642) when the user input 620 is detected. In some embodiments, the first two preselected application views in the sequence of the set of application views are displayed in response to user input 620 even when an application corresponding to a preselected application view is open when the user input is detected.

In another example, referring to FIG. 6G-6I, in accordance with the music application (corresponding to preselected application view 633) being displayed when user input 624 is detected, the preselected application view 633 corresponding to the displayed music application is included in the subset of application views displayed on display 602 in response to detection of user input 624. In some embodiments, in accordance with an application corresponding to a preselected application view being open (e.g., running in the background, but not displayed) when user input 624 is detected, the preselected application view corresponding to the open application is included in the subset of application views displayed on display 602. In FIGS. 6G-6I, the preselected application view 633 of the displayed or open application (e.g., the music application) is displayed in the center of the display at its position within the sequence of the set of application views, regardless of the position of preselected application view 633 in the sequence of the set of application views (e.g., the application view of the displayed or open application is displayed even if it is not at the beginning of the sequence, for example, in one of the first two or three positions in the sequence).

In some embodiments, the preselected application views remain in the set of application views until affirmatively removed by the user. In some embodiments, a preselected application view is removed from the preselected application views by applying the process of removing an application view described above with reference to FIGS. 6J-6M to a preselected application view.

Figure 6W:
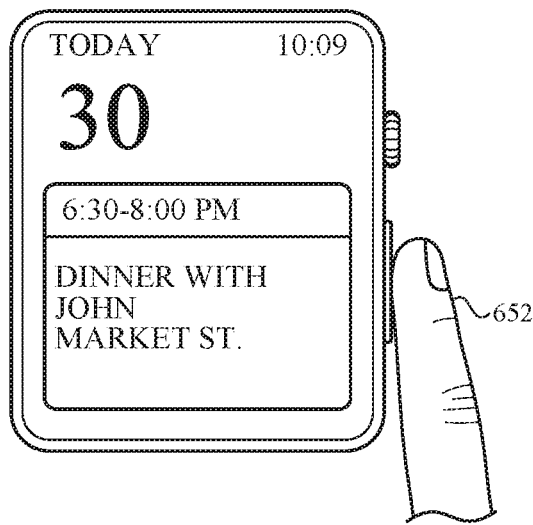
Figure 6X:
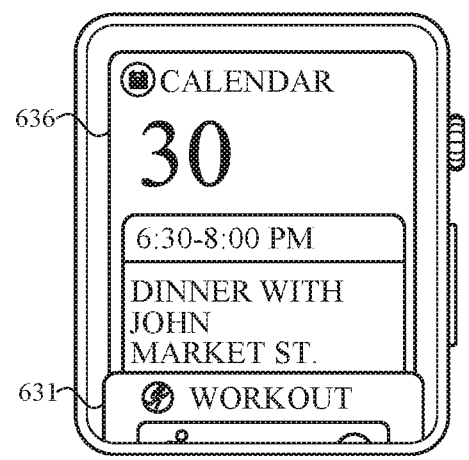
Figure 6Y:
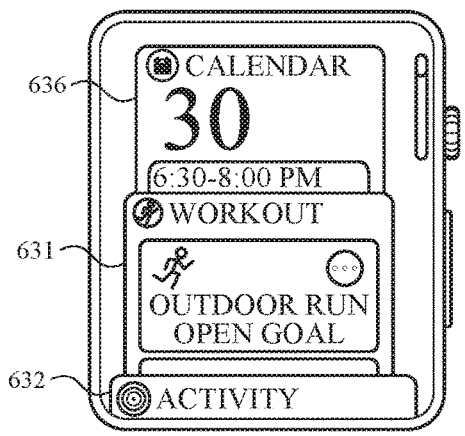

In some embodiments, as seen in FIGS. 6W-6AB, the set of application views 630 includes an adaptive application view 636, and application views 631-635 are preselected application views. The adaptive application view corresponds to a most recently opened application that is not currently one of the preselected application views 631-635. An opened application refers to an application that was a launched or open application at some point in time, regardless of whether the application is still open or the application is closed. The adaptive application view includes a screenshot of the most recently opened application regardless of the operational state of the most recently opened application (e.g., running, suspended, not launched).

In FIGS. 6W-6AB, application view 636 is an adaptive application view that corresponds to a calendar application. In this example, the calendar application is the most recently opened application and the calendar application has not been affirmatively added to the preselected application views (e.g., application views 631-635) of the set of application views 630.

In some embodiments, the calendar application is an open application on the device and is not a view in the set of application views. While the calendar application is open and displayed as shown in FIG. 6W, device 600 detects user input 652 to display the set of application views, including the preselected application views. In response to receiving user input 652, device 600 displays the adaptive application view 636 that corresponds to the calendar application because the calendar application is the most recently opened application. Including a selectable application view of the most recently opened application (the calendar application) allows a user to quickly and easily return to the most recently opened application when the preselected application views are displayed.

In some embodiments, device 600 displays the adaptive application view at a terminus (e.g., beginning or end) of the sequence of the set of application views. Alternatively, the adaptive application view is not displayed at the terminus of the sequence of application views. In some embodiments, the set of application views includes more than one adaptive application view that respectively correspond to the most recently opened applications. In some embodiments, the adaptive application view is displayed even when user input to display the set of application views is detected while an application is not open. In some embodiments, the adaptive application view is displayed only when user input to display the set of application views is detected while an application is open, or only while an application is displayed.

In some embodiments, as shown in FIGS. 6W-6AB, adaptive application view 636 is displayed at the top of the display above the first preselected application view 631. In some embodiments, in accordance with the user input 652 being detected while displaying the open calendar application, display of the adaptive application view 636 that corresponds to the open calendar application includes an animation. In some embodiments of the animation, a screenshot of the open application moves along the first (e.g., vertical) dimension of the display and/or is reduced in size. FIGS. 6W-6Z illustrate an exemplary animation in which the screenshot of the open application moves toward (or remains at) the top of the display and is reduced in size, while one or more of the preselected application views (e.g., the first preselected application view 631 and, optionally, the second preselected application view 632 in the sequence of the set of application views) translate onto the display from the bottom of the display and truncate the bottom of the adaptive application view 636 of the open application. In some embodiments, this animation provides the visual effect that the screenshot of the open application morphs into the adaptive application view of the open application and is moved back and up, while the other view(s) move onto the display in front of the adaptive application view of the open application.

Furthermore, a subsequent new application, which is also not associated with the preselected application views, may be launched (or opened). In response to detecting the launch of the new application, which is also not associated with the preselected application views, the adaptive application view is updated to correspond with the new most recently opened application. For example, when a weather application is the most recently opened application (and not associated with the preselected application views) then device 600 updates adaptive application view 636 such that it corresponds with the weather application (rather than the previous recently opened application, such as the calendar application). In some embodiments, the adaptive application view permits a user to quickly access a recently used application, without having to perform the steps necessary to add the application to the set of preselected application views.

Figure 6Z:
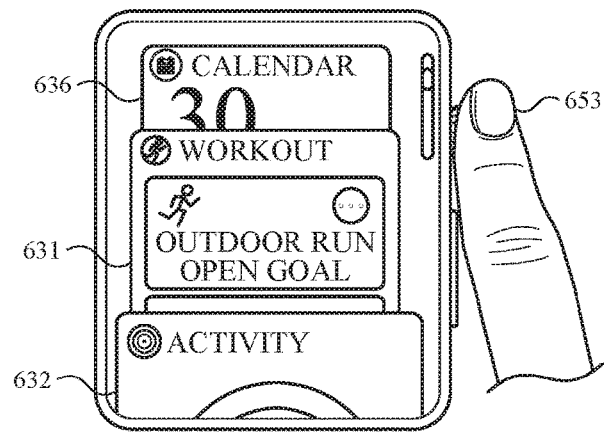
Figure 6A:
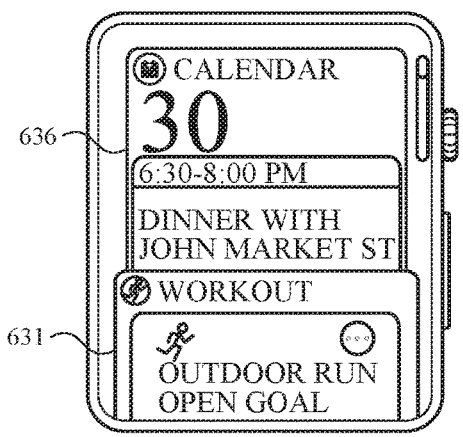
Figure 6A:
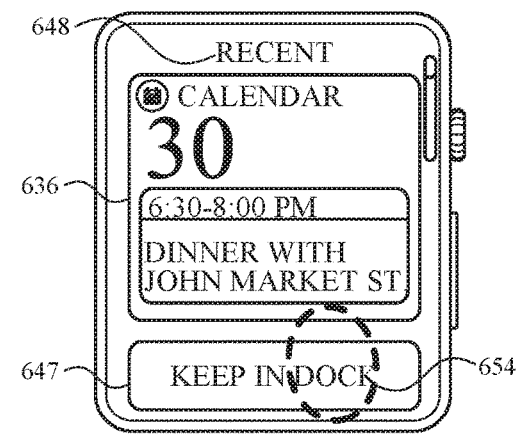
Figure 6A:
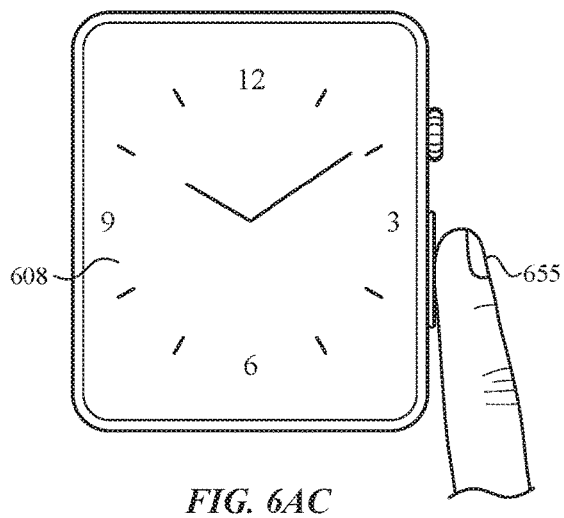
Figure 6A:
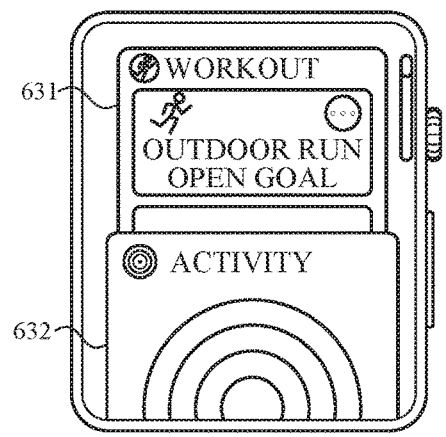
Figure 6A:
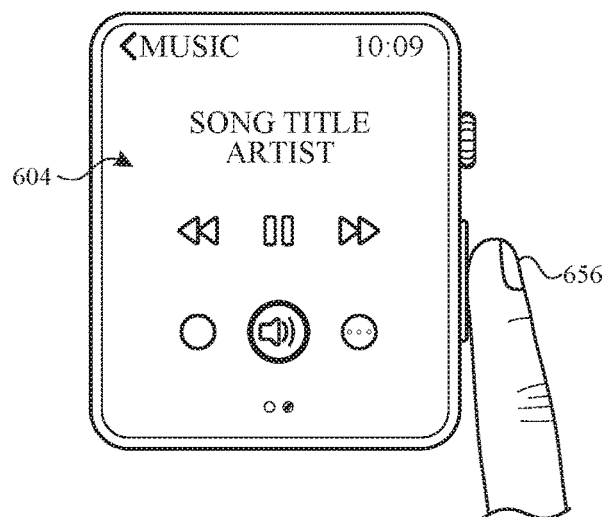
Figure 6A:
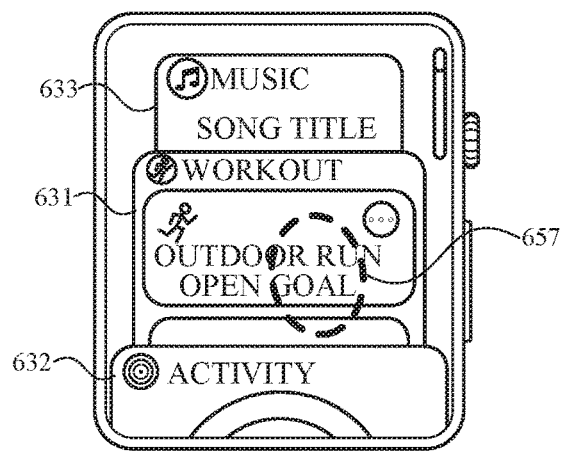
Figure 6A:
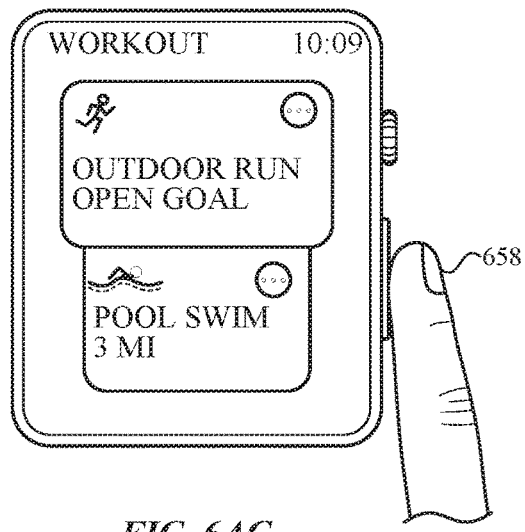
Figure 6A:
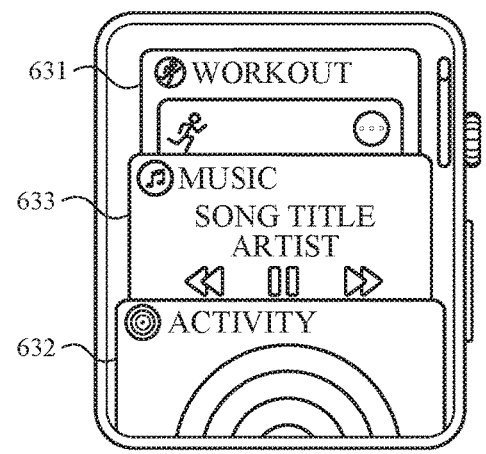
Figure 7A:
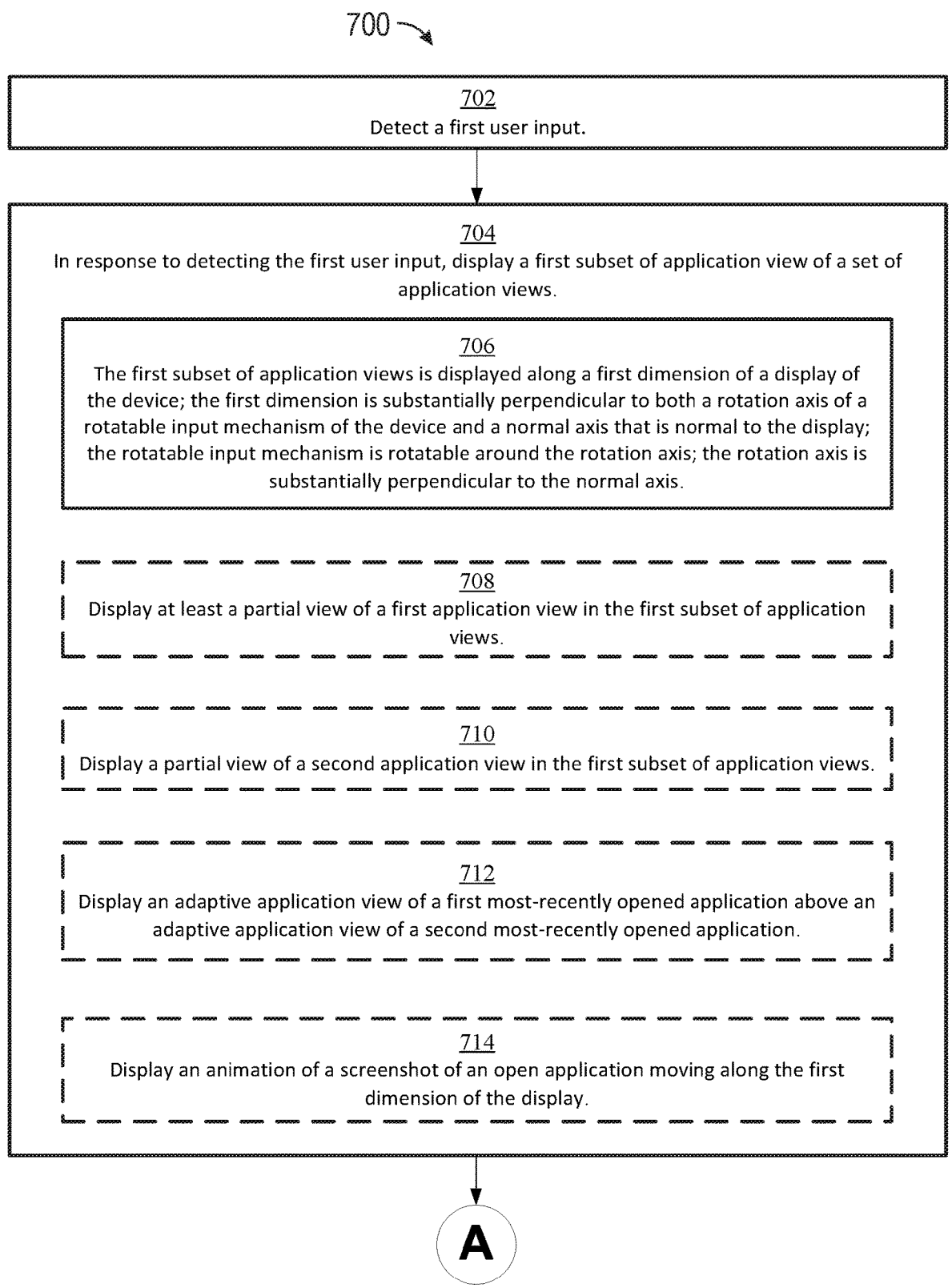
FIGS. 7A-7D is a flow diagram illustrating a method for operating an electronic device in accordance with some embodiments.
Figure 7B:
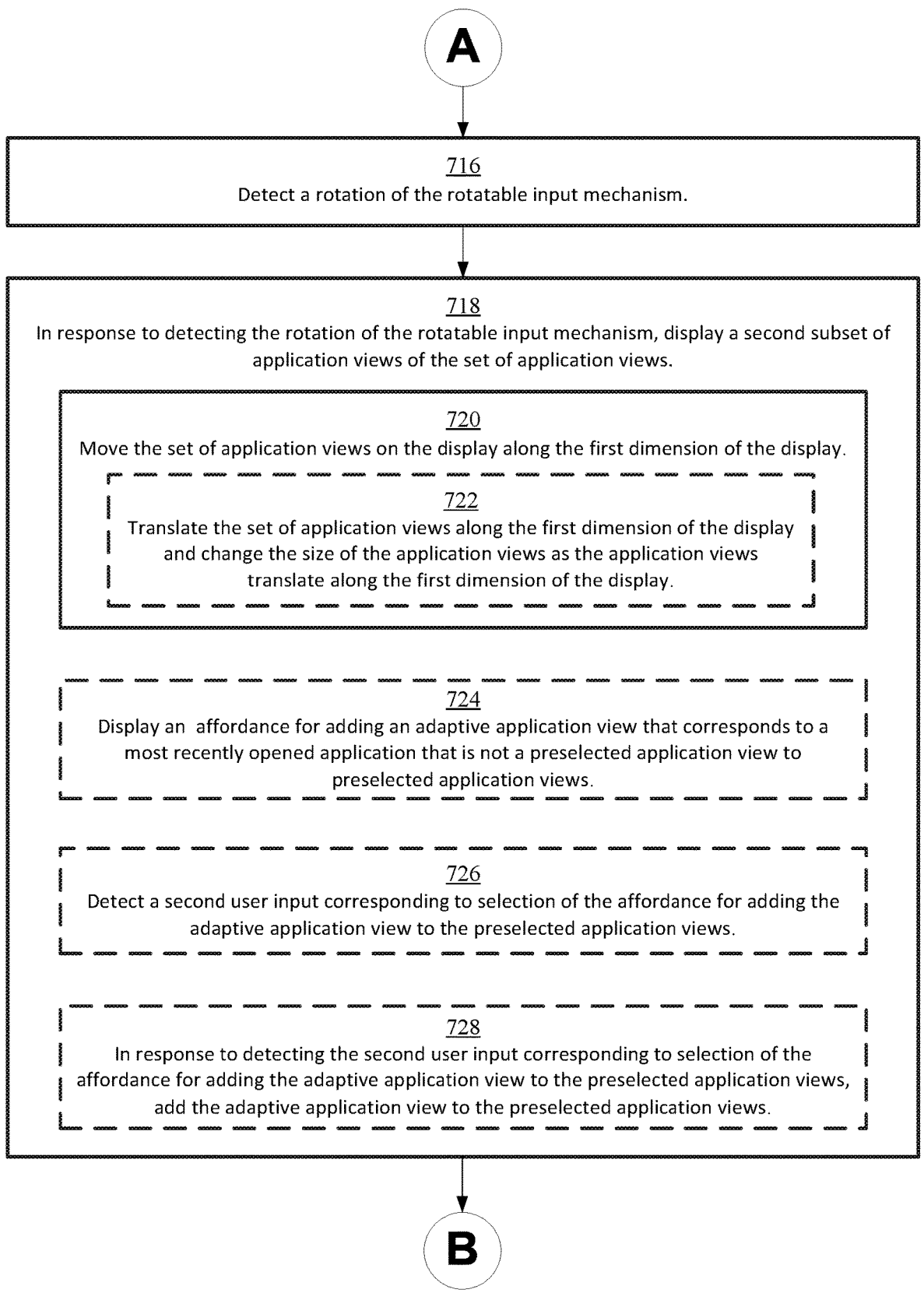
Figure 7C:
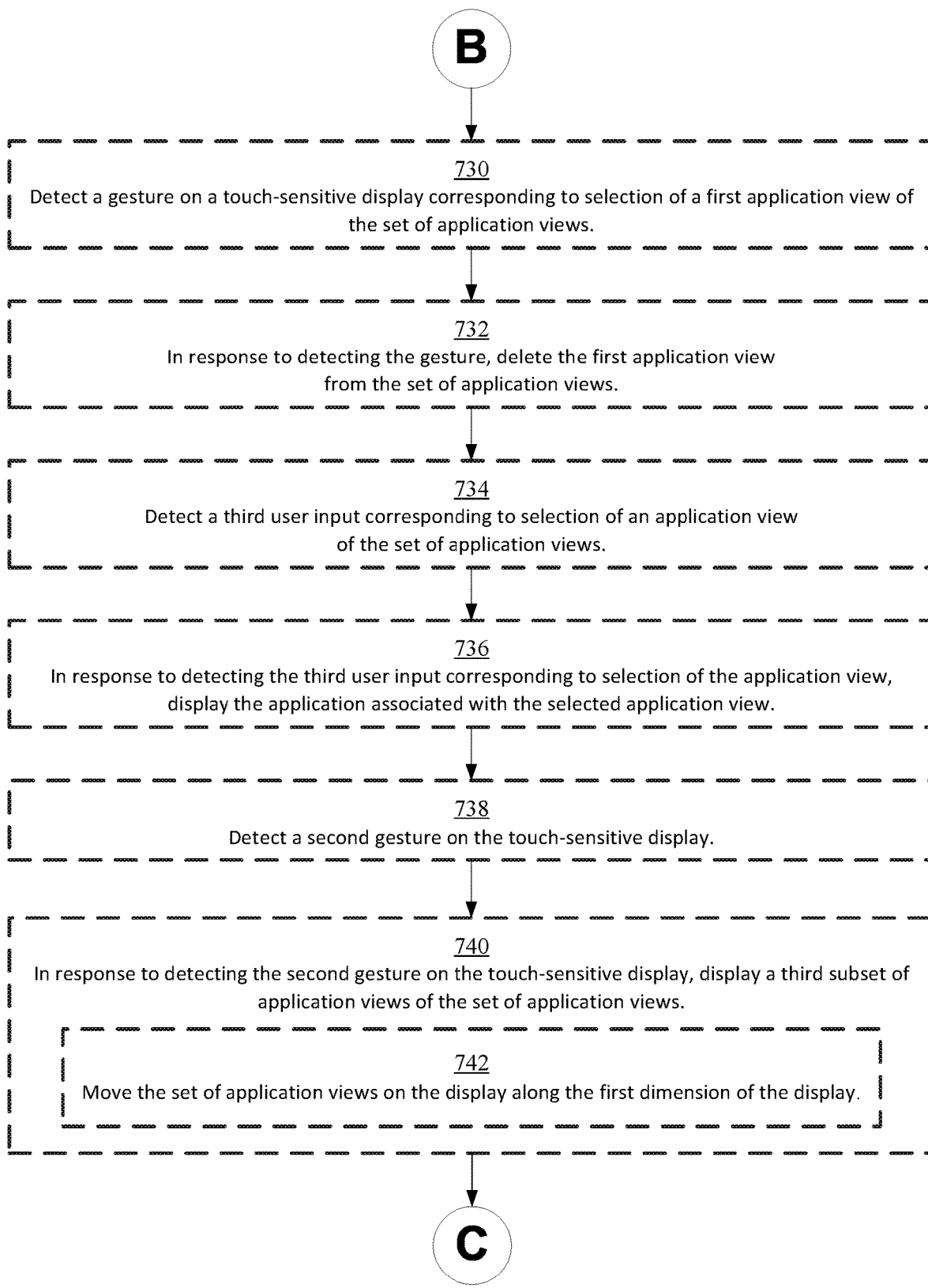
Figure 7D:
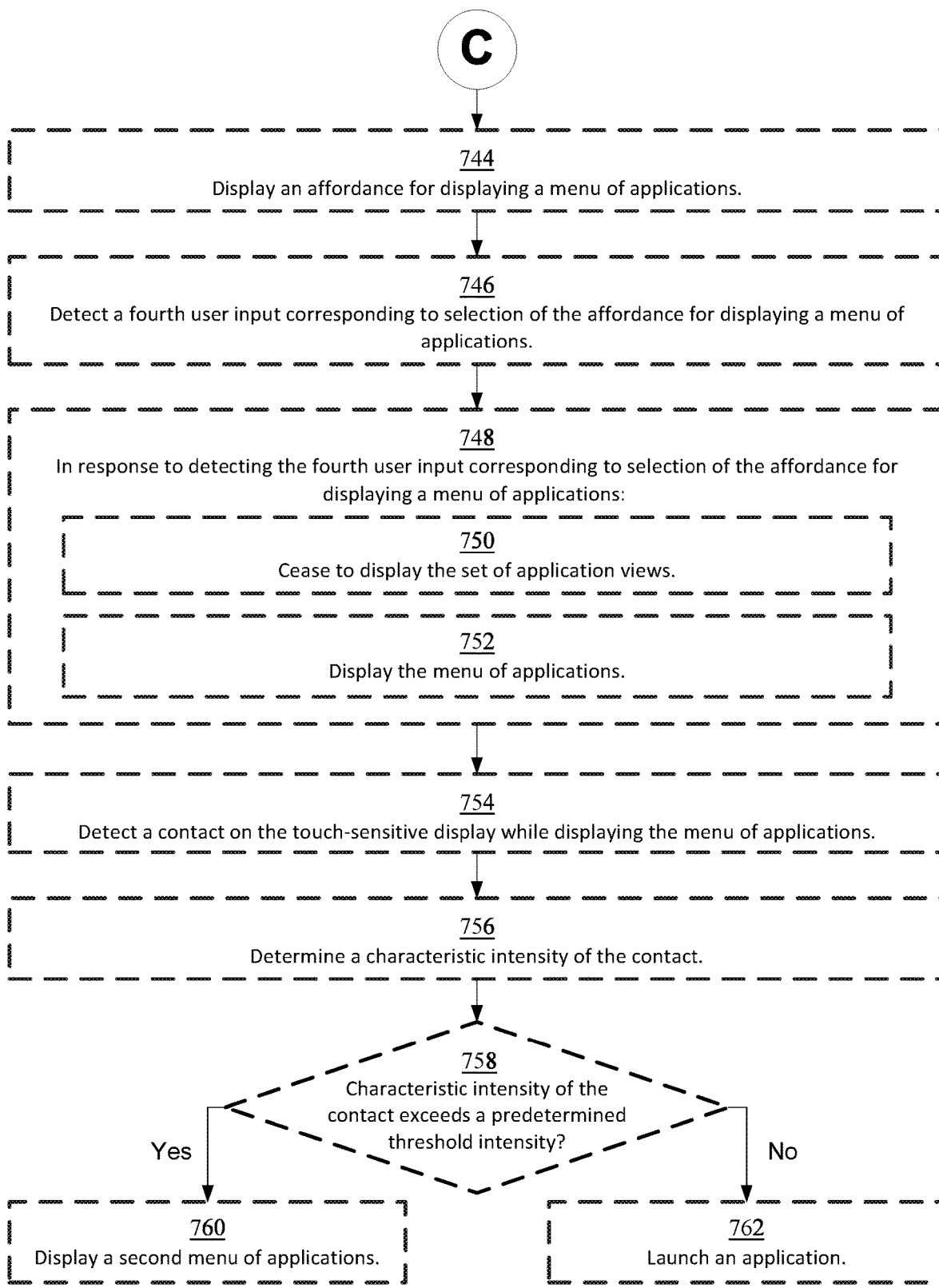

Referring now to FIGS. 6Z-6AB, in response to user input 653 (e.g., rotational input of rotatable input mechanism 610), the display is scrolled to put focus on adaptive application view 636, as shown in FIG. 6AA. The preselected application view 631 and preselected application view 632 are moved downward and adaptive application view 636 is enlarged. Further in response to user input 653, affordance 647 ("Keep in Dock" button) is displayed. In some embodiments, adaptive application view 636 includes affordance 647. Optionally, affordance 647 is displayed a predetermined amount of time after scrolling to adaptive application view 636. In one example, affordance 647 is displayed in accordance with a determination that focus on the adaptive application view 636 (as shown, e.g., in FIG. 6AC) has been maintained (e.g., without further input such as scrolling or selection of an application view) for the predetermined amount of time. Optionally, as shown in FIG. 6AB, device 600 also displays an indication (e.g., text 648) that adaptive application view 636 is an adaptive application view (as opposed to, e.g., a preselected application view)

Affordance 647 corresponds to adding the adaptive application view 636 to the preselected application views of the set of application views. In response to receiving user input (e.g., tap gesture) for selecting the affordance 647, the adaptive application view (e.g., application view 636) that corresponds to the most recently opened application (e.g., calendar application) is added to the preselected application views. For example, referring to FIG. 6AB, in response to user input 654, device 600 adds application view 636 to the preselected application views of the set of application views such that application view 636 is no longer an adaptive application view. In some embodiments, when an adaptive application view (e.g., calendar application view) is added to the preselected application views via selection of affordance 647, the adaptive application view remains in the set of application views and a new preselected application view (e.g., calendar application view) is created.

In some embodiments, an open application corresponds to one of the preselected application views 631-635, and in response to a user input for displaying the set of application views, device 600 displays an adaptive application view corresponding to the open application at the top of the display of the set of application views while also maintaining the preselected application view corresponding to the open application.

Referring now to FIGS. 6AC-6AH, in some embodiments, device 600 is configured to operate in what may be referred to as a "Recency" mode in which the set of application views includes a plurality of adaptive application views corresponding to a plurality of opened applications. In some embodiments, a user selects or switches between the "Favorites" mode and the "Recency" mode using an interface on device 600 or an external device (e.g., via an application on a companion device in communication with device 600).

As mentioned, an opened application refers to an application that was a launched or open application at some point in time, regardless of whether the application is still open or the application is closed. In some embodiments, the plurality of adaptive application views correspond to a predetermined number (e.g., ten) of most recently opened applications. Optionally, the adaptive application views are arranged in a sequence in order of how recently their corresponding applications have been opened.

In some embodiments, in FIGS. 6AC-6AH, application views 631-635 are adaptive application views corresponding to the five most recently opened applications, with the workout application corresponding to adaptive application view 631 being the most recently opened application and the mail application corresponding to adaptive application view 635 being the fifth most recently opened application. In response to user input 655 at input mechanism 612 while displaying watch face 608 (FIG. 6AC), adaptive application view 631 (corresponding to the most recently opened application) and adaptive application view 632 (corresponding to the second-most recently opened application) are displayed (FIG. AD). Since adaptive application view 631 corresponds to the most recently opened application, it is displayed in the first position of the sequence of the set of application views above adaptive application view 632. In some embodiments, the display of adaptive application view 631 and adaptive application view 632 is animated as described with respect to FIGS. 6A-6C, with adaptive application view 631 and adaptive application view 632 translating onto the display from the bottom edge of the display.

Next, a music application corresponding to adaptive application view 633 is opened and displayed, as shown in FIG. 6AE. In response to user input 656 at input mechanism 612 while displaying the music application, adaptive application view 633 (corresponding to the music application) and adaptive application view 631 (corresponding to the workout application) are displayed. Optionally, adaptive application view 632 corresponding to the activity application is also displayed, as shown in FIG. 6AF. Since the music application is displayed when user input 656 is detected, it is the most recently opened application, and therefore adaptive application view 633 corresponding to the music application is displayed in the first position of the sequence of the set of application views. The workout application is the most recently opened application other than the open music application (e.g., the second-most recently opened application), which causes adaptive application view 631 to be displayed in the second position (e.g., in the center of the display) below adaptive application view 633. Optionally, adaptive application view 632 corresponding to the third-most recently opened application (e.g., an activity application) is displayed below adaptive application view 631. In some embodiments, the display of adaptive application views 633, 631, and 632 is animated as described above with respect to FIGS. 6W-6Z.

Next, as shown in FIGS. 6AF-6AH, the workout application is launched in response to user input 657 corresponding to selection of adaptive application view 631. In response to user input 658 at input mechanism 612 while displaying the workout application, the adaptive application views are displayed as shown in FIG. 6AH. According to the progression described above with respect to FIGS. 6AE-6AH, when user input 658 is received, the workout application is the most recently opened application and the music application is the next most recently opened application. As a result, adaptive application view 631 and adaptive application view 633 are switched compared to FIG. 6AF, with adaptive application view 631 in the first position at the top of the display and application view 633 in the second position at the center of the display, while adaptive application view 632 remains in the third position at the bottom of the display. Since the adaptive application view of the second most recently used application is displayed at the center of the display, a user can quickly and easily switch back and forth between two applications.

FIGS. 7A-7D are flow diagrams illustrating a method for displaying application views for selecting and launching applications using an electronic device in accordance with some embodiments. Method 700 is performed at a device (e.g., 100, 300, 500, or 600) with a display (e.g., 602) and a rotatable input mechanism (e.g., 610) that is rotatable around a rotation axis (e.g., 614) substantially perpendicular to a normal axis (e.g., 618) that is normal to a face of the display. Some operations in method 700 are, optionally, combined, the order of some operations is, optionally, changed, and some operations are, optionally, omitted.

As described below, method 700 provides an intuitive way for selecting and launching applications. The method reduces the cognitive burden on a user for selecting and launching applications, thereby creating a more efficient human-machine interface. For battery-operated computing devices, enabling a user to select and launch applications faster and more efficiently conserves power and increases the time between battery charges.

At block 702, the device detects a first user input (e.g., user input 620 in FIG. 6A).

At block 704, in response to detecting the first user input, the device displays a first subset of application views (e.g., 631 and 632) of a set of application views (e.g., 630). According to block 706, the first subset of application views is displayed along a first dimension (e.g., 616) of the display that is substantially perpendicular to both the rotation axis (e.g., 614) of the rotatable input mechanism and the normal axis (e.g., 618) to the display. Displaying the subset of application views along a dimension of the display that is substantially perpendicular to both the rotation axis of the rotatable input mechanism and the normal axis to the display arranges the application views substantially parallel to the plane of rotation of the rotatable input mechanism, which provides an intuitive alignment between the display of the set of application views and the rotatable input mechanism. This alignment provides visual feedback to the user that there is a relationship between the set of application views and the rotatable input mechanism and that the rotatable input mechanism can be used (e.g., rotated) to navigate (e.g., scroll) the set of application views. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Optionally, at blocks 708 and 710, displaying the first subset of application views includes displaying at least a partial view of a first application view (e.g., 632 in FIG. 6C) in the first subset of application views and displaying a partial view of a second application view (e.g., 631 in FIG. 6C) in the first subset of application views. In some embodiments, displaying at least a partial view of a first application view a partial view of a second application view allows the application views to be spaced closer together (e.g., to create the visual appearance that the application views are overlapping) and to display a greater number of application views on the display at one time. Displaying a greater number of application views at one time increases the number of applications that can be launched from the current display and makes navigating (e.g., scrolling) the set of application views more efficient by reducing the number of inputs needed to locate and select a desired application. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the set of application views includes a plurality of preselected application views and an adaptive application view (e.g., 636) corresponding to a most recently opened application that does not correspond to a preselected application view. Optionally, displaying the first subset of application views includes displaying the adaptive application view and at least one of the preselected application views (e.g., FIG. 6Z). Displaying at least one preselected application view reduces the number of inputs needed to open an application by providing quick and easy access to the applications that have been preselected (e.g., designated as favorite applications by the user). Similarly, displaying an adaptive application view corresponding to a most recently opened application reduces the number of inputs needed to open (e.g., return to) an application by providing quick and easy access to the most recently opened application. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the set of application views includes a plurality of adaptive application views corresponding to a plurality of opened applications (e.g., FIG. 6AD). In some embodiments that include a plurality of adaptive application views, the first user input (e.g., user input 656 in FIG. 6AE) is detected while an application is open. Optionally in these embodiments, at block 712, displaying the first subset of application views includes displaying an adaptive application view of a first most-recently opened application above an adaptive application view of a second most-recently opened application (e.g., 633 and 631 in FIG. 6AF). Consistent with block 712, displaying the first subset of application views optionally includes displaying, in the center of the display, an adaptive application view corresponding to a recently-opened application other than the open application, and displaying, above the adaptive application view corresponding to the recently-opened application, an adaptive application view corresponding to the open application (e.g., 631 and 633 in FIG. 6AH). Similarly, displaying an adaptive application view of a first most-recently opened application above an adaptive application view of a second most-recently opened application reduces the number of inputs needed to switch between two applications by providing quick and easy access to the two most recently opened applications. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Optionally, at block 714, the device displays an animation of a screenshot of an open application moving along the first dimension of the display and/or reducing in size (e.g., as at least part of displaying an adaptive application view that corresponds to the open application, such as when the first user input is detected while displaying the open application, as shown for example in FIGS. 6W-6Z). Displaying an animation of a screenshot of the open application moving along the first dimension of the display and/or reducing in size (e.g., that the screenshot morphs into the adaptive application view) provides improved feedback to the user by indicating that the adaptive application view corresponds to the open application. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

At block 716, the device detects a rotation (e.g., user input 621) of the rotatable input mechanism.

At block 718, in response to detecting the rotation of the rotatable input mechanism, the device displays a second subset of application views (e.g., 631, 632, and 633) of the set of application views. At block 720, displaying the second subset of application views includes moving the set of application views on the display along the first dimension of the display (e.g., FIGS. 6C-6D).

Displaying the second subset of application views by moving the set of application views on the display along the first dimension of the display provides improved visual feedback to the user when scrolling the set of application views. Since the first dimension is substantially parallel to the plane of rotation of the rotatable input mechanism, moving the set of application views on the display along the first dimension of the display provides an intuitive response to the rotation of the rotatable input mechanism. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Optionally, at block 722, moving the set of application views on the display along the first dimension of the display includes translating the set of application views along the first dimension of the display and changing the size of the application views as the application views translate along the first dimension of the display (e.g., FIGS. 6C-6E).

In some embodiments, translating the set of application views along the first dimension of the display and changing the size of the application views as the application views translate along the first dimension of the display provides the user with improved visual feedback and reduces the amount of user input by allowing a greater number of application views on the display at one time and reducing the movement of the application views while scrolling. This allows quicker and more efficient navigation of the set of application views and reduces the possibility of a user being disoriented. Providing improved visual feedback to the user and reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the set of application views includes preselected application views. In some embodiments, the set of application views includes an adaptive application view (e.g., 636) that corresponds to a most recently opened application that is not one of the preselected application views. Optionally in such embodiments, at block 724, displaying the second subset of application views includes displaying the adaptive application view and an affordance (e.g., 647) for adding the adaptive application view to the preselected application views. Optionally, at blocks 726 and 728, the device detects a second user input (e.g., 654) corresponding to selection of the affordance for adding the adaptive application view to the preselected application views, and in response to detecting the second user input corresponding to selection of the affordance for adding the adaptive application view to the preselected application views, adds the adaptive application view that corresponds to the most recently opened application to the preselected application views. Adding the adaptive application view corresponding to the most recently opened application to the preselected application views in the manner described in blocks 724, 726, and 728 reduces the number of inputs required to add an application view to the preselected application views while displaying the set of application views. The benefits of reducing the number of inputs required to perform an operation are described above.

In some embodiments, the display includes a touch-sensitive display. Optionally, at blocks 730 and 732, the device detects a gesture (e.g., 625) on the touch-sensitive display corresponding to selection of a first application view of the set of application views (e.g., a swipe on the first application view in a direction perpendicular to the first dimension), and in response to detecting the gesture, deletes the first application view from the set of application views. Deleting the first application view from the set of application views in the manner described in blocks 730 and 732 reduces the number of inputs required to delete an application view from the set of application views while displaying the set of application views. The benefits of reducing the number of inputs required to perform an operation are described above.

Optionally, at blocks 734 and 736, the device detects a third user input (e.g., 623) corresponding to selection of an application view of the set of application views, and in response to detecting the third user input corresponding to selection of the application view, displays the application associated with the selected application view (e.g., FIG. 6G). Displaying an application in response to selection of an application view provides an easy access to an application and reduces the number of inputs required to open an application. The benefits of reducing the number of inputs required to perform an operation are described above.

Optionally, at blocks 738 and 740, in embodiments in which the display includes a touch-sensitive display, the device detects a second gesture (e.g., 622) on the touch-sensitive display, and in response to detecting the second gesture on the display, displays a third subset of application views (e.g., 632, 633, and 634 in FIG. 6E) of the set of application views. Optionally, at block 742, displaying the third subset of application views includes moving the set of application views on the display along the first dimension of the display (e.g., FIGS. 6D-6E).

Optionally, at blocks 744, 746, 748, 750, and 752, the device displays an affordance (e.g., 641) for displaying a menu of applications (e.g., 642), detects a fourth user input (e.g., 628) corresponding to selection of the affordance for displaying the menu of applications, and in response to detecting the fourth user input corresponding to selection of the affordance for displaying the menu of applications: (i) ceases to display the set of application views and (ii) displays the menu of applications (e.g., FIGS. 6O-6Q). The method of displaying a menu of applications as described at blocks 744, 746, 748, 750, and 752 provides easy access to the applications in the menu and reduces the number of inputs to, while displaying the set of application views, open an application in the menu (e.g., an application that does not correspond to an application view in the set of application views). The benefits of reducing the number of inputs required to perform an operation are described above.

Optionally, at blocks 754, 756, and 758, in embodiments in which the display includes a touch-sensitive display, while displaying the menu of applications, the device detects a contact (e.g., 629) on the touch-sensitive display and determines a characteristic intensity of the contact. Optionally, at block 760, in accordance with a determination that the characteristic intensity exceeds a predetermined intensity threshold, the device displays a second menu of applications (e.g., 645). The method of displaying a second menu of applications as described at blocks 754, 756, 758, and 760 provides an easy way to switch the display from a first menu of application to the second menu of applications and reduces the number of inputs to switch the menu of applications while displaying the first menu of applications. The benefits of reducing the number of inputs required to perform an operation are described above. Optionally, at block 762, in accordance with a determination that the characteristic intensity does not exceed the predetermined threshold, the device launches an application.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:
1. An electronic device, comprising:
a display;

a rotatable input mechanism rotatable around a rotation axis substantially perpendicular to a normal axis that is normal to a face of the display;
one or more processors; and
memory storing one or more programs configured to be executed by the one or more processors, the one or more programs including instructions for:
detecting a first user input;
in response to detecting the first user input, displaying a first subset of application views of an ordered set of application views, the first subset of application views displayed along a first dimension of the display that is substantially perpendicular to both the rotation axis and the normal axis;
detecting a rotation of the rotatable input mechanism;
in response to detecting the rotation of the rotatable input mechanism:
moving the ordered set of application views on the display along the first dimension of the display;
in accordance with a determination that the ordered set of application views is moved to a terminus of the ordered set of application views:
displaying a second subset of application views of the ordered set of application views; and
displaying a respective affordance associated with display of a grid of affordances corresponding to applications available on the electronic device, wherein selection of the respective affordance causes the display of the grid of affordances corresponding to applications available on the electronic device, and wherein the respective affordance is displayed in response to detecting the rotation of the rotatable input mechanism without receiving additional user input after the rotation of the rotatable input mechanism; and
in accordance with a determination that the ordered set of application views is moved to a position that is not the terminus of the ordered set of application views, displaying a third subset of application views of the ordered set of application views without displaying the respective affordance associated with display of a grid of affordances corresponding to applications available on the electronic device;
while concurrently displaying the respective affordance and one or more application views that are at the terminus of the ordered set of application views, detecting a second user input corresponding to selection of the respective affordance that was displayed in response to the rotation of the rotatable input mechanism; and
in response to detecting the second user input corresponding to selection of the respective affordance:
ceasing to display the one or more application views that are at the terminus of the ordered set of application views; and
displaying the grid of affordances corresponding to applications available on the electronic device, the grid of affordances including at least a first application affordance, a second application affordance that is above or below the first application affordance, and a third application affordance that is to the right or left of the first application affordance.

2. The device of claim 1, wherein displaying the second subset of application views includes displaying an adaptive application view, and wherein the adaptive application view includes an affordance for adding the adaptive application view to preselected application views, the one or more programs further including instructions for:
detecting a third user input corresponding to selection of the affordance for adding the adaptive application view to the preselected application views; and
in response to detecting the third user input corresponding to selection of the affordance for adding the adaptive application view to the preselected application views, adding the adaptive application view that corresponds to the most recently opened application to the preselected application views.

3. The device of claim 1, wherein the display includes a touch-sensitive display, the one or more programs further including instructions for:
detecting a gesture on the touch-sensitive display, wherein the gesture includes a swipe on a first application view of the ordered set of application views and is in a direction perpendicular to the first dimension; and
in response to detecting the gesture, deleting the first application view from the ordered set of application views.

4. The device of claim 1, wherein the ordered set of application views includes a plurality of adaptive application views corresponding to a plurality of opened applications.

5. The device of claim 4, wherein the first user input is detected while a first application is open, and wherein displaying the first subset of application views includes:
displaying, in the center of the display, an adaptive application view corresponding to a recently-opened application other than the first application; and
displaying, above the adaptive application view corresponding to the recently-opened application, an adaptive application view corresponding to the first application.

6. The device of claim 4, wherein the first user input is detected while an application is not open, and wherein displaying the first subset of application views includes displaying the adaptive application view of a most-recently opened application above an adaptive application view of a second most-recently opened application.

7. The device of claim 1, the one or more programs further including instructions for:
detecting a fourth user input corresponding to selection of an application view of the ordered set of application views; and
in response to detecting the fourth user input corresponding to selection of the application view, displaying the application associated with the selected application view.

8. The device of claim 1, wherein the display includes a touch-sensitive display, the one or more programs further including instructions for:
detecting a second gesture on the touch-sensitive display; and
in response to detecting the second gesture on the display, displaying a third subset of application views of the ordered set of application views, wherein displaying the third subset of application views includes moving the ordered set of application views on the display along the first dimension of the display.

9. The device of claim 1, wherein displaying the first subset of application views includes:
displaying at least a partial view of a first application view in the first subset of application views; and
displaying a partial view of a second application view in the first subset of application views.

10. The device of claim 1, wherein:
the first user input is detected while displaying an open application,
displaying the first subset of application views includes displaying an adaptive application view that corresponds to the open application, and
displaying the adaptive application view that corresponds to the open application includes animating a screenshot of the open application moving along the first dimension of the display.

11. The device of claim 1, wherein moving the ordered set of application views on the display along the first dimension of the display includes translating the ordered set of application views along the first dimension of the display and changing the size of the application views as the application views translate along the first dimension of the display.

12. The device of claim 1, wherein the display includes a touch-sensitive display, the one or more programs further including instructions for:
while displaying the grid of affordances, detecting a contact on the touch-sensitive display;
determining a characteristic intensity of the contact;
in accordance with a determination that the characteristic intensity exceeds a predetermined intensity threshold, displaying a second grid of affordances; and
in accordance with a determination that the characteristic intensity does not exceed the predetermined threshold, launching an application.

13. The device of claim 1, wherein the ordered set of application views includes representations of content from applications corresponding to the application views in the ordered set of application views.

14. The device of claim 1, wherein the set of application views includes preselected application views, and wherein the set of application views includes an adaptive application view that corresponds to a most recently opened application that is not one of the preselected application views.

15. The device of claim 1, wherein the first user input comprises a push input received via a physical input mechanism.

16. The device of claim 1, further comprising a physical input mechanism separate from the rotatable input mechanism, and the first user input comprises a push input received via the physical input mechanism.

17. The device of claim 1, wherein the first subset of application views of the ordered set of application views includes a first application view, a second application view, and a third application view, and wherein the first application view is displayed above the second application view and is partially obscured by the second application view, and wherein the second application view is displayed above the third application view and is partially obscured by the third application view.

18. The device of claim 17, wherein the one or more programs further include instructions for:
detecting a second user input;
in response to detecting the second user input:
moving the ordered set of application views on the display along the first dimension of the display;
ceasing to display the first application view; and
displaying an additional subset of application views of the ordered set of application views, wherein the additional subset of application views of the ordered set of application views includes the second application view, the third application view, and a fourth application view, and wherein the second application view is displayed above the third application view and is partially obscured by the third application view, and wherein the third application view is displayed above the fourth application view and is partially obscured by the fourth application view.

19. A non-transitory computer-readable storage medium storing one or more programs configured to be executed by one or more processors of an electronic device with a display and a rotatable input mechanism, the rotatable input mechanism rotatable around a rotation axis substantially perpendicular to a normal axis that is normal to a face of the display, the one or more programs including instructions for:
detecting a first user input;
in response to detecting the first user input, displaying a first subset of application views of an ordered set of application views, the first subset of application views displayed along a first dimension of the display that is substantially perpendicular to both the rotation axis and the normal axis;
detecting a rotation of the rotatable input mechanism;
in response to detecting the rotation of the rotatable input mechanism:
moving the ordered set of application views on the display along the first dimension of the display;
in accordance with a determination that the ordered set of application views is moved to a terminus of the ordered set of application views:
displaying a second subset of application views of the ordered set of application views; and
displaying a respective affordance associated with display of a grid of affordances corresponding to applications available on the electronic device, wherein selection of the respective affordance causes the display of the grid of affordances corresponding to applications available on the electronic device, and wherein the respective affordance is displayed in response to detecting the rotation of the rotatable input mechanism without receiving additional user input after the rotation of the rotatable input mechanism; and
in accordance with a determination that the ordered set of application views is moved to a position that is not the terminus of the ordered set of application views, displaying a third subset of application views of the ordered set of application views without displaying the respective affordance associated with display of a grid of affordances corresponding to applications available on the electronic device;
while concurrently displaying the respective affordance and one or more application views that are at the terminus of the ordered set of application views, detecting a second user input corresponding to selection of the respective affordance that was displayed in response to the rotation of the rotatable input mechanism; and
in response to detecting the second user input corresponding to selection of the respective affordance:
ceasing to display the one or more application views that are at the terminus of the ordered set of application views; and
displaying the grid of affordances corresponding to applications available on the electronic device, the grid of affordances including at least a first application affordance, a second application affordance that is above or below the first application affordance, and a third application affordance that is to the right or left of the first application affordance.

20. The non-transitory computer-readable storage medium of claim 19, wherein displaying the second subset of application views includes displaying an adaptive application view, and wherein the adaptive application view includes an affordance for adding the adaptive application view to preselected application views, the one or more programs further including instructions for:
  detecting a third user input corresponding to selection of the affordance for adding the adaptive application view to the preselected application views; and
  in response to detecting the third user input corresponding to selection of the affordance for adding the adaptive application view to the preselected application views, adding the adaptive application view that corresponds to the most recently opened application to the preselected application views.

21. The non-transitory computer-readable storage medium of claim 19, wherein the display includes a touch-sensitive display, the one or more programs further including instructions for:
  detecting a gesture on the touch-sensitive display, wherein the gesture includes a swipe on a first application view of the ordered set of application views and is in a direction perpendicular to the first dimension; and
  in response to detecting the gesture, deleting the first application view from the ordered set of application views.

22. The non-transitory computer-readable storage medium of claim 19, wherein the ordered set of application views includes a plurality of adaptive application views corresponding to a plurality of opened applications.

23. The non-transitory computer-readable storage medium of claim 22, wherein the first user input is detected while a first application is open, and wherein displaying the first subset of application views includes:
  displaying, in the center of the display, an adaptive application view corresponding to a recently-opened application other than the first application; and
  displaying, above the adaptive application view corresponding to the recently-opened application, an adaptive application view corresponding to the first application.

24. The non-transitory computer-readable storage medium of claim 22, wherein the first user input is detected while an application is not open, and wherein displaying the first subset of application views includes displaying the adaptive application view of a most-recently opened application above an adaptive application view of a second most-recently opened application.

25. The non-transitory computer-readable storage medium of claim 19, the one or more programs further including instructions for:
  detecting a fourth user input corresponding to selection of an application view of the ordered set of application views; and
  in response to detecting the fourth user input corresponding to selection of the application view, displaying the application associated with the selected application view.

26. The non-transitory computer-readable storage medium of claim 19, wherein the display includes a touch-sensitive display, the one or more programs further including instructions for:
  detecting a second gesture on the touch-sensitive display; and
  in response to detecting the second gesture on the display, displaying a third subset of application views of the ordered set of application views, wherein displaying the third subset of application views includes moving the ordered set of application views on the display along the first dimension of the display.

27. The non-transitory computer-readable storage medium of claim 19, wherein displaying the first subset of application views includes:
  displaying at least a partial view of a first application view in the first subset of application views; and
  displaying a partial view of a second application view in the first subset of application views.

28. The non-transitory computer-readable storage medium of claim 19, wherein:
  the first user input is detected while displaying an open application,
  displaying the first subset of application views includes displaying an adaptive application view that corresponds to the open application, and
  displaying the adaptive application view that corresponds to the open application includes animating a screenshot of the open application moving along the first dimension of the display.

29. The non-transitory computer-readable storage medium of claim 19, wherein moving the ordered set of application views on the display along the first dimension of the display includes translating ordered the set of application views along the first dimension of the display and changing the size of the application views as the application views translate along the first dimension of the display.

30. The non-transitory computer-readable storage medium of claim 19, wherein the display includes a touch-sensitive display, the one or more programs further including instructions for:
  while displaying the grid of affordances, detecting a contact on the touch-sensitive display;
  determining a characteristic intensity of the contact;
  in accordance with a determination that the characteristic intensity exceeds a predetermined intensity threshold, displaying a second grid of affordances; and
  in accordance with a determination that the characteristic intensity does not exceed the predetermined threshold, launching an application.

31. The non-transitory computer-readable storage medium of claim 19, wherein the ordered set of application views includes representations of content from applications corresponding to the application views in the ordered set of application views.

32. The non-transitory computer-readable storage medium of claim 19, wherein the set of application views includes preselected application views, and wherein the set of application views includes an adaptive application view that corresponds to a most recently opened application that is not one of the preselected application views.

33. The non-transitory computer-readable storage medium of claim 19, wherein the first user input comprises a push input received via a physical input mechanism.

34. The non-transitory computer-readable storage medium of claim 19, wherein the electronic device further comprises a physical input mechanism separate from the rotatable input mechanism, and the first user input comprises a push input received via the physical input mechanism.

35. The non-transitory computer-readable storage medium of claim 19, wherein the first subset of application views of the ordered set of application views includes a first application view, a second application view, and a third application view, and wherein the first application view is displayed above the second application view and is partially obscured by the second application view, and wherein the second application view is displayed above the third application view and is partially obscured by the third application view.

36. The non-transitory computer-readable storage medium of claim 35, wherein the one or more programs further include instructions for:
detecting a second user input;
in response to detecting the second user input:
moving the ordered set of application views on the display along the first dimension of the display;
ceasing to display the first application view; and
displaying an additional subset of application views of the ordered set of application views, wherein the additional subset of application views of the ordered set of application views includes the second application view, the third application view, and a fourth application view, and wherein the second application view is displayed above the third application view and is partially obscured by the third application view, and wherein the third application view is displayed above the fourth application view and is partially obscured by the fourth application view.

37. A method, comprising:
at an electronic device with a display and a rotatable input mechanism, the rotatable input mechanism rotatable around a rotation axis substantially perpendicular to a normal axis that is normal to a face of the display,
detecting a first user input;
in response to detecting the first user input, displaying a first subset of application views of an ordered set of application views, the first subset of application views displayed along a first dimension of the display that is substantially perpendicular to both the rotation axis and the normal axis;
detecting a rotation of the rotatable input mechanism;
in response to detecting the rotation of the rotatable input mechanism:
moving the ordered set of application views on the display along the first dimension of the display;
in accordance with a determination that the ordered set of application views is moved to a terminus of the ordered set of application views:
displaying a second subset of application views of the ordered set of application views; and
displaying a respective affordance associated with display of a grid of affordances corresponding to applications available on the electronic device, wherein selection of the respective affordance causes the display of the grid of affordances corresponding to applications available on the electronic device, and wherein the respective affordance is displayed in response to detecting the rotation of the rotatable input mechanism without receiving additional user input after the rotation of the rotatable input mechanism; and
in accordance with a determination that the ordered set of application views is moved to a position that is not the terminus of the ordered set of application views, displaying a third subset of application views of the ordered set of application views without displaying the respective affordance associated with display of a grid of affordances corresponding to applications available on the electronic device;
while concurrently displaying the respective affordance and one or more application views that are at the terminus of the ordered set of application views, detecting a second user input corresponding to selection of the respective affordance that was displayed in response to the rotation of the rotatable input mechanism; and
in response to detecting the second user input corresponding to selection of the respective affordance:
ceasing to display the one or more application views that are at the terminus of the ordered set of application views; and
displaying the grid of affordances corresponding to applications available on the electronic device, the grid of affordances including at least a first application affordance, a second application affordance that is above or below the first application affordance, and a third application affordance that is to the right or left of the first application affordance.

38. The method of claim 37, wherein displaying the second subset of application views includes displaying an adaptive application view, and wherein the adaptive application view includes an affordance for adding the adaptive application view to preselected application views, the one or more programs further including instructions for:
detecting a third user input corresponding to selection of the affordance for adding the adaptive application view to the preselected application views; and
in response to detecting the third user input corresponding to selection of the affordance for adding the adaptive application view to the preselected application views, adding the adaptive application view that corresponds to the most recently opened application to the preselected application views.

39. The method of claim 37, wherein the display includes a touch-sensitive display, the one or more programs further including instructions for:
detecting a gesture on the touch-sensitive display, wherein the gesture includes a swipe on a first application view of the ordered set of application views and is in a direction perpendicular to the first dimension; and
in response to detecting the gesture, deleting the first application view from the ordered set of application views.

40. The method of claim 37, wherein the ordered set of application views includes a plurality of adaptive application views corresponding to a plurality of opened applications.

41. The method of claim 40, wherein the first user input is detected while a first application is open, and wherein displaying the first subset of application views includes:
displaying, in the center of the display, an adaptive application view corresponding to a recently-opened application other than the first application; and
displaying, above the adaptive application view corresponding to the recently-opened application, an adaptive application view corresponding to the first application.

42. The method of claim 40, wherein the first user input is detected while an application is not open, and wherein displaying the first subset of application views includes displaying the adaptive application view of a most-recently opened application above an adaptive application view of a second most-recently opened application.

43. The method of claim 37, the one or more programs further including instructions for:

detecting a fourth user input corresponding to selection of an application view of the ordered set of application views; and in response to detecting the fourth user input corresponding to selection of the application view, displaying the application associated with the selected application view.

44. The method of claim 37, wherein the display includes a touch-sensitive display, the one or more programs further including instructions for:

detecting a second gesture on the touch-sensitive display; and in response to detecting the second gesture on the display, displaying a third subset of application views of the ordered set of application views, wherein displaying the third subset of application views includes moving the ordered set of application views on the display along the first dimension of the display.

45. The method of claim 37, wherein displaying the first subset of application views includes:

displaying at least a partial view of a first application view in the first subset of application views; and displaying a partial view of a second application view in the first subset of application views.

46. The method of claim 37, wherein:

the first user input is detected while displaying an open application, displaying the first subset of application views includes displaying an adaptive application view that corresponds to the open application, and displaying the adaptive application view that corresponds to the open application includes animating a screenshot of the open application moving along the first dimension of the display.

47. The method of claim 37, wherein moving the ordered set of application views on the display along the first dimension of the display includes translating the ordered set of application views along the first dimension of the display and changing the size of the application views as the application views translate along the first dimension of the display.

48. The method of claim 37, wherein the display includes a touch-sensitive display, the one or more programs further including instructions for:

while displaying the grid of affordances, detecting a contact on the touch-sensitive display;

determining a characteristic intensity of the contact;

in accordance with a determination that the characteristic intensity exceeds a predetermined intensity threshold, displaying a second grid of affordances; and in accordance with a determination that the characteristic intensity does not exceed the predetermined threshold, launching an application.

49. The method of claim 37, wherein the ordered set of application views includes representations of content from applications corresponding to the application views in the ordered set of application views.

50. The method of claim 37, wherein the set of application views includes preselected application views, and wherein the set of application views includes an adaptive application view that corresponds to a most recently opened application that is not one of the preselected application views.

51. The method of claim 37, wherein the first user input comprises a push input received via a physical input mechanism.

52. The method of claim 37, wherein the electronic device further comprises a physical input mechanism separate from the rotatable input mechanism, and the first user input comprises a push input received via the physical input mechanism.

53. The method of claim 37, wherein the first subset of application views of the ordered set of application views includes a first application view, a second application view, and a third application view, and wherein the first application view is displayed above the second application view and is partially obscured by the second application view, and wherein the second application view is displayed above the third application view and is partially obscured by the third application view.

54. The method of claim 53, further comprising:

detecting a second user input;

in response to detecting the second user input:

moving the ordered set of application views on the display along the first dimension of the display;

ceasing to display the first application view; and displaying an additional subset of application views of the ordered set of application views, wherein the additional subset of application views of the ordered set of application views includes the second application view, the third application view, and a fourth application view, and wherein the second application view is displayed above the third application view and is partially obscured by the third application view, and wherein the third application view is displayed above the fourth application view and is partially obscured by the fourth application view.

* * * * *